United States Patent
Hanash et al.

(10) Patent No.: US 12,504,430 B2
(45) Date of Patent: Dec. 23, 2025

(54) METHODS FOR THE DETECTION AND TREATMENT OF LUNG CANCER

(71) Applicant: Board of Regents, The University of Texas System, Austin, TX (US)

(72) Inventors: Samir Hanash, Houston, TX (US); Ayumu Taguchi, Houston, TX (US); Ziding Feng, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1032 days.

(21) Appl. No.: 16/484,177

(22) PCT Filed: Feb. 9, 2018

(86) PCT No.: PCT/US2018/017704
§ 371 (c)(1),
(2) Date: Aug. 7, 2019

(87) PCT Pub. No.: WO2018/148600
PCT Pub. Date: Aug. 16, 2018

(65) Prior Publication Data
US 2020/0025766 A1    Jan. 23, 2020

Related U.S. Application Data

(60) Provisional application No. 62/456,731, filed on Feb. 9, 2017.

(51) Int. Cl.
*G01N 33/574* (2006.01)
*G16B 5/20* (2019.01)

(52) U.S. Cl.
CPC . *G01N 33/57423* (2013.01); *G01N 33/57484* (2013.01); *G16B 5/20* (2019.02)

(58) Field of Classification Search
CPC .................. G01N 33/57523; G01N 33/57484
See application file for complete search history.

(56) References Cited

U.S. PATENT DOCUMENTS

| | | |
|---|---|---|
| 2008/0133141 A1 | 6/2008 | Frost |
| 2013/0196868 A1 | 8/2013 | Lebowitz |
| 2014/0271453 A1 | 9/2014 | Dowell |
| 2014/0274772 A1 | 9/2014 | Borgia |
| 2015/0072890 A1 | 3/2015 | James |
| 2016/0060329 A1 | 3/2016 | Sin |
| 2016/0320393 A1 | 11/2016 | Colpitts |
| 2018/0275143 A1 | 9/2018 | Wilcox |
| 2019/0131016 A1 | 5/2019 | Cohen |

(Continued)

FOREIGN PATENT DOCUMENTS

| | | |
|---|---|---|
| CN | 102321760 | 1/2012 |
| WO | 2007076439 | 7/2007 |

(Continued)

OTHER PUBLICATIONS

Fahrmann, J. et al., "Blood-Based Biomarker Panel for Personalized Lung Cancer Risk Assessment", J Clin Oncol., 40(8):876-83, (2022).

(Continued)

*Primary Examiner* — Diana B Johannsen
(74) *Attorney, Agent, or Firm* — Cynthia Hathaway; Michael Sertic

(57) ABSTRACT

Provided are methods and related kits for detection of early stage lung cancer, and determination of risk of harboring lung cancer.

21 Claims, 4 Drawing Sheets

Specification includes a Sequence Listing.

(56) References Cited

U.S. PATENT DOCUMENTS

| | | | |
|---|---|---|---|
| 2020/0025765 | A1 | 1/2020 | Agorreta Arrazubi |
| 2020/0377956 | A1 | 12/2020 | Vogelstein et al. |
| 2023/0314436 | A1 | 10/2023 | Hanash |
| 2024/0159753 | A1 | 5/2024 | Hanash |

FOREIGN PATENT DOCUMENTS

| | | |
|---|---|---|
| WO | 2008144034 | 11/2008 |
| WO | 2011140234 | 11/2011 |
| WO | 2011150974 | 12/2011 |
| WO | 2013154998 | 10/2013 |
| WO | 2016205960 | 12/2016 |
| WO | 2017155570 | 9/2017 |
| WO | 2018148600 | 8/2018 |
| WO | 2022072471 | 4/2022 |
| WO | 2024107923 | 5/2024 |
| WO | 2024144657 | 7/2024 |
| WO | 2024249401 | 12/2024 |
| WO | 2025064345 | 3/2025 |

OTHER PUBLICATIONS

Sequist, L. et al., "A New Era of Protein-Based Assays for Cancer Early Detection", J Thorac Oncol., 16(2):191-3, (2021).
Bach, P. et al., "Variations in Lung Cancer Risk Among Smokers", J Natl Cancer Inst., 95(6):470-8, (2003).
Cassidy, A. et al., "The LLP Risk Model: An Individual Risk Prediction Model for Lung Cancer", Br J Cancer, 98(2):270-6, (2008).
EP Patent Application No. 18752036.6; Third Party Observations under Article 115 EPC, dated Dec. 11, 2019; 3 pages.
Fernandez-Cuesta, L. et al., "Identification of Circulating Tumor DNA for the Early Detection of Small-Cell Lung Cancer", EBioMedicine, 10:117-23, (2016).
Hoggart, C. et al., "A Risk Model for Lung Cancer Incidence", Cancer Prev Res (Phila)., 5(6):834-46, (2012).
International Application No. PCT/US2018/017704; International Preliminary Report on Patentability, date of issuance Aug. 13, 2018; 34 pages.
International Application No. PCT/US2018/017704; International Search Report and Written Opinion of the International Searching Authority, date of mailing Apr. 27, 2018; 37 pages.
Jett, J. et al., "Audit of the Autoantibody Test, EarlyCDT-Lung, in 1600 Patients: An Evolution of It's Performance in Routine Clinical Practice", Lung Cancer, 83(1):51-5, (2014).
Johansson, M. et al., "Comprehensive Evaluation of Promising Biomarkers for Lung Cancer Risk Prediction", Cancer Res., 76(14):Abstract 2259, (2016).
Johansson, M., "Can Biomarkers be Used to Improve Risk Prediction Models on Lung Cancer?" IARC/WHO presentation, 38 pages, (2016).
Johansson, M., "Can Biomarkers be Used to Improve Risk Prediction Models on Lung Cancer?", Cancer Epidemiology, Biomarkers & Prevention, Abstract IA19, 4 pages, (2016).
Sin, D. et al., "Pro-Surfactant Protein B as a Biomarker for Lung Cancer Prediction", J Clin Oncol., 31(36):4536-43, (2013).
Sozzi, G. et al., "Clinical Utility of a Plasma-Based miRNA Signature Classifier Within Computed Tomography Lung Cancer Screening: A Correlative Mild Trial Study", J Clin Oncol., 32(8):768-73, (Mar. 10, 2014).
Spitz, M. et al., "An Expanded Risk Prediction Model for Lung Cancer", Cancer Prev Res (Phila)., 1(4):250-4, (2008).
Wikoff, W. et al., "Diacetylspermine Is a Novel Prediagnostic Serum Biomarker for Non-Small-Cell Lung Cancer and Has Additive Performance With Pro-Surfactant Protein B", J Clin Oncol., 33(33):3880-6, (2015).
Cedrés, S. et al., "Serum tumor markers CEA, CYFRA21-1, and CA-125 are associated with worse prognosis in advanced non-small-cell lung cancer (NSCLC)", Clin Lung Cancer, 12(3):172-9, (2011).
Molina, R. et al., "Tumor markers (CEA, CA 125, CYFRA 21-1, SCC and NSE) in patients with non-small cell lung cancer as an aid in histological diagnosis and prognosis. Comparison with the main clinical and pathological prognostic factors", 24(4):209-18,(2003).
U.S. Appl. No. 18/191,506; Non-Final Office Action, dated May 14, 2024; 11 pages.
U.S. Appl. No. 18/191,506; Advisory Action, dated Jan. 24, 2025; 3 pages.
U.S. Appl. No. 18/191,506; Final Office Action, dated Nov. 13, 2024; 14 pages.
Birse, C. et al., "Clinical validation of a blood-based classifier for diagnostic evaluation of asymptomatic individuals with pulmonary nodules", Clin Proteomics, 14:25, 9 pages, (2017).
Fahrmann, J. et al., "Blood-Based Biomarker Panel for Personalized Lung Cancer Risk Assessment", J Clin Oncol., 40(8):876-84, (2022).
International Application No. PCT/US2021/052611; International Preliminary Report on Patentability, date of issuance Apr. 13, 2023; 21 pages.
International Application No. PCT/US2021/052611; International Search Report and Written Opinion of the International Searching Authority, date of mailing Feb. 22, 2022; 25 pages.
International Application No. PCT/US2023/079957; International Search Report and Written Opinion of the International Searching Authority, date of mailing Mar. 29, 2024; 9 pages.
International Application No. PCT/US2024/031238; International Search Report and Written Opinion of the International Searching Authority, date of mailing Sep. 20, 2024; 8 pages.
International Application No. PCT/US2024/046877; International Search Report and Written Opinion of the International Searching Authority, date of mailing Jan. 14, 2025; 8 pages.
Irajizad, E. et al., "Mortality Benefit of a Blood-Based Biomarker Panel for Lung Cancer on the Basis of the Prostate, Lung, Colorectal, and Ovarian Cohort", J Clin Oncol., 41(27):4360-8, (2023).
Moninuola, F. et al., "A Mini Review of Trends towards Automated and Non-Invasive Techniques for Early Detection of Lung Cancer: From Radiomics through Proteogenomics to Breathomics", J Phys: Conference Series, Inst Phys, 1378(3):32010, (2019).
National Lung Screening Trial Research Team et al., "Results of initial low-dose computed tomographic screening for lung cancer", N Engl J Med., 368(21):1980-91, (2013).
Patel, D. et al., "Improved detection and precise relative quantification of the urinary cancer metabolite biomarkers—Creatine riboside, creatinine riboside, creatine and creatinine by UPLC-ESI-MS/MS: Application to the NCI-Maryland cohort population controls and lung cancer cases", J Pharm Biomed Anal., 191:113596, pp. 1-17, (2020).
Trivedi, N. et al., "Analytical validation of a novel multi-analyte plasma test for lung nodule characterization", Biomed Res Rev., 2(3):123, 26 pages, (2018).
U.S. Appl. No. 18/191,506; Examiner-Initiated Interview Summary, dated Jul. 22, 2025; 3 pages.
U.S. Appl. No. 18/191,506; Notice of Allowance, dated Apr. 9, 2025; 8 pages.
U.S. Appl. No. 19/206,866; Application as filed, dated May 13, 2025; 45 pages.

SEQUENCE LISTING

<160> NUMBER OF SEQ ID NOS: 4

<210> SEQ ID NO 1
<211> LENGTH: 702
<212> TYPE: PRT
<213> ORGANISM: Homo sapiens

<400> SEQUENCE: 1

```
Met Glu Ser Pro Ser Ala Pro Pro His Arg Trp Cys Ile Pro Trp Gln
1               5                   10                  15

Arg Leu Leu Leu Thr Ala Ser Leu Leu Thr Phe Trp Asn Pro Pro Thr
            20                  25                  30

Thr Ala Lys Leu Thr Ile Glu Ser Thr Pro Phe Asn Val Ala Glu Gly
        35                  40                  45

Lys Glu Val Leu Leu Leu Val His Asn Leu Pro Gln His Leu Phe Gly
    50                  55                  60

Tyr Ser Trp Tyr Lys Gly Glu Arg Val Asp Gly Asn Arg Gln Ile Ile
65                  70                  75                  80

Gly Tyr Val Ile Gly Thr Gln Gln Ala Thr Pro Gly Pro Ala Tyr Ser
                85                  90                  95

Gly Arg Glu Ile Ile Tyr Pro Asn Ala Ser Leu Leu Ile Gln Asn Ile
                100                 105                 110

Ile Gln Asn Asp Thr Gly Phe Tyr Thr Leu His Val Ile Lys Ser Asp
            115                 120                 125

Leu Val Asn Glu Glu Ala Thr Gly Gln Phe Arg Val Tyr Pro Glu Leu
    130                 135                 140

Pro Lys Pro Ser Ile Ser Ser Asn Asn Ser Lys Pro Val Glu Asp Lys
145                 150                 155                 160

Asp Ala Val Ala Phe Thr Cys Glu Pro Glu Thr Gln Asp Ala Thr Tyr
                165                 170                 175

Leu Trp Trp Val Asn Asn Gln Ser Leu Pro Val Ser Pro Arg Leu Gln
            180                 185                 190

Leu Ser Asn Gly Asn Arg Thr Leu Thr Leu Phe Asn Val Thr Arg Asn
    195                 200                 205

Asp Thr Ala Ser Tyr Lys Cys Glu Thr Gln Asn Pro Val Ser Ala Arg
    210                 215                 220

Arg Ser Asp Ser Val Ile Leu Asn Val Leu Tyr Gly Pro Asp Ala Pro
225                 230                 235                 240

Thr Ile Ser Pro Leu Asn Thr Ser Tyr Arg Ser Gly Glu Asn Leu Asn
            245                 250                 255

Leu Ser Cys His Ala Ala Ser Asn Pro Pro Ala Gln Tyr Ser Trp Phe
        260                 265                 270

Val Asn Gly Thr Phe Gln Gln Ser Thr Gln Glu Leu Phe Ile Pro Asn
    275                 280                 285

Ile Thr Val Asn Asn Ser Gly Ser Tyr Thr Cys Gln Ala His Asn Ser
    290                 295                 300

Asp Thr Gly Leu Asn Arg Thr Thr Val Thr Thr Ile Thr Val Tyr Ala
305                 310                 315                 320

Glu Pro Pro Lys Pro Phe Ile Thr Ser Asn Asn Ser Asn Pro Val Glu
                325                 330                 335

Asp Glu Asp Ala Val Ala Leu Thr Cys Glu Pro Glu Ile Gln Asn Thr
            340                 345                 350

Thr Tyr Leu Trp Trp Val Asn Asn Gln Ser Leu Pro Val Ser Pro Arg
        355                 360                 365

Leu Gln Leu Ser Asn Asp Asn Arg Thr Leu Thr Leu Leu Ser Val Thr
    370                 375                 380

Arg Asn Asp Val Gly Pro Tyr Glu Cys Gly Ile Gln Asn Lys Leu Ser
385                 390                 395                 400

Val Asp His Ser Asp Pro Val Ile Leu Asn Val Leu Tyr Gly Pro Asp
                405                 410                 415
```

```
Asp Pro Thr Ile Ser Pro Ser Tyr Thr Tyr Arg Pro Gly Val Asn
            420             425             430

Leu Ser Leu Ser Cys His Ala Ala Ser Asn Pro Ala Gln Tyr Ser
        435             440             445

Trp Leu Ile Asp Gly Asn Ile Gln Gln His Thr Gln Glu Leu Phe Ile
        450             455             460

Ser Asn Ile Thr Glu Lys Asn Ser Gly Leu Tyr Thr Cys Gln Ala Asn
465             470             475             480

Asn Ser Ala Ser Gly His Ser Arg Thr Thr Val Lys Thr Ile Thr Val
                485             490             495

Ser Ala Glu Leu Pro Lys Pro Ser Ile Ser Ser Asn Asn Ser Lys Pro
            500             505             510

Val Glu Asp Lys Asp Ala Val Ala Phe Thr Cys Glu Pro Glu Ala Gln
            515             520             525

Asn Thr Thr Tyr Leu Trp Trp Val Asn Gly Gln Ser Leu Pro Val Ser
            530             535             540

Pro Arg Leu Gln Leu Ser Asn Gly Asn Arg Thr Leu Thr Leu Phe Asn
545             550             555             560

Val Thr Arg Asn Asp Ala Arg Ala Tyr Val Cys Gly Ile Gln Asn Ser
                565             570             575

Val Ser Ala Asn Arg Ser Asp Pro Val Thr Leu Asp Val Leu Tyr Gly
            580             585             590

Pro Asp Thr Pro Ile Ile Ser Pro Asp Ser Ser Tyr Leu Ser Gly
            595             600             605

Ala Asn Leu Asn Leu Ser Cys His Ser Ala Ser Asn Pro Ser Pro Gln
610             615             620

Tyr Ser Trp Arg Ile Asn Gly Ile Pro Gln Gln His Thr Gln Val Leu
625             630             635             640

Phe Ile Ala Lys Ile Thr Pro Asn Asn Asn Gly Thr Tyr Ala Cys Phe
                645             650             655

Val Ser Asn Leu Ala Thr Gly Arg Asn Asn Ser Ile Val Lys Ser Ile
            660             665             670

Thr Val Ser Ala Ser Gly Thr Ser Pro Gly Leu Ser Ala Gly Ala Thr
        675             680             685

Val Gly Ile Met Ile Gly Val Leu Val Gly Val Ala Leu Ile
690             695             700
```

<210> SEQ ID NO 2
<211> LENGTH: 14451
<212> TYPE: PRT
<213> ORGANISM: Homo sapiens

<400> SEQUENCE: 2

```
Met Leu Lys Pro Ser Gly Leu Pro Gly Ser Ser Pro Thr Arg Ser
1               5               10              15

Leu Met Thr Gly Ser Arg Ser Thr Lys Ala Thr Pro Glu Met Asp Ser
            20              25              30

Gly Leu Thr Gly Ala Thr Leu Ser Pro Lys Thr Ser Thr Gly Ala Ile
        35              40              45

Val Val Thr Glu His Thr Leu Pro Phe Thr Ser Pro Asp Lys Thr Leu
    50              55              60

Ala Ser Pro Thr Ser Ser Val Val Gly Arg Thr Thr Gln Ser Leu Gly
65              70              75              80

Val Met Ser Ser Ala Leu Pro Glu Ser Thr Ser Arg Gly Met Thr His
            85              90              95
```

```
Ser Glu Gln Arg Thr Ser Pro Ser Leu Ser Pro Gln Val Asn Gly Thr
            100                 105                 110

Pro Ser Arg Asn Tyr Pro Ala Thr Ser Met Val Ser Gly Leu Ser Ser
        115                 120                 125

Pro Arg Thr Arg Thr Ser Ser Thr Glu Gly Asn Phe Thr Lys Glu Ala
    130                 135                 140

Ser Thr Tyr Thr Leu Thr Val Glu Thr Ser Gly Pro Val Thr Glu
145                 150                 155                 160

Lys Tyr Thr Val Pro Thr Glu Thr Ser Thr Glu Gly Asp Ser Thr
                165                 170                 175

Glu Thr Pro Trp Asp Thr Arg Tyr Ile Pro Val Lys Ile Thr Ser Pro
            180                 185                 190

Met Lys Thr Phe Ala Asp Ser Thr Ala Ser Lys Glu Asn Ala Pro Val
        195                 200                 205

Ser Met Thr Pro Ala Glu Thr Thr Val Thr Asp Ser His Thr Pro Gly
    210                 215                 220

Arg Thr Asn Pro Ser Phe Gly Thr Leu Tyr Ser Ser Phe Leu Asp Leu
225                 230                 235                 240

Ser Pro Lys Gly Thr Pro Asn Ser Arg Gly Glu Thr Ser Leu Glu Leu
                245                 250                 255

Ile Leu Ser Thr Thr Gly Tyr Pro Phe Ser Ser Pro Glu Pro Gly Ser
            260                 265                 270

Ala Gly His Ser Arg Ile Ser Thr Ser Ala Pro Leu Ser Ser Ser Ala
        275                 280                 285

Ser Val Leu Asp Asn Lys Ile Ser Glu Thr Ser Ile Phe Ser Gly Gln
    290                 295                 300

Ser Leu Thr Ser Pro Leu Ser Pro Gly Val Pro Glu Ala Arg Ala Ser
305                 310                 315                 320

Thr Met Pro Asn Ser Ala Ile Pro Phe Ser Met Thr Leu Ser Asn Ala
                325                 330                 335

Glu Thr Ser Ala Glu Arg Val Arg Ser Thr Ile Ser Ser Leu Gly Thr
            340                 345                 350

Pro Ser Ile Ser Thr Lys Gln Thr Ala Glu Thr Ile Leu Thr Phe His
        355                 360                 365

Ala Phe Ala Glu Thr Met Asp Ile Pro Ser Thr His Ile Ala Lys Thr
    370                 375                 380

Leu Ala Ser Glu Trp Leu Gly Ser Pro Gly Thr Leu Gly Gly Thr Ser
385                 390                 395                 400

Thr Ser Ala Leu Thr Thr Thr Ser Pro Ser Thr Thr Leu Val Ser Glu
                405                 410                 415

Glu Thr Asn Thr His His Ser Ser Gly Lys Glu Thr Glu Gly Thr
            420                 425                 430

Leu Asn Thr Ser Met Thr Pro Leu Glu Thr Ser Ala Pro Gly Glu Glu
        435                 440                 445

Ser Glu Met Thr Ala Thr Leu Val Pro Thr Leu Gly Phe Thr Thr Leu
    450                 455                 460

Asp Ser Lys Ile Arg Ser Pro Ser Gln Val Ser Ser Ser His Pro Thr
465                 470                 475                 480

Arg Glu Leu Arg Thr Thr Gly Ser Thr Ser Gly Arg Gln Ser Ser Ser
                485                 490                 495

Thr Ala Ala His Gly Ser Ser Asp Ile Leu Arg Ala Thr Thr Ser Ser
            500                 505                 510
```

```
Thr Ser Lys Ala Ser Ser Trp Thr Ser Glu Ser Thr Ala Gln Gln Phe
        515                 520                 525

Ser Glu Pro Gln His Thr Gln Trp Val Glu Thr Ser Pro Ser Met Lys
        530                 535                 540

Thr Glu Arg Pro Pro Ala Ser Thr Ser Val Ala Ala Pro Ile Thr Thr
545                 550                 555                 560

Ser Val Pro Ser Val Val Ser Gly Phe Thr Thr Leu Lys Thr Ser Ser
                565                 570                 575

Thr Lys Gly Ile Trp Leu Glu Glu Thr Ser Ala Asp Thr Leu Ile Gly
            580                 585                 590

Glu Ser Thr Ala Gly Pro Thr Thr His Gln Phe Ala Val Pro Thr Gly
        595                 600                 605

Ile Ser Met Thr Gly Gly Ser Ser Thr Arg Gly Ser Gln Gly Thr Thr
        610                 615                 620

His Leu Leu Thr Arg Ala Thr Ala Ser Ser Glu Thr Ser Ala Asp Leu
625                 630                 635                 640

Thr Leu Ala Thr Asn Gly Val Pro Val Ser Val Ser Pro Ala Val Ser
                645                 650                 655

Lys Thr Ala Ala Gly Ser Ser Pro Pro Gly Gly Thr Lys Pro Ser Tyr
            660                 665                 670

Thr Met Val Ser Ser Val Ile Pro Glu Thr Ser Ser Leu Gln Ser Ser
        675                 680                 685

Ala Phe Arg Glu Gly Thr Ser Leu Gly Leu Thr Pro Leu Asn Thr Arg
        690                 695                 700

His Pro Phe Ser Ser Pro Glu Pro Asp Ser Ala Gly His Thr Lys Ile
705                 710                 715                 720

Ser Thr Ser Ile Pro Leu Leu Ser Ser Ala Ser Val Leu Glu Asp Lys
                725                 730                 735

Val Ser Ala Thr Ser Thr Phe Ser His His Lys Ala Thr Ser Ser Ile
            740                 745                 750

Thr Thr Gly Thr Pro Glu Ile Ser Thr Lys Thr Lys Pro Ser Ser Ala
        755                 760                 765

Val Leu Ser Ser Met Thr Leu Ser Asn Ala Ala Thr Ser Pro Glu Arg
        770                 775                 780

Val Arg Asn Ala Thr Ser Pro Leu Thr His Pro Ser Pro Ser Gly Glu
785                 790                 795                 800

Glu Thr Ala Gly Ser Val Leu Thr Leu Ser Thr Ser Ala Glu Thr Thr
                805                 810                 815

Asp Ser Pro Asn Ile His Pro Thr Gly Thr Leu Thr Ser Glu Ser Ser
            820                 825                 830

Glu Ser Pro Ser Thr Leu Ser Leu Pro Ser Val Ser Gly Val Lys Thr
        835                 840                 845

Thr Phe Ser Ser Ser Thr Pro Ser Thr His Leu Phe Thr Ser Gly Glu
850                 855                 860

Glu Thr Glu Glu Thr Ser Asn Pro Ser Val Ser Gln Pro Glu Thr Ser
865                 870                 875                 880

Val Ser Arg Val Arg Thr Thr Leu Ala Ser Thr Ser Val Pro Thr Pro
                885                 890                 895

Val Phe Pro Thr Met Asp Thr Trp Pro Thr Arg Ser Ala Gln Phe Ser
            900                 905                 910

Ser Ser His Leu Val Ser Glu Leu Arg Ala Thr Ser Ser Thr Ser Val
        915                 920                 925

Thr Asn Ser Thr Gly Ser Ala Leu Pro Lys Ile Ser His Leu Thr Gly
```

```
            930            935            940
Thr Ala Thr Met Ser Gln Thr Asn Arg Asp Thr Phe Asn Asp Ser Ala
945                 950                 955                 960

Ala Pro Gln Ser Thr Thr Trp Pro Glu Thr Ser Pro Arg Phe Lys Thr
            965                 970                 975

Gly Leu Pro Ser Ala Thr Thr Val Ser Thr Ser Ala Thr Ser Leu
            980                 985                 990

Ser Ala Thr Val Met Val Ser Lys Phe Thr Ser Pro Ala Thr Ser Ser
        995                 1000                1005

Met Glu Ala Thr Ser Ile Arg Glu Pro Ser Thr Thr Ile Leu Thr
    1010                1015                1020

Thr Glu Thr Thr Asn Gly Pro Gly Ser Met Ala Val Ala Ser Thr
    1025                1030                1035

Asn Ile Pro Ile Gly Lys Gly Tyr Ile Thr Glu Gly Arg Leu Asp
    1040                1045                1050

Thr Ser His Leu Pro Ile Gly Thr Thr Ala Ser Ser Glu Thr Ser
    1055                1060                1065

Met Asp Phe Thr Met Ala Lys Glu Ser Val Ser Met Ser Val Ser
    1070                1075                1080

Pro Ser Gln Ser Met Asp Ala Ala Gly Ser Ser Thr Pro Gly Arg
    1085                1090                1095

Thr Ser Gln Phe Val Asp Thr Phe Ser Asp Asp Val Tyr His Leu
    1100                1105                1110

Thr Ser Arg Glu Ile Thr Ile Pro Arg Asp Gly Thr Ser Ser Ala
    1115                1120                1125

Leu Thr Pro Gln Met Thr Ala Thr His Pro Pro Ser Pro Asp Pro
    1130                1135                1140

Gly Ser Ala Arg Ser Thr Trp Leu Gly Ile Leu Ser Ser Ser Pro
    1145                1150                1155

Ser Ser Pro Thr Pro Lys Val Thr Met Ser Ser Thr Phe Ser Thr
    1160                1165                1170

Gln Arg Val Thr Thr Ser Met Ile Met Asp Thr Val Glu Thr Ser
    1175                1180                1185

Arg Trp Asn Met Pro Asn Leu Pro Ser Thr Thr Ser Leu Thr Pro
    1190                1195                1200

Ser Asn Ile Pro Thr Ser Gly Ala Ile Gly Lys Ser Thr Leu Val
    1205                1210                1215

Pro Leu Asp Thr Pro Ser Pro Ala Thr Ser Leu Glu Ala Ser Glu
    1220                1225                1230

Gly Gly Leu Pro Thr Leu Ser Thr Tyr Pro Glu Ser Thr Asn Thr
    1235                1240                1245

Pro Ser Ile His Leu Gly Ala His Ala Ser Ser Glu Ser Pro Ser
    1250                1255                1260

Thr Ile Lys Leu Thr Met Ala Ser Val Val Lys Pro Gly Ser Tyr
    1265                1270                1275

Thr Pro Leu Thr Phe Pro Ser Ile Glu Thr His Ile His Val Ser
    1280                1285                1290

Thr Ala Arg Met Ala Tyr Ser Ser Gly Ser Ser Pro Glu Met Thr
    1295                1300                1305

Ala Pro Gly Glu Thr Asn Thr Gly Ser Thr Trp Asp Pro Thr Thr
    1310                1315                1320

Tyr Ile Thr Thr Thr Asp Pro Lys Asp Thr Ser Ser Ala Gln Val
    1325                1330                1335
```

```
Ser Thr Pro His Ser Val Arg Thr Leu Arg Thr Thr Glu Asn His
1340                1345                1350

Pro Lys Thr Glu Ser Ala Thr Pro Ala Ala Tyr Ser Gly Ser Pro
    1355                1360                1365

Lys Ile Ser Ser Ser Pro Asn Leu Thr Ser Pro Ala Thr Lys Ala
    1370                1375                1380

Trp Thr Ile Thr Asp Thr Thr Glu His Ser Thr Gln Leu His Tyr
    1385                1390                1395

Thr Lys Leu Ala Glu Lys Ser Ser Gly Phe Glu Thr Gln Ser Ala
    1400                1405                1410

Pro Gly Pro Val Ser Val Val Ile Pro Thr Ser Pro Thr Ile Gly
    1415                1420                1425

Ser Ser Thr Leu Glu Leu Thr Ser Asp Val Pro Gly Glu Pro Leu
    1430                1435                1440

Val Leu Ala Pro Ser Glu Gln Thr Thr Ile Thr Leu Pro Met Ala
    1445                1450                1455

Thr Trp Leu Ser Thr Ser Leu Thr Glu Glu Met Ala Ser Thr Asp
    1460                1465                1470

Leu Asp Ile Ser Ser Pro Ser Ser Pro Met Ser Thr Phe Ala Ile
    1475                1480                1485

Phe Pro Pro Met Ser Thr Pro Ser His Glu Leu Ser Lys Ser Glu
    1490                1495                1500

Ala Asp Thr Ser Ala Ile Arg Asn Thr Asp Ser Thr Thr Leu Asp
    1505                1510                1515

Gln His Leu Gly Ile Arg Ser Leu Gly Arg Thr Gly Asp Leu Thr
    1520                1525                1530

Thr Val Pro Ile Thr Pro Leu Thr Thr Thr Trp Thr Ser Val Ile
    1535                1540                1545

Glu His Ser Thr Gln Ala Gln Asp Thr Leu Ser Ala Thr Met Ser
    1550                1555                1560

Pro Thr His Val Thr Gln Ser Leu Lys Asp Gln Thr Ser Ile Pro
    1565                1570                1575

Ala Ser Ala Ser Pro Ser His Leu Thr Glu Val Tyr Pro Glu Leu
    1580                1585                1590

Gly Thr Gln Gly Arg Ser Ser Ser Glu Ala Thr Thr Phe Trp Lys
    1595                1600                1605

Pro Ser Thr Asp Thr Leu Ser Arg Glu Ile Glu Thr Gly Pro Thr
    1610                1615                1620

Asn Ile Gln Ser Thr Pro Pro Met Asp Asn Thr Thr Thr Gly Ser
    1625                1630                1635

Ser Ser Ser Gly Val Thr Leu Gly Ile Ala His Leu Pro Ile Gly
    1640                1645                1650

Thr Ser Ser Pro Ala Glu Thr Ser Thr Asn Met Ala Leu Glu Arg
    1655                1660                1665

Arg Ser Ser Thr Ala Thr Val Ser Met Ala Gly Thr Met Gly Leu
    1670                1675                1680

Leu Val Thr Ser Ala Pro Gly Arg Ser Ile Ser Gln Ser Leu Gly
    1685                1690                1695

Arg Val Ser Ser Val Leu Ser Glu Ser Thr Thr Glu Gly Val Thr
    1700                1705                1710

Asp Ser Ser Lys Gly Ser Ser Pro Arg Leu Asn Thr Gln Gly Asn
    1715                1720                1725
```

```
Thr Ala Leu Ser Ser Ser Leu Glu Pro Ser Tyr Ala Glu Gly Ser
    1730            1735            1740

Gln Met Ser Thr Ser Ile Pro Leu Thr Ser Pro Thr Thr Pro
    1745            1750            1755

Asp Val Glu Phe Ile Gly Gly Ser Thr Phe Trp Thr Lys Glu Val
    1760            1765            1770

Thr Thr Val Met Thr Ser Asp Ile Ser Lys Ser Ala Arg Thr
    1775            1780            1785

Glu Ser Ser Ser Ala Thr Leu Met Ser Thr Ala Leu Gly Ser Thr
    1790            1795            1800

Glu Asn Thr Gly Lys Glu Lys Leu Arg Thr Ala Ser Met Asp Leu
    1805            1810            1815

Pro Ser Pro Thr Pro Ser Met Glu Val Thr Pro Trp Ile Ser Leu
    1820            1825            1830

Thr Leu Ser Asn Ala Pro Asn Thr Thr Asp Ser Leu Asp Leu Ser
    1835            1840            1845

His Gly Val His Thr Ser Ser Ala Gly Thr Leu Ala Thr Asp Arg
    1850            1855            1860

Ser Leu Asn Thr Gly Val Thr Arg Ala Ser Arg Leu Glu Asn Gly
    1865            1870            1875

Ser Asp Thr Ser Ser Lys Ser Leu Ser Met Gly Asn Ser Thr His
    1880            1885            1890

Thr Ser Met Thr Tyr Thr Glu Lys Ser Glu Val Ser Ser Ser Ile
    1895            1900            1905

His Pro Arg Pro Glu Thr Ser Ala Pro Gly Ala Glu Thr Thr Leu
    1910            1915            1920

Thr Ser Thr Pro Gly Asn Arg Ala Ile Ser Leu Thr Leu Pro Phe
    1925            1930            1935

Ser Ser Ile Pro Val Glu Glu Val Ile Ser Thr Gly Ile Thr Ser
    1940            1945            1950

Gly Pro Asp Ile Asn Ser Ala Pro Met Thr His Ser Pro Ile Thr
    1955            1960            1965

Pro Pro Thr Ile Val Trp Thr Ser Thr Gly Thr Ile Glu Gln Ser
    1970            1975            1980

Thr Gln Pro Leu His Ala Val Ser Ser Glu Lys Val Ser Val Gln
    1985            1990            1995

Thr Gln Ser Thr Pro Tyr Val Asn Ser Val Ala Val Ser Ala Ser
    2000            2005            2010

Pro Thr His Glu Asn Ser Val Ser Ser Gly Ser Ser Thr Ser Ser
    2015            2020            2025

Pro Tyr Ser Ser Ala Ser Leu Glu Ser Leu Asp Ser Thr Ile Ser
    2030            2035            2040

Arg Arg Asn Ala Ile Thr Ser Trp Leu Trp Asp Leu Thr Thr Ser
    2045            2050            2055

Leu Pro Thr Thr Thr Trp Pro Ser Thr Ser Leu Ser Glu Ala Leu
    2060            2065            2070

Ser Ser Gly His Ser Gly Val Ser Asn Pro Ser Ser Thr Thr Thr
    2075            2080            2085

Glu Phe Pro Leu Phe Ser Ala Ala Ser Thr Ser Ala Ala Lys Gln
    2090            2095            2100

Arg Asn Pro Glu Thr Glu Thr His Gly Pro Gln Asn Thr Ala Ala
    2105            2110            2115

Ser Thr Leu Asn Thr Asp Ala Ser Ser Val Thr Gly Leu Ser Glu
```

```
                2120                2125                2130

Thr Pro Val Gly Ala Ser Ile Ser Ser Glu Val Pro Leu Pro Met
        2135                2140                2145

Ala Ile Thr Ser Arg Ser Asp Val Ser Gly Leu Thr Ser Glu Ser
        2150                2155                2160

Thr Ala Asn Pro Ser Leu Gly Thr Ala Ser Ser Ala Gly Thr Lys
        2165                2170                2175

Leu Thr Arg Thr Ile Ser Leu Pro Thr Ser Glu Ser Leu Val Ser
        2180                2185                2190

Phe Arg Met Asn Lys Asp Pro Trp Thr Val Ser Ile Pro Leu Gly
        2195                2200                2205

Ser His Pro Thr Thr Asn Thr Glu Thr Ser Ile Pro Val Asn Ser
        2210                2215                2220

Ala Gly Pro Pro Gly Leu Ser Thr Val Ala Ser Asp Val Ile Asp
        2225                2230                2235

Thr Pro Ser Asp Gly Ala Glu Ser Ile Pro Thr Val Ser Phe Ser
        2240                2245                2250

Pro Ser Pro Asp Thr Glu Val Thr Thr Ile Ser His Phe Pro Glu
        2255                2260                2265

Lys Thr Thr His Ser Phe Arg Thr Ile Ser Ser Leu Thr His Glu
        2270                2275                2280

Leu Thr Ser Arg Val Thr Pro Ile Pro Gly Asp Trp Met Ser Ser
        2285                2290                2295

Ala Met Ser Thr Lys Pro Thr Gly Ala Ser Pro Ser Ile Thr Leu
        2300                2305                2310

Gly Glu Arg Arg Thr Ile Thr Ser Ala Ala Pro Thr Thr Ser Pro
        2315                2320                2325

Ile Val Leu Thr Ala Ser Phe Thr Glu Thr Ser Thr Val Ser Leu
        2330                2335                2340

Asp Asn Glu Thr Thr Val Lys Thr Ser Asp Ile Leu Asp Ala Arg
        2345                2350                2355

Lys Thr Asn Glu Leu Pro Ser Asp Ser Ser Ser Ser Ser Asp Leu
        2360                2365                2370

Ile Asn Thr Ser Ile Ala Ser Ser Thr Met Asp Val Thr Lys Thr
        2375                2380                2385

Ala Ser Ile Ser Pro Thr Ser Ile Ser Gly Met Thr Ala Ser Ser
        2390                2395                2400

Ser Pro Ser Leu Phe Ser Ser Asp Arg Pro Gln Val Pro Thr Ser
        2405                2410                2415

Thr Thr Glu Thr Asn Thr Ala Thr Ser Pro Ser Val Ser Ser Asn
        2420                2425                2430

Thr Tyr Ser Leu Asp Gly Gly Ser Asn Val Gly Gly Thr Pro Ser
        2435                2440                2445

Thr Leu Pro Pro Phe Thr Ile Thr His Pro Val Glu Thr Ser Ser
        2450                2455                2460

Ala Leu Leu Ala Trp Ser Arg Pro Val Arg Thr Phe Ser Thr Met
        2465                2470                2475

Val Ser Thr Asp Thr Ala Ser Gly Glu Asn Pro Thr Ser Ser Asn
        2480                2485                2490

Ser Val Val Thr Ser Val Pro Ala Pro Gly Thr Trp Thr Ser Val
        2495                2500                2505

Gly Ser Thr Thr Asp Leu Pro Ala Met Gly Phe Leu Lys Thr Ser
        2510                2515                2520
```

```
Pro Ala Gly Glu Ala His Ser Leu Leu Ala Ser Thr Ile Glu Pro
    2525                2530                2535

Ala Thr Ala Phe Thr Pro His Leu Ser Ala Ala Val Val Thr Gly
    2540                2545                2550

Ser Ser Ala Thr Ser Glu Ala Ser Leu Leu Thr Thr Ser Glu Ser
    2555                2560                2565

Lys Ala Ile His Ser Ser Pro Gln Thr Pro Thr Thr Pro Thr Ser
    2570                2575                2580

Gly Ala Asn Trp Glu Thr Ser Ala Thr Pro Glu Ser Leu Leu Val
    2585                2590                2595

Val Thr Glu Thr Ser Asp Thr Thr Leu Thr Ser Lys Ile Leu Val
    2600                2605                2610

Thr Asp Thr Ile Leu Phe Ser Thr Val Ser Thr Pro Pro Ser Lys
    2615                2620                2625

Phe Pro Ser Thr Gly Thr Leu Ser Gly Ala Ser Phe Pro Thr Leu
    2630                2635                2640

Leu Pro Asp Thr Pro Ala Ile Pro Leu Thr Ala Thr Glu Pro Thr
    2645                2650                2655

Ser Ser Leu Ala Thr Ser Phe Asp Ser Thr Pro Leu Val Thr Ile
    2660                2665                2670

Ala Ser Asp Ser Leu Gly Thr Val Pro Glu Thr Thr Leu Thr Met
    2675                2680                2685

Ser Glu Thr Ser Asn Gly Asp Ala Leu Val Leu Lys Thr Val Ser
    2690                2695                2700

Asn Pro Asp Arg Ser Ile Pro Gly Ile Thr Ile Gln Gly Val Thr
    2705                2710                2715

Glu Ser Pro Leu His Pro Ser Ser Thr Ser Pro Ser Lys Ile Val
    2720                2725                2730

Ala Pro Arg Asn Thr Thr Tyr Glu Gly Ser Ile Thr Val Ala Leu
    2735                2740                2745

Ser Thr Leu Pro Ala Gly Thr Thr Gly Ser Leu Val Phe Ser Gln
    2750                2755                2760

Ser Ser Glu Asn Ser Glu Thr Thr Ala Leu Val Asp Ser Ser Ala
    2765                2770                2775

Gly Leu Glu Arg Ala Ser Val Met Pro Leu Thr Thr Gly Ser Gln
    2780                2785                2790

Gly Met Ala Ser Ser Gly Gly Ile Arg Ser Gly Ser Thr His Ser
    2795                2800                2805

Thr Gly Thr Lys Thr Phe Ser Ser Leu Pro Leu Thr Met Asn Pro
    2810                2815                2820

Gly Glu Val Thr Ala Met Ser Glu Ile Thr Thr Asn Arg Leu Thr
    2825                2830                2835

Ala Thr Gln Ser Thr Ala Pro Lys Gly Ile Pro Val Lys Pro Thr
    2840                2845                2850

Ser Ala Glu Ser Gly Leu Leu Thr Pro Val Ser Ala Ser Ser Ser
    2855                2860                2865

Pro Ser Lys Ala Phe Ala Ser Leu Thr Thr Ala Pro Pro Thr Trp
    2870                2875                2880

Gly Ile Pro Gln Ser Thr Leu Thr Phe Glu Phe Ser Glu Val Pro
    2885                2890                2895

Ser Leu Asp Thr Lys Ser Ala Ser Leu Pro Thr Pro Gly Gln Ser
    2900                2905                2910
```

-continued

```
Leu Asn Thr Ile Pro Asp Ser Asp Ala Ser Thr Ala Ser Ser Ser
2915                 2920                 2925

Leu Ser Lys Ser Pro Glu Lys Asn Pro Arg Ala Arg Met Met Thr
2930                 2935                 2940

Ser Thr Lys Ala Ile Ser Ala Ser Ser Phe Gln Ser Thr Gly Phe
2945                 2950                 2955

Thr Glu Thr Pro Glu Gly Ser Ala Ser Pro Ser Met Ala Gly His
2960                 2965                 2970

Glu Pro Arg Val Pro Thr Ser Gly Thr Gly Asp Pro Arg Tyr Ala
2975                 2980                 2985

Ser Glu Ser Met Ser Tyr Pro Asp Pro Ser Lys Ala Ser Ser Ala
2990                 2995                 3000

Met Thr Ser Thr Ser Leu Ala Ser Lys Leu Thr Thr Leu Phe Ser
3005                 3010                 3015

Thr Gly Gln Ala Ala Arg Ser Gly Ser Ser Ser Pro Ile Ser
3020                 3025                 3030

Leu Ser Thr Glu Lys Glu Thr Ser Phe Leu Ser Pro Thr Ala Ser
3035                 3040                 3045

Thr Ser Arg Lys Thr Ser Leu Phe Leu Gly Pro Ser Met Ala Arg
3050                 3055                 3060

Gln Pro Asn Ile Leu Val His Leu Gln Thr Ser Ala Leu Thr Leu
3065                 3070                 3075

Ser Pro Thr Ser Thr Leu Asn Met Ser Gln Glu Glu Pro Pro Glu
3080                 3085                 3090

Leu Thr Ser Ser Gln Thr Ile Ala Glu Glu Gly Thr Thr Ala
3095                 3100                 3105

Glu Thr Gln Thr Leu Thr Phe Thr Pro Ser Glu Thr Pro Thr Ser
3110                 3115                 3120

Leu Leu Pro Val Ser Ser Pro Thr Glu Pro Thr Ala Arg Arg Lys
3125                 3130                 3135

Ser Ser Pro Glu Thr Trp Ala Ser Ser Ile Ser Val Pro Ala Lys
3140                 3145                 3150

Thr Ser Leu Val Glu Thr Thr Asp Gly Thr Leu Val Thr Thr Ile
3155                 3160                 3165

Lys Met Ser Ser Gln Ala Ala Gln Gly Asn Ser Thr Trp Pro Ala
3170                 3175                 3180

Pro Ala Glu Glu Thr Gly Ser Ser Pro Ala Gly Thr Ser Pro Gly
3185                 3190                 3195

Ser Pro Glu Met Ser Thr Thr Leu Lys Ile Met Ser Ser Lys Glu
3200                 3205                 3210

Pro Ser Ile Ser Pro Glu Ile Arg Ser Thr Val Arg Asn Ser Pro
3215                 3220                 3225

Trp Lys Thr Pro Glu Thr Thr Val Pro Met Glu Thr Thr Val Glu
3230                 3235                 3240

Pro Val Thr Leu Gln Ser Thr Ala Leu Gly Ser Gly Ser Thr Ser
3245                 3250                 3255

Ile Ser His Leu Pro Thr Gly Thr Thr Ser Pro Thr Lys Ser Pro
3260                 3265                 3270

Thr Glu Asn Met Leu Ala Thr Glu Arg Val Ser Leu Ser Pro Ser
3275                 3280                 3285

Pro Pro Glu Ala Trp Thr Asn Leu Tyr Ser Gly Thr Pro Gly Gly
3290                 3295                 3300

Thr Arg Gln Ser Leu Ala Thr Met Ser Ser Val Ser Leu Glu Ser
```

-continued

```
            3305                3310                3315
Pro Thr Ala Arg Ser Ile Thr Gly Thr Gly Gln Gln Ser Ser Pro
            3320                3325                3330
Glu Leu Val Ser Lys Thr Thr Gly Met Glu Phe Ser Met Trp His
            3335                3340                3345
Gly Ser Thr Gly Gly Thr Thr Gly Asp Thr His Val Ser Leu Ser
            3350                3355                3360
Thr Ser Ser Asn Ile Leu Glu Asp Pro Val Thr Ser Pro Asn Ser
            3365                3370                3375
Val Ser Ser Leu Thr Asp Lys Ser Lys His Lys Thr Glu Thr Trp
            3380                3385                3390
Val Ser Thr Thr Ala Ile Pro Ser Thr Val Leu Asn Asn Lys Ile
            3395                3400                3405
Met Ala Ala Glu Gln Gln Thr Ser Arg Ser Val Asp Glu Ala Tyr
            3410                3415                3420
Ser Ser Thr Ser Ser Trp Ser Asp Gln Thr Ser Gly Ser Asp Ile
            3425                3430                3435
Thr Leu Gly Ala Ser Pro Asp Val Thr Asn Thr Leu Tyr Ile Thr
            3440                3445                3450
Ser Thr Ala Gln Thr Thr Ser Leu Val Ser Leu Pro Ser Gly Asp
            3455                3460                3465
Gln Gly Ile Thr Ser Leu Thr Asn Pro Ser Gly Gly Lys Thr Ser
            3470                3475                3480
Ser Ala Ser Ser Val Thr Ser Pro Ser Ile Gly Leu Glu Thr Leu
            3485                3490                3495
Arg Ala Asn Val Ser Ala Val Lys Ser Asp Ile Ala Pro Thr Ala
            3500                3505                3510
Gly His Leu Ser Gln Thr Ser Ser Pro Ala Glu Val Ser Ile Leu
            3515                3520                3525
Asp Val Thr Thr Ala Pro Thr Pro Gly Ile Ser Thr Thr Ile Thr
            3530                3535                3540
Thr Met Gly Thr Asn Ser Ile Ser Thr Thr Thr Pro Asn Pro Glu
            3545                3550                3555
Val Gly Met Ser Thr Met Asp Ser Thr Pro Ala Thr Glu Arg Arg
            3560                3565                3570
Thr Thr Ser Thr Glu His Pro Ser Thr Trp Ser Ser Thr Ala Ala
            3575                3580                3585
Ser Asp Ser Trp Thr Val Thr Asp Met Thr Ser Asn Leu Lys Val
            3590                3595                3600
Ala Arg Ser Pro Gly Thr Ile Ser Thr Met His Thr Thr Ser Phe
            3605                3610                3615
Leu Ala Ser Ser Thr Glu Leu Asp Ser Met Ser Thr Pro His Gly
            3620                3625                3630
Arg Ile Thr Val Ile Gly Thr Ser Leu Val Thr Pro Ser Ser Asp
            3635                3640                3645
Ala Ser Ala Val Lys Thr Glu Thr Ser Thr Ser Glu Arg Thr Leu
            3650                3655                3660
Ser Pro Ser Asp Thr Thr Ala Ser Thr Pro Ile Ser Thr Phe Ser
            3665                3670                3675
Arg Val Gln Arg Met Ser Ile Ser Val Pro Asp Ile Leu Ser Thr
            3680                3685                3690
Ser Trp Thr Pro Ser Ser Thr Glu Ala Glu Asp Val Pro Val Ser
            3695                3700                3705
```

```
Met Val Ser Thr Asp His Ala Ser Thr Lys Thr Asp Pro Asn Thr
3710            3715               3720

Pro Leu Ser Thr Phe Leu Phe Asp Ser Leu Ser Thr Leu Asp Trp
3725            3730               3735

Asp Thr Gly Arg Ser Leu Ser Ser Ala Thr Ala Thr Thr Ser Ala
3740            3745               3750

Pro Gln Gly Ala Thr Thr Pro Gln Glu Leu Thr Leu Glu Thr Met
3755            3760               3765

Ile Ser Pro Ala Thr Ser Gln Leu Pro Phe Ser Ile Gly His Ile
3770            3775               3780

Thr Ser Ala Val Thr Pro Ala Ala Met Ala Arg Ser Ser Gly Val
3785            3790               3795

Thr Phe Ser Arg Pro Asp Pro Thr Ser Lys Lys Ala Glu Gln Thr
3800            3805               3810

Ser Thr Gln Leu Pro Thr Thr Thr Ser Ala His Pro Gly Gln Val
3815            3820               3825

Pro Arg Ser Ala Ala Thr Thr Leu Asp Val Ile Pro His Thr Ala
3830            3835               3840

Lys Thr Pro Asp Ala Thr Phe Gln Arg Gln Gly Gln Thr Ala Leu
3845            3850               3855

Thr Thr Glu Ala Arg Ala Thr Ser Asp Ser Trp Asn Glu Lys Glu
3860            3865               3870

Lys Ser Thr Pro Ser Ala Pro Trp Ile Thr Glu Met Met Asn Ser
3875            3880               3885

Val Ser Glu Asp Thr Ile Lys Glu Val Thr Ser Ser Ser Ser Val
3890            3895               3900

Leu Arg Thr Leu Asn Thr Leu Asp Ile Asn Leu Glu Ser Gly Thr
3905            3910               3915

Thr Ser Ser Pro Ser Trp Lys Ser Ser Pro Tyr Glu Arg Ile Ala
3920            3925               3930

Pro Ser Glu Ser Thr Thr Asp Lys Glu Ala Ile His Pro Ser Thr
3935            3940               3945

Asn Thr Val Glu Thr Thr Gly Trp Val Thr Ser Ser Glu His Ala
3950            3955               3960

Ser His Ser Thr Ile Pro Ala His Ser Ala Ser Ser Lys Leu Thr
3965            3970               3975

Ser Pro Val Val Thr Thr Ser Thr Arg Glu Gln Ala Ile Val Ser
3980            3985               3990

Met Ser Thr Thr Thr Trp Pro Glu Ser Thr Arg Ala Arg Thr Glu
3995            4000               4005

Pro Asn Ser Phe Leu Thr Ile Glu Leu Arg Asp Val Ser Pro Tyr
4010            4015               4020

Met Asp Thr Ser Ser Thr Thr Gln Thr Ser Ile Ser Ser Pro
4025            4030               4035

Gly Ser Thr Ala Ile Thr Lys Gly Pro Arg Thr Glu Ile Thr Ser
4040            4045               4050

Ser Lys Arg Ile Ser Ser Ser Phe Leu Ala Gln Ser Met Arg Ser
4055            4060               4065

Ser Asp Ser Pro Ser Glu Ala Ile Thr Arg Leu Ser Asn Phe Pro
4070            4075               4080

Ala Met Thr Glu Ser Gly Gly Met Ile Leu Ala Met Gln Thr Ser
4085            4090               4095
```

```
Pro Pro Gly Ala Thr Ser Leu Ser Ala Pro Thr Leu Asp Thr Ser
    4100                4105                4110

Ala Thr Ala Ser Trp Thr Gly Thr Pro Leu Ala Thr Thr Gln Arg
    4115                4120                4125

Phe Thr Tyr Ser Glu Lys Thr Leu Phe Ser Lys Gly Pro Glu
    4130                4135                4140

Asp Thr Ser Gln Pro Ser Pro Ser Val Glu Glu Thr Ser Ser
    4145                4150                4155

Ser Ser Ser Leu Val Pro Ile His Ala Thr Thr Ser Pro Ser Asn
    4160                4165                4170

Ile Leu Leu Thr Ser Gln Gly His Ser Pro Ser Thr Pro Pro
    4175                4180                4185

Val Thr Ser Val Phe Leu Ser Glu Thr Ser Gly Leu Gly Lys Thr
    4190                4195                4200

Thr Asp Met Ser Arg Ile Ser Leu Glu Pro Gly Thr Ser Leu Pro
    4205                4210                4215

Pro Asn Leu Ser Ser Thr Ala Gly Glu Ala Leu Ser Thr Tyr Glu
    4220                4225                4230

Ala Ser Arg Asp Thr Lys Ala Ile His His Ser Ala Asp Thr Ala
    4235                4240                4245

Val Thr Asn Met Glu Ala Thr Ser Ser Glu Tyr Ser Pro Ile Pro
    4250                4255                4260

Gly His Thr Lys Pro Ser Lys Ala Thr Ser Pro Leu Val Thr Ser
    4265                4270                4275

His Ile Met Gly Asp Ile Thr Ser Ser Thr Ser Val Phe Gly Ser
    4280                4285                4290

Ser Glu Thr Thr Glu Ile Glu Thr Val Ser Ser Val Asn Gln Gly
    4295                4300                4305

Leu Gln Glu Arg Ser Thr Ser Gln Val Ala Ser Ala Thr Glu
    4310                4315                4320

Thr Ser Thr Val Ile Thr His Val Ser Ser Gly Asp Ala Thr Thr
    4325                4330                4335

His Val Thr Lys Thr Gln Ala Thr Phe Ser Ser Gly Thr Ser Ile
    4340                4345                4350

Ser Ser Pro His Gln Phe Ile Thr Ser Thr Asn Thr Phe Thr Asp
    4355                4360                4365

Val Ser Thr Asn Pro Ser Thr Ser Leu Ile Met Thr Glu Ser Ser
    4370                4375                4380

Gly Val Thr Ile Thr Thr Gln Thr Gly Pro Thr Gly Ala Ala Thr
    4385                4390                4395

Gln Gly Pro Tyr Leu Leu Asp Thr Ser Thr Met Pro Tyr Leu Thr
    4400                4405                4410

Glu Thr Pro Leu Ala Val Thr Pro Asp Phe Met Gln Ser Glu Lys
    4415                4420                4425

Thr Thr Leu Ile Ser Lys Gly Pro Lys Asp Val Ser Trp Thr Ser
    4430                4435                4440

Pro Pro Ser Val Ala Glu Thr Ser Tyr Pro Ser Ser Leu Thr Pro
    4445                4450                4455

Phe Leu Val Thr Thr Ile Pro Pro Ala Thr Ser Thr Leu Gln Gly
    4460                4465                4470

Gln His Thr Ser Ser Pro Val Ser Ala Thr Ser Val Leu Thr Ser
    4475                4480                4485

Gly Leu Val Lys Thr Thr Asp Met Leu Asn Thr Ser Met Glu Pro
```

-continued

```
                4490                4495                4500
Val Thr Asn Ser Pro Gln Asn Leu Asn Asn Pro Ser Asn Glu Ile
    4505                4510                4515
Leu Ala Thr Leu Ala Ala Thr Thr Asp Ile Glu Thr Ile His Pro
    4520                4525                4530
Ser Ile Asn Lys Ala Val Thr Asn Met Gly Thr Ala Ser Ser Ala
    4535                4540                4545
His Val Leu His Ser Thr Leu Pro Val Ser Ser Glu Pro Ser Thr
    4550                4555                4560
Ala Thr Ser Pro Met Val Pro Ala Ser Ser Met Gly Asp Ala Leu
    4565                4570                4575
Ala Ser Ile Ser Ile Pro Gly Ser Glu Thr Thr Asp Ile Glu Gly
    4580                4585                4590
Glu Pro Thr Ser Ser Leu Thr Ala Gly Arg Lys Glu Asn Ser Thr
    4595                4600                4605
Leu Gln Glu Met Asn Ser Thr Thr Glu Ser Asn Ile Ile Leu Ser
    4610                4615                4620
Asn Val Ser Val Gly Ala Ile Thr Glu Ala Thr Lys Met Glu Val
    4625                4630                4635
Pro Ser Phe Asp Ala Thr Phe Ile Pro Thr Pro Ala Gln Ser Thr
    4640                4645                4650
Lys Phe Pro Asp Ile Phe Ser Val Ala Ser Ser Arg Leu Ser Asn
    4655                4660                4665
Ser Pro Pro Met Thr Ile Ser Thr His Met Thr Thr Gln Thr
    4670                4675                4680
Gly Ser Ser Gly Ala Thr Ser Lys Ile Pro Leu Ala Leu Asp Thr
    4685                4690                4695
Ser Thr Leu Glu Thr Ser Ala Gly Thr Pro Ser Val Val Thr Glu
    4700                4705                4710
Gly Phe Ala His Ser Lys Ile Thr Thr Ala Met Asn Asn Asp Val
    4715                4720                4725
Lys Asp Val Ser Gln Thr Asn Pro Pro Phe Gln Asp Glu Ala Ser
    4730                4735                4740
Ser Pro Ser Ser Gln Ala Pro Val Leu Val Thr Thr Leu Pro Ser
    4745                4750                4755
Ser Val Ala Phe Thr Pro Gln Trp His Ser Thr Ser Pro Val
    4760                4765                4770
Ser Met Ser Ser Val Leu Thr Ser Ser Leu Val Lys Thr Ala Gly
    4775                4780                4785
Lys Val Asp Thr Ser Leu Glu Thr Val Thr Ser Ser Pro Gln Ser
    4790                4795                4800
Met Ser Asn Thr Leu Asp Asp Ile Ser Val Thr Ser Ala Ala Thr
    4805                4810                4815
Thr Asp Ile Glu Thr Thr His Pro Ser Ile Asn Thr Val Val Thr
    4820                4825                4830
Asn Val Gly Thr Thr Gly Ser Ala Phe Glu Ser His Ser Thr Val
    4835                4840                4845
Ser Ala Tyr Pro Glu Pro Ser Lys Val Thr Ser Pro Asn Val Thr
    4850                4855                4860
Thr Ser Thr Met Glu Asp Thr Ile Ser Arg Ser Ile Pro Lys
    4865                4870                4875
Ser Ser Lys Thr Thr Arg Thr Glu Thr Glu Thr Thr Ser Ser Leu
    4880                4885                4890
```

-continued

Thr Pro Lys Leu Arg Glu Thr Ser Ile Ser Gln Glu Ile Thr Ser
4895                4900            4905

Ser Thr Glu Thr Ser Thr Val Pro Tyr Lys Glu Leu Thr Gly Ala
4910                4915            4920

Thr Thr Glu Val Ser Arg Thr Asp Val Thr Ser Ser Ser Ser Thr
4925                4930            4935

Ser Phe Pro Gly Pro Asp Gln Ser Thr Val Ser Leu Asp Ile Ser
4940                4945            4950

Thr Glu Thr Asn Thr Arg Leu Ser Thr Ser Pro Ile Met Thr Glu
4955                4960            4965

Ser Ala Glu Ile Thr Ile Thr Thr Gln Thr Gly Pro His Gly Ala
4970                4975            4980

Thr Ser Gln Asp Thr Phe Thr Met Asp Pro Ser Asn Thr Thr Pro
4985                4990            4995

Gln Ala Gly Ile His Ser Ala Met Thr His Gly Phe Ser Gln Leu
5000                5005            5010

Asp Val Thr Thr Leu Met Ser Arg Ile Pro Gln Asp Val Ser Trp
5015                5020            5025

Thr Ser Pro Pro Ser Val Asp Lys Thr Ser Ser Pro Ser Ser Phe
5030                5035            5040

Leu Ser Ser Pro Ala Met Thr Thr Pro Ser Leu Ile Ser Ser Thr
5045                5050            5055

Leu Pro Glu Asp Lys Leu Ser Ser Pro Met Thr Ser Leu Leu Thr
5060                5065            5070

Ser Gly Leu Val Lys Ile Thr Asp Ile Leu Arg Thr Arg Leu Glu
5075                5080            5085

Pro Val Thr Ser Ser Leu Pro Asn Phe Ser Ser Thr Ser Asp Lys
5090                5095            5100

Ile Leu Ala Thr Ser Lys Asp Ser Lys Asp Thr Lys Glu Ile Phe
5105                5110            5115

Pro Ser Ile Asn Thr Glu Glu Thr Asn Val Lys Ala Asn Asn Ser
5120                5125            5130

Gly His Glu Ser His Ser Pro Ala Leu Ala Asp Ser Glu Thr Pro
5135                5140            5145

Lys Ala Thr Thr Gln Met Val Ile Thr Thr Thr Val Gly Asp Pro
5150                5155            5160

Ala Pro Ser Thr Ser Met Pro Val His Gly Ser Ser Glu Thr Thr
5165                5170            5175

Asn Ile Lys Arg Glu Pro Thr Tyr Phe Leu Thr Pro Arg Leu Arg
5180                5185            5190

Glu Thr Ser Thr Ser Gln Glu Ser Ser Phe Pro Thr Asp Thr Ser
5195                5200            5205

Phe Leu Leu Ser Lys Val Pro Thr Gly Thr Ile Thr Glu Val Ser
5210                5215            5220

Ser Thr Gly Val Asn Ser Ser Ser Lys Ile Ser Thr Pro Asp His
5225                5230            5235

Asp Lys Ser Thr Val Pro Asp Thr Phe Thr Gly Glu Ile Pro
5240                5245            5250

Arg Val Phe Thr Ser Ser Ile Lys Thr Lys Ser Ala Glu Met Thr
5255                5260            5265

Ile Thr Thr Gln Ala Ser Pro Pro Glu Ser Ala Ser His Ser Thr
5270                5275            5280

```
Leu Pro Leu Asp Thr Ser Thr Thr Leu Ser Gln Gly Gly Thr His
    5285            5290                5295

Ser Thr Val Thr Gln Gly Phe Pro Tyr Ser Glu Val Thr Thr Leu
    5300            5305                5310

Met Gly Met Gly Pro Gly Asn Val Ser Trp Met Thr Thr Pro Pro
    5315            5320                5325

Val Glu Glu Thr Ser Ser Val Ser Ser Leu Met Ser Ser Pro Ala
    5330            5335                5340

Met Thr Ser Pro Ser Pro Val Ser Ser Thr Ser Pro Gln Ser Ile
    5345            5350                5355

Pro Ser Ser Pro Leu Pro Val Thr Ala Leu Pro Thr Ser Val Leu
    5360            5365                5370

Val Thr Thr Thr Asp Val Leu Gly Thr Thr Ser Pro Glu Ser Val
    5375            5380                5385

Thr Ser Ser Pro Pro Asn Leu Ser Ser Ile Thr His Glu Arg Pro
    5390            5395                5400

Ala Thr Tyr Lys Asp Thr Ala His Thr Glu Ala Ala Met His His
    5405            5410                5415

Ser Thr Asn Thr Ala Val Thr Asn Val Gly Thr Ser Gly Ser Gly
    5420            5425                5430

His Lys Ser Gln Ser Ser Val Leu Ala Asp Ser Glu Thr Ser Lys
    5435            5440                5445

Ala Thr Pro Leu Met Ser Thr Thr Ser Thr Leu Gly Asp Thr Ser
    5450            5455                5460

Val Ser Thr Ser Thr Pro Asn Ile Ser Gln Thr Asn Gln Ile Gln
    5465            5470                5475

Thr Glu Pro Thr Ala Ser Leu Ser Pro Arg Leu Arg Glu Ser Ser
    5480            5485                5490

Thr Ser Glu Lys Thr Ser Ser Thr Thr Glu Thr Asn Thr Ala Phe
    5495            5500                5505

Ser Tyr Val Pro Thr Gly Ala Ile Thr Gln Ala Ser Arg Thr Glu
    5510            5515                5520

Ile Ser Ser Ser Arg Thr Ser Ile Ser Asp Leu Asp Arg Pro Thr
    5525            5530                5535

Ile Ala Pro Asp Ile Ser Thr Gly Met Ile Thr Arg Leu Phe Thr
    5540            5545                5550

Ser Pro Ile Met Thr Lys Ser Ala Glu Met Thr Val Thr Thr Gln
    5555            5560                5565

Thr Thr Thr Pro Gly Ala Thr Ser Gln Gly Ile Leu Pro Trp Asp
    5570            5575                5580

Thr Ser Thr Thr Leu Phe Gln Gly Gly Thr His Ser Thr Val Ser
    5585            5590                5595

Gln Gly Phe Pro His Ser Glu Ile Thr Thr Leu Arg Ser Arg Thr
    5600            5605                5610

Pro Gly Asp Val Ser Trp Met Thr Thr Pro Pro Val Glu Glu Thr
    5615            5620                5625

Ser Ser Gly Phe Ser Leu Met Ser Pro Ser Met Thr Ser Pro Ser
    5630            5635                5640

Pro Val Ser Ser Thr Ser Pro Glu Ser Ile Pro Ser Ser Pro Leu
    5645            5650                5655

Pro Val Thr Ala Leu Leu Thr Ser Val Leu Val Thr Thr Thr Asn
    5660            5665                5670

Val Leu Gly Thr Thr Ser Pro Glu Pro Val Thr Ser Ser Pro Pro
```

-continued

```
            5675              5680              5685

Asn Leu Ser Ser Pro Thr Gln Glu Arg Leu Thr Thr Tyr Lys Asp
        5690              5695              5700

Thr Ala His Thr Glu Ala Met His Ala Ser Met His Thr Asn Thr
        5705              5710              5715

Ala Val Ala Asn Val Gly Thr Ser Ile Ser Gly His Glu Ser Gln
        5720              5725              5730

Ser Ser Val Pro Ala Asp Ser His Thr Ser Lys Ala Thr Ser Pro
        5735              5740              5745

Met Gly Ile Thr Phe Ala Met Gly Asp Thr Ser Val Ser Thr Ser
        5750              5755              5760

Thr Pro Ala Phe Phe Glu Thr Arg Ile Gln Thr Glu Ser Thr Ser
        5765              5770              5775

Ser Leu Ile Pro Gly Leu Arg Asp Thr Arg Thr Ser Glu Glu Ile
        5780              5785              5790

Asn Thr Val Thr Glu Thr Ser Thr Val Leu Ser Glu Val Pro Thr
        5795              5800              5805

Thr Thr Thr Thr Glu Val Ser Arg Thr Glu Val Ile Thr Ser Ser
        5810              5815              5820

Arg Thr Thr Ile Ser Gly Pro Asp His Ser Lys Met Ser Pro Tyr
        5825              5830              5835

Ile Ser Thr Glu Thr Ile Thr Arg Leu Ser Thr Phe Pro Phe Val
        5840              5845              5850

Thr Gly Ser Thr Glu Met Ala Ile Thr Asn Gln Thr Gly Pro Ile
        5855              5860              5865

Gly Thr Ile Ser Gln Ala Thr Leu Thr Leu Asp Thr Ser Ser Thr
        5870              5875              5880

Ala Ser Trp Glu Gly Thr His Ser Pro Val Thr Gln Arg Phe Pro
        5885              5890              5895

His Ser Glu Glu Thr Thr Thr Met Ser Arg Ser Thr Lys Gly Val
        5900              5905              5910

Ser Trp Gln Ser Pro Pro Ser Val Glu Glu Thr Ser Ser Pro Ser
        5915              5920              5925

Ser Pro Val Pro Leu Pro Ala Ile Thr Ser His Ser Ser Leu Tyr
        5930              5935              5940

Ser Ala Val Ser Gly Ser Ser Pro Thr Ser Ala Leu Pro Val Thr
        5945              5950              5955

Ser Leu Leu Thr Ser Gly Arg Arg Lys Thr Ile Asp Met Leu Asp
        5960              5965              5970

Thr His Ser Glu Leu Val Thr Ser Ser Leu Pro Ser Ala Ser Ser
        5975              5980              5985

Phe Ser Gly Glu Ile Leu Thr Ser Glu Ala Ser Thr Asn Thr Glu
        5990              5995              6000

Thr Ile His Phe Ser Glu Asn Thr Ala Glu Thr Asn Met Gly Thr
        6005              6010              6015

Thr Asn Ser Met His Lys Leu His Ser Ser Val Ser Ile His Ser
        6020              6025              6030

Gln Pro Ser Gly His Thr Pro Pro Lys Val Thr Gly Ser Met Met
        6035              6040              6045

Glu Asp Ala Ile Val Ser Thr Ser Thr Pro Gly Ser Pro Glu Thr
        6050              6055              6060

Lys Asn Val Asp Arg Asp Ser Thr Ser Pro Leu Thr Pro Glu Leu
        6065              6070              6075
```

-continued

```
Lys Glu Asp Ser Thr Ala Leu Val Met Asn Ser Thr Thr Glu Ser
        6080                6085                6090

Asn Thr Val Phe Ser Ser Val Ser Leu Asp Ala Ala Thr Glu Val
        6095                6100                6105

Ser Arg Ala Glu Val Thr Tyr Tyr Asp Pro Thr Phe Met Pro Ala
        6110                6115                6120

Ser Ala Gln Ser Thr Lys Ser Pro Asp Ile Ser Pro Glu Ala Ser
        6125                6130                6135

Ser Ser His Ser Asn Ser Pro Pro Leu Thr Ile Ser Thr His Lys
        6140                6145                6150

Thr Ile Ala Thr Gln Thr Gly Pro Ser Gly Val Thr Ser Leu Gly
        6155                6160                6165

Gln Leu Thr Leu Asp Thr Ser Thr Ile Ala Thr Ser Ala Gly Thr
        6170                6175                6180

Pro Ser Ala Arg Thr Gln Asp Phe Val Asp Ser Glu Thr Thr Ser
        6185                6190                6195

Val Met Asn Asn Asp Leu Asn Asp Val Leu Lys Thr Ser Pro Phe
        6200                6205                6210

Ser Ala Glu Glu Ala Asn Ser Leu Ser Ser Gln Ala Pro Leu Leu
        6215                6220                6225

Val Thr Thr Ser Pro Ser Pro Val Thr Ser Thr Leu Gln Glu His
        6230                6235                6240

Ser Thr Ser Ser Leu Val Ser Val Thr Ser Val Pro Thr Pro Thr
        6245                6250                6255

Leu Ala Lys Ile Thr Asp Met Asp Thr Asn Leu Glu Pro Val Thr
        6260                6265                6270

Arg Ser Pro Gln Asn Leu Arg Asn Thr Leu Ala Thr Ser Glu Ala
        6275                6280                6285

Thr Thr Asp Thr His Thr Met His Pro Ser Ile Asn Thr Ala Val
        6290                6295                6300

Ala Asn Val Gly Thr Thr Ser Ser Pro Asn Glu Phe Tyr Phe Thr
        6305                6310                6315

Val Ser Pro Asp Ser Asp Pro Tyr Lys Ala Thr Ser Ala Val Val
        6320                6325                6330

Ile Thr Ser Thr Ser Gly Asp Ser Ile Val Ser Thr Ser Met Pro
        6335                6340                6345

Arg Ser Ser Ala Met Lys Lys Ile Glu Ser Glu Thr Thr Phe Ser
        6350                6355                6360

Leu Ile Phe Arg Leu Arg Glu Thr Ser Thr Ser Gln Lys Ile Gly
        6365                6370                6375

Ser Ser Ser Asp Thr Ser Thr Val Phe Asp Lys Ala Phe Thr Ala
        6380                6385                6390

Ala Thr Thr Glu Val Ser Arg Thr Glu Leu Thr Ser Ser Ser Arg
        6395                6400                6405

Thr Ser Ile Gln Gly Thr Glu Lys Pro Thr Met Ser Pro Asp Thr
        6410                6415                6420

Ser Thr Arg Ser Val Thr Met Leu Ser Thr Phe Ala Gly Leu Thr
        6425                6430                6435

Lys Ser Glu Glu Arg Thr Ile Ala Thr Gln Thr Gly Pro His Arg
        6440                6445                6450

Ala Thr Ser Gln Gly Thr Leu Thr Trp Asp Thr Ser Ile Thr Thr
        6455                6460                6465
```

-continued

```
Ser Gln Ala Gly Thr His Ser Ala Met Thr His Gly Phe Ser Gln
    6470                6475                6480

Leu Asp Leu Ser Thr Leu Thr Ser Arg Val Pro Glu Tyr Ile Ser
    6485                6490                6495

Gly Thr Ser Pro Pro Ser Val Glu Lys Thr Ser Ser Ser Ser
    6500                6505                6510

Leu Leu Ser Leu Pro Ala Ile Thr Ser Pro Ser Val Pro Thr
    6515                6520                6525

Thr Leu Pro Glu Ser Arg Pro Ser Ser Pro Val His Leu Thr Ser
    6530                6535                6540

Leu Pro Thr Ser Gly Leu Val Lys Thr Thr Asp Met Leu Ala Ser
    6545                6550                6555

Val Ala Ser Leu Pro Pro Asn Leu Gly Ser Thr Ser His Lys Ile
    6560                6565                6570

Pro Thr Thr Ser Glu Asp Ile Lys Asp Thr Glu Lys Met Tyr Pro
    6575                6580                6585

Ser Thr Asn Ile Ala Val Thr Asn Val Gly Thr Thr Ser Glu
    6590                6595                6600

Lys Glu Ser Tyr Ser Ser Val Pro Ala Tyr Ser Glu Pro Pro Lys
    6605                6610                6615

Val Thr Ser Pro Met Val Thr Ser Phe Asn Ile Arg Asp Thr Ile
    6620                6625                6630

Val Ser Thr Ser Met Pro Gly Ser Ser Glu Ile Thr Arg Ile Glu
    6635                6640                6645

Met Glu Ser Thr Phe Ser Leu Ala His Gly Leu Lys Gly Thr Ser
    6650                6655                6660

Thr Ser Gln Asp Pro Ile Val Ser Thr Glu Lys Ser Ala Val Leu
    6665                6670                6675

His Lys Leu Thr Thr Gly Ala Thr Glu Thr Ser Arg Thr Glu Val
    6680                6685                6690

Ala Ser Ser Arg Arg Thr Ser Ile Pro Gly Pro Asp His Ser Thr
    6695                6700                6705

Glu Ser Pro Asp Ile Ser Thr Glu Val Ile Pro Ser Leu Pro Ile
    6710                6715                6720

Ser Leu Gly Ile Thr Glu Ser Ser Asn Met Thr Ile Ile Thr Arg
    6725                6730                6735

Thr Gly Pro Pro Leu Gly Ser Thr Ser Gln Gly Thr Phe Thr Leu
    6740                6745                6750

Asp Thr Pro Thr Thr Ser Ser Arg Ala Gly Thr His Ser Met Ala
    6755                6760                6765

Thr Gln Glu Phe Pro His Ser Glu Met Thr Thr Val Met Asn Lys
    6770                6775                6780

Asp Pro Glu Ile Leu Ser Trp Thr Ile Pro Pro Ser Ile Glu Lys
    6785                6790                6795

Thr Ser Phe Ser Ser Ser Leu Met Pro Ser Pro Ala Met Thr Ser
    6800                6805                6810

Pro Pro Val Ser Ser Thr Leu Pro Lys Thr Ile His Thr Thr Pro
    6815                6820                6825

Ser Pro Met Thr Ser Leu Leu Thr Pro Ser Leu Val Met Thr Thr
    6830                6835                6840

Asp Thr Leu Gly Thr Ser Pro Glu Pro Thr Thr Ser Ser Pro Pro
    6845                6850                6855

Asn Leu Ser Ser Thr Ser His Glu Ile Leu Thr Thr Asp Glu Asp
```

-continued

```
                6860                6865                6870
Thr  Thr  Ala  Ile  Glu  Ala  Met  His  Pro  Ser  Thr  Ser  Thr  Ala  Ala
     6875                6880                6885

Thr  Asn  Val  Glu  Thr  Thr  Ser  Ser  Gly  His  Gly  Ser  Gln  Ser  Ser
     6890                6895                6900

Val  Leu  Ala  Asp  Ser  Glu  Lys  Thr  Lys  Ala  Thr  Ala  Pro  Met  Asp
     6905                6910                6915

Thr  Thr  Ser  Thr  Met  Gly  His  Thr  Thr  Val  Ser  Thr  Ser  Met  Ser
     6920                6925                6930

Val  Ser  Ser  Glu  Thr  Thr  Lys  Ile  Lys  Arg  Glu  Ser  Thr  Tyr  Ser
     6935                6940                6945

Leu  Thr  Pro  Gly  Leu  Arg  Glu  Thr  Ser  Ile  Ser  Gln  Asn  Ala  Ser
     6950                6955                6960

Phe  Ser  Thr  Asp  Thr  Ser  Ile  Val  Leu  Ser  Glu  Val  Pro  Thr  Gly
     6965                6970                6975

Thr  Thr  Ala  Glu  Val  Ser  Arg  Thr  Glu  Val  Thr  Ser  Ser  Gly  Arg
     6980                6985                6990

Thr  Ser  Ile  Pro  Gly  Pro  Ser  Gln  Ser  Thr  Val  Leu  Pro  Glu  Ile
     6995                7000                7005

Ser  Thr  Arg  Thr  Met  Thr  Arg  Leu  Phe  Ala  Ser  Pro  Thr  Met  Thr
     7010                7015                7020

Glu  Ser  Ala  Glu  Met  Thr  Ile  Pro  Thr  Gln  Thr  Gly  Pro  Ser  Gly
     7025                7030                7035

Ser  Thr  Ser  Gln  Asp  Thr  Leu  Thr  Leu  Asp  Thr  Ser  Thr  Thr  Lys
     7040                7045                7050

Ser  Gln  Ala  Lys  Thr  His  Ser  Thr  Leu  Thr  Gln  Arg  Phe  Pro  His
     7055                7060                7065

Ser  Glu  Met  Thr  Thr  Leu  Met  Ser  Arg  Gly  Pro  Gly  Asp  Met  Ser
     7070                7075                7080

Trp  Gln  Ser  Ser  Pro  Ser  Leu  Glu  Asn  Pro  Ser  Ser  Leu  Pro  Ser
     7085                7090                7095

Leu  Leu  Ser  Leu  Pro  Ala  Thr  Thr  Ser  Pro  Pro  Ile  Ser  Ser
     7100                7105                7110

Thr  Leu  Pro  Val  Thr  Ile  Ser  Ser  Ser  Pro  Leu  Pro  Val  Thr  Ser
     7115                7120                7125

Leu  Leu  Thr  Ser  Ser  Pro  Val  Thr  Thr  Asp  Met  Leu  His  Thr
     7130                7135                7140

Ser  Pro  Glu  Leu  Val  Thr  Ser  Ser  Pro  Pro  Lys  Leu  Ser  His  Thr
     7145                7150                7155

Ser  Asp  Glu  Arg  Leu  Thr  Thr  Gly  Lys  Asp  Thr  Thr  Asn  Thr  Glu
     7160                7165                7170

Ala  Val  His  Pro  Ser  Thr  Asn  Thr  Ala  Ala  Ser  Asn  Val  Glu  Ile
     7175                7180                7185

Pro  Ser  Ser  Gly  His  Glu  Ser  Pro  Ser  Ser  Ala  Leu  Ala  Asp  Ser
     7190                7195                7200

Glu  Thr  Ser  Lys  Ala  Thr  Ser  Pro  Met  Phe  Ile  Thr  Ser  Thr  Gln
     7205                7210                7215

Glu  Asp  Thr  Thr  Val  Ala  Ile  Ser  Thr  Pro  His  Phe  Leu  Glu  Thr
     7220                7225                7230

Ser  Arg  Ile  Gln  Lys  Glu  Ser  Ile  Ser  Ser  Leu  Ser  Pro  Lys  Leu
     7235                7240                7245

Arg  Glu  Thr  Gly  Ser  Ser  Val  Glu  Thr  Ser  Ser  Ala  Ile  Glu  Thr
     7250                7255                7260
```

-continued

Ser Ala Val Leu Ser Glu Val Ser Ile Gly Ala Thr Thr Glu Ile
7265            7270                7275

Ser Arg Thr Glu Val Thr Ser Ser Arg Thr Ser Ile Ser Gly
7280            7285                7290

Ser Ala Glu Ser Thr Met Leu Pro Glu Ile Ser Thr Thr Arg Lys
7295            7300                7305

Ile Ile Lys Phe Pro Thr Ser Pro Ile Leu Ala Glu Ser Ser Glu
7310            7315                7320

Met Thr Ile Lys Thr Gln Thr Ser Pro Pro Gly Ser Thr Ser Glu
7325            7330                7335

Ser Thr Phe Thr Leu Asp Thr Ser Thr Thr Pro Ser Leu Val Ile
7340            7345                7350

Thr His Ser Thr Met Thr Gln Arg Leu Pro His Ser Glu Ile Thr
7355            7360                7365

Thr Leu Val Ser Arg Gly Ala Gly Asp Val Pro Arg Pro Ser Ser
7370            7375                7380

Leu Pro Val Glu Glu Thr Ser Pro Pro Ser Ser Gln Leu Ser Leu
7385            7390                7395

Ser Ala Met Ile Ser Pro Ser Pro Val Ser Ser Thr Leu Pro Ala
7400            7405                7410

Ser Ser His Ser Ser Ser Ala Ser Val Thr Ser Leu Leu Thr Pro
7415            7420                7425

Gly Gln Val Lys Thr Thr Glu Val Leu Asp Ala Ser Ala Glu Pro
7430            7435                7440

Glu Thr Ser Ser Pro Pro Ser Leu Ser Ser Thr Ser Val Glu Ile
7445            7450                7455

Leu Ala Thr Ser Glu Val Thr Thr Asp Thr Glu Lys Ile His Pro
7460            7465                7470

Phe Ser Asn Thr Ala Val Thr Lys Val Gly Thr Ser Ser Ser Gly
7475            7480                7485

His Glu Ser Pro Ser Ser Val Leu Pro Asp Ser Glu Thr Thr Lys
7490            7495                7500

Ala Thr Ser Ala Met Gly Thr Ile Ser Ile Met Gly Asp Thr Ser
7505            7510                7515

Val Ser Thr Leu Thr Pro Ala Leu Ser Asn Thr Arg Lys Ile Gln
7520            7525                7530

Ser Glu Pro Ala Ser Ser Leu Thr Thr Arg Leu Arg Glu Thr Ser
7535            7540                7545

Thr Ser Glu Glu Thr Ser Leu Ala Thr Glu Ala Asn Thr Val Leu
7550            7555                7560

Ser Lys Val Ser Thr Gly Ala Thr Thr Glu Val Ser Arg Thr Glu
7565            7570                7575

Ala Ile Ser Phe Ser Arg Thr Ser Met Ser Gly Pro Glu Gln Ser
7580            7585                7590

Thr Met Ser Gln Asp Ile Ser Ile Gly Thr Ile Pro Arg Ile Ser
7595            7600                7605

Ala Ser Ser Val Leu Thr Glu Ser Ala Lys Met Thr Ile Thr Thr
7610            7615                7620

Gln Thr Gly Pro Ser Glu Ser Thr Leu Glu Ser Thr Leu Asn Leu
7625            7630                7635

Asn Thr Ala Thr Thr Pro Ser Trp Val Glu Thr His Ser Ile Val
7640            7645                7650

```
Ile Gln Gly Phe Pro His Pro Glu Met Thr Thr Ser Met Gly Arg
7655                    7660                7665

Gly Pro Gly Gly Val Ser Trp Pro Ser Pro Phe Val Lys Glu
7670                    7675                7680

Thr Ser Pro Pro Ser Ser Pro Leu Ser Leu Pro Ala Val Thr Ser
7685                    7690                7695

Pro His Pro Val Ser Thr Thr Phe Leu Ala His Ile Pro Pro Ser
7700                    7705                7710

Pro Leu Pro Val Thr Ser Leu Leu Thr Ser Gly Pro Ala Thr Thr
7715                    7720                7725

Thr Asp Ile Leu Gly Thr Ser Thr Glu Pro Gly Thr Ser Ser Ser
7730                    7735                7740

Ser Ser Leu Ser Thr Thr Ser His Glu Arg Leu Thr Thr Tyr Lys
7745                    7750                7755

Asp Thr Ala His Thr Glu Ala Val His Pro Ser Thr Asn Thr Gly
7760                    7765                7770

Gly Thr Asn Val Ala Thr Thr Ser Ser Gly Tyr Lys Ser Gln Ser
7775                    7780                7785

Ser Val Leu Ala Asp Ser Ser Pro Met Cys Thr Thr Ser Thr Met
7790                    7795                7800

Gly Asp Thr Ser Val Leu Thr Ser Thr Pro Ala Phe Leu Glu Thr
7805                    7810                7815

Arg Arg Ile Gln Thr Glu Leu Ala Ser Ser Leu Thr Pro Gly Leu
7820                    7825                7830

Arg Glu Ser Ser Gly Ser Glu Gly Thr Ser Ser Gly Thr Lys Met
7835                    7840                7845

Ser Thr Val Leu Ser Lys Val Pro Thr Gly Ala Thr Thr Glu Ile
7850                    7855                7860

Ser Lys Glu Asp Val Thr Ser Ile Pro Gly Pro Ala Gln Ser Thr
7865                    7870                7875

Ile Ser Pro Asp Ile Ser Thr Arg Thr Val Ser Trp Phe Ser Thr
7880                    7885                7890

Ser Pro Val Met Thr Glu Ser Ala Glu Ile Thr Met Asn Thr His
7895                    7900                7905

Thr Ser Pro Leu Gly Ala Thr Gln Gly Thr Ser Thr Leu Asp
7910                    7915                7920

Thr Ser Ser Thr Thr Ser Leu Thr Met Thr His Ser Thr Ile Ser
7925                    7930                7935

Gln Gly Phe Ser His Ser Gln Met Ser Thr Leu Met Arg Arg Gly
7940                    7945                7950

Pro Glu Asp Val Ser Trp Met Ser Pro Pro Leu Leu Glu Lys Thr
7955                    7960                7965

Arg Pro Ser Phe Ser Leu Met Ser Ser Pro Ala Thr Thr Ser Pro
7970                    7975                7980

Ser Pro Val Ser Ser Thr Leu Pro Glu Ser Ile Ser Ser Ser Pro
7985                    7990                7995

Leu Pro Val Thr Ser Leu Leu Thr Ser Gly Leu Ala Lys Thr Thr
8000                    8005                8010

Asp Met Leu His Lys Ser Ser Glu Pro Val Thr Asn Ser Pro Ala
8015                    8020                8025

Asn Leu Ser Ser Thr Ser Val Glu Ile Leu Ala Thr Ser Glu Val
8030                    8035                8040

Thr Thr Asp Thr Glu Lys Thr His Pro Ser Ser Asn Arg Thr Val
```

-continued

```
            8045                8050                 8055
Thr Asp Val Gly Thr Ser  Ser Gly His Glu Ser  Thr Ser Phe
        8060                 8065                 8070
Val Leu Ala Asp Ser Gln  Thr Ser Lys Val Thr  Ser Pro Met Val
        8075                 8080                 8085
Ile Thr Ser Thr Met Glu  Asp Thr Ser Val Ser  Thr Ser Thr Pro
        8090                 8095                 8100
Gly Phe Phe Glu Thr Ser  Arg Ile Gln Thr Glu  Pro Thr Ser Ser
        8105                 8110                 8115
Leu Thr Leu Gly Leu Arg  Lys Thr Ser Ser Glu  Gly Thr Ser
        8120                 8125                 8130
Leu Ala Thr Glu Met Ser  Thr Val Leu Ser Gly  Val Pro Thr Gly
        8135                 8140                 8145
Ala Thr Ala Glu Val Ser  Arg Thr Glu Val Thr  Ser Ser Ser Arg
        8150                 8155                 8160
Thr Ser Ile Ser Gly Phe  Ala Gln Leu Thr Val  Ser Pro Glu Thr
        8165                 8170                 8175
Ser Thr Glu Thr Ile Thr  Arg Leu Pro Thr Ser  Ser Ile Met Thr
        8180                 8185                 8190
Glu Ser Ala Glu Met Met  Ile Lys Thr Gln Thr  Asp Pro Pro Gly
        8195                 8200                 8205
Ser Thr Pro Glu Ser Thr  His Thr Val Asp Ile  Ser Thr Thr Pro
        8210                 8215                 8220
Asn Trp Val Glu Thr His  Ser Thr Val Thr Gln  Arg Phe Ser His
        8225                 8230                 8235
Ser Glu Met Thr Thr Leu  Val Ser Arg Ser Pro  Gly Asp Met Leu
        8240                 8245                 8250
Trp Pro Ser Gln Ser Ser  Val Glu Glu Thr Ser  Ser Ala Ser Ser
        8255                 8260                 8265
Leu Leu Ser Leu Pro Ala  Thr Thr Ser Pro Ser  Pro Val Ser Ser
        8270                 8275                 8280
Thr Leu Val Glu Asp Phe  Pro Ser Ala Ser Leu  Pro Val Thr Ser
        8285                 8290                 8295
Leu Leu Asn Pro Gly Leu  Val Ile Thr Thr Asp  Arg Met Gly Ile
        8300                 8305                 8310
Ser Arg Glu Pro Gly Thr  Ser Ser Thr Ser Asn  Leu Ser Ser Thr
        8315                 8320                 8325
Ser His Glu Arg Leu Thr  Thr Leu Glu Asp Thr  Val Asp Thr Glu
        8330                 8335                 8340
Asp Met Gln Pro Ser Thr  His Thr Ala Val Thr  Asn Val Arg Thr
        8345                 8350                 8355
Ser Ile Ser Gly His Glu  Ser Gln Ser Ser Val  Leu Ser Asp Ser
        8360                 8365                 8370
Glu Thr Pro Lys Ala Thr  Ser Pro Met Gly Thr  Thr Tyr Thr Met
        8375                 8380                 8385
Gly Glu Thr Ser Val Ser  Ile Ser Thr Ser Asp  Phe Phe Glu Thr
        8390                 8395                 8400
Ser Arg Ile Gln Ile Glu  Pro Thr Ser Ser Leu  Thr Ser Gly Leu
        8405                 8410                 8415
Arg Glu Thr Ser Ser Ser  Glu Arg Ile Ser Ser  Ala Thr Glu Gly
        8420                 8425                 8430
Ser Thr Val Leu Ser Glu  Val Pro Ser Gly Ala  Thr Thr Glu Val
        8435                 8440                 8445
```

```
Ser Arg Thr Glu Val Ile Ser Ser Arg Gly Thr Ser Met Ser Gly
    8450            8455            8460

Pro Asp Gln Phe Thr Ile Ser Pro Asp Ile Ser Thr Glu Ala Ile
    8465            8470            8475

Thr Arg Leu Ser Thr Ser Pro Ile Met Thr Glu Ser Ala Glu Ser
    8480            8485            8490

Ala Ile Thr Ile Glu Thr Gly Ser Pro Gly Ala Thr Ser Glu Gly
    8495            8500            8505

Thr Leu Thr Leu Asp Thr Ser Thr Thr Thr Phe Trp Ser Gly Thr
    8510            8515            8520

His Ser Thr Ala Ser Pro Gly Phe Ser His Ser Glu Met Thr Thr
    8525            8530            8535

Leu Met Ser Arg Thr Pro Gly Asp Val Pro Trp Pro Ser Leu Pro
    8540            8545            8550

Ser Val Glu Glu Ala Ser Ser Val Ser Ser Ser Leu Ser Ser Pro
    8555            8560            8565

Ala Met Thr Ser Thr Ser Phe Phe Ser Thr Leu Pro Glu Ser Ile
    8570            8575            8580

Ser Ser Ser Pro His Pro Val Thr Ala Leu Leu Thr Leu Gly Pro
    8585            8590            8595

Val Lys Thr Thr Asp Met Leu Arg Thr Ser Ser Glu Pro Glu Thr
    8600            8605            8610

Ser Ser Pro Pro Asn Leu Ser Ser Thr Ser Ala Glu Ile Leu Ala
    8615            8620            8625

Thr Ser Glu Val Thr Lys Asp Arg Glu Lys Ile His Pro Ser Ser
    8630            8635            8640

Asn Thr Pro Val Val Asn Val Gly Thr Val Ile Tyr Lys His Leu
    8645            8650            8655

Ser Pro Ser Ser Val Leu Ala Asp Leu Val Thr Thr Lys Pro Thr
    8660            8665            8670

Ser Pro Met Ala Thr Thr Ser Thr Leu Gly Asn Thr Ser Val Ser
    8675            8680            8685

Thr Ser Thr Pro Ala Phe Pro Glu Thr Met Met Thr Gln Pro Thr
    8690            8695            8700

Ser Ser Leu Thr Ser Gly Leu Arg Glu Ile Ser Thr Ser Gln Glu
    8705            8710            8715

Thr Ser Ser Ala Thr Glu Arg Ser Ala Ser Leu Ser Gly Met Pro
    8720            8725            8730

Thr Gly Ala Thr Thr Lys Val Ser Arg Thr Glu Ala Leu Ser Leu
    8735            8740            8745

Gly Arg Thr Ser Thr Pro Gly Pro Ala Gln Ser Thr Ile Ser Pro
    8750            8755            8760

Glu Ile Ser Thr Glu Thr Ile Thr Arg Ile Ser Thr Pro Leu Thr
    8765            8770            8775

Thr Thr Gly Ser Ala Glu Met Thr Ile Thr Pro Lys Thr Gly His
    8780            8785            8790

Ser Gly Ala Ser Ser Gln Gly Thr Phe Thr Leu Asp Thr Ser Ser
    8795            8800            8805

Arg Ala Ser Trp Pro Gly Thr His Ser Ala Ala Thr His Arg Ser
    8810            8815            8820

Pro His Ser Gly Met Thr Thr Pro Met Ser Arg Gly Pro Glu Asp
    8825            8830            8835
```

-continued

| | | | | | | | | | | | |
|---|---|---|---|---|---|---|---|---|---|---|---|
|Val|Ser|Trp|Pro|Ser|Arg|Pro|Ser|Val|Glu|Lys|Thr|
| |8840| | | |8845| | | |8850| | |
|Ser|Pro|Pro| | | | | | | | | |

Ser Ser Leu Val Ser Leu Ser Ala Val Thr Ser Pro
    8855            8860            8865
Ser Pro Leu

Tyr Ser Thr Pro Ser Glu Ser Ser His Ser Ser Pro
    8870            8875            8880
Leu Arg Val

Thr Ser Leu Phe Thr Pro Val Met Met Lys Thr Thr
    8885            8890            8895
Asp Met Leu

Asp Thr Ser Leu Glu Pro Val Thr Thr Ser Pro Pro
    8900            8905            8910
Ser Met Asn

Ile Thr Ser Asp Glu Ser Leu Ala Thr Ser Lys Ala
    8915            8920            8925
Thr Met Glu

Thr Glu Ala Ile Gln Leu Ser Glu Asn Thr Ala Val
    8930            8935            8940
Thr Gln Met

Gly Thr Ile Ser Ala Arg Gln Glu Phe Tyr Ser Ser
    8945            8950            8955
Tyr Pro Gly

Leu Pro Glu Pro Ser Lys Val Thr Ser Pro Val Val
    8960            8965            8970
Thr Ser Ser

Thr Ile Lys Asp Ile Val Ser Thr Thr Ile Pro Ala
    8975            8980            8985
Ser Ser Glu

Ile Thr Arg Ile Glu Met Glu Ser Thr Ser Thr Leu
    8990            8995            9000
Thr Pro Thr

Pro Arg Glu Thr Ser Thr Ser Gln Glu Ile His Ser
    9005            9010            9015
Ala Thr Lys

Pro Ser Thr Val Pro Tyr Lys Ala Leu Thr Ser Ala
    9020            9025            9030
Thr Ile Glu

Asp Ser Met Thr Gln Val Met Ser Ser Ser Arg Gly
    9035            9040            9045
Pro Ser Pro

Asp Gln Ser Thr Met Ser Gln Asp Ile Ser Thr Glu
    9050            9055            9060
Val Ile Thr

Arg Leu Ser Thr Ser Pro Ile Lys Thr Glu Ser Thr
    9065            9070            9075
Glu Met Thr

Ile Thr Thr Gln Thr Gly Ser Pro Gly Ala Thr Ser
    9080            9085            9090
Arg Gly Thr

Leu Thr Leu Asp Thr Ser Thr Thr Phe Met Ser Gly
    9095            9100            9105
Thr His Ser

Thr Ala Ser Gln Gly Phe Ser His Ser Gln Met Thr
    9110            9115            9120
Ala Leu Met

Ser Arg Thr Pro Gly Asp Val Pro Trp Leu Ser His
    9125            9130            9135
Pro Ser Val

Glu Glu Ala Ser Ser Ala Ser Phe Ser Leu Ser Ser
    9140            9145            9150
Pro Val Met

Thr Ser Ser Ser Pro Val Ser Ser Thr Leu Pro Asp
    9155            9160            9165
Ser Ile His

Ser Ser Ser Leu Pro Val Thr Ser Leu Leu Thr Ser
    9170            9175            9180
Gly Leu Val

Lys Thr Thr Glu Leu Leu Gly Thr Ser Ser Glu Pro
    9185            9190            9195
Glu Thr Ser

Ser Pro Pro Asn Leu Ser Ser Thr Ser Ala Glu Ile
    9200            9205            9210
Leu Ala Ile

Thr Glu Val Thr Thr Asp Thr Glu Lys Leu Glu Met
    9215            9220            9225
Thr Asn Val

Val Thr Ser Gly Tyr Thr His Glu Ser Pro Ser Ser
Val Leu Ala

```
                  9230            9235            9240

Asp Ser Val Thr Thr Lys Ala Thr Ser Ser Met Gly Ile Thr Tyr
    9245            9250            9255

Pro Thr Gly Asp Thr Asn Val Leu Thr Ser Thr Pro Ala Phe Ser
    9260            9265            9270

Asp Thr Ser Arg Ile Gln Thr Lys Ser Lys Leu Ser Leu Thr Pro
    9275            9280            9285

Gly Leu Met Glu Thr Ser Ile Ser Glu Glu Thr Ser Ser Ala Thr
    9290            9295            9300

Glu Lys Ser Thr Val Leu Ser Ser Val Pro Thr Gly Ala Thr Thr
    9305            9310            9315

Glu Val Ser Arg Thr Glu Ala Ile Ser Ser Ser Arg Thr Ser Ile
    9320            9325            9330

Pro Gly Pro Ala Gln Ser Thr Met Ser Ser Asp Thr Ser Met Glu
    9335            9340            9345

Thr Ile Thr Arg Ile Ser Thr Pro Leu Thr Arg Lys Glu Ser Thr
    9350            9355            9360

Asp Met Ala Ile Thr Pro Lys Thr Gly Pro Ser Gly Ala Thr Ser
    9365            9370            9375

Gln Gly Thr Phe Thr Leu Asp Ser Ser Ser Thr Ala Ser Trp Pro
    9380            9385            9390

Gly Thr His Ser Ala Thr Thr Gln Arg Phe Pro Gln Ser Val Val
    9395            9400            9405

Thr Thr Pro Met Ser Arg Gly Pro Glu Asp Val Ser Trp Pro Ser
    9410            9415            9420

Pro Leu Ser Val Glu Lys Asn Ser Pro Ser Ser Leu Val Ser
    9425            9430            9435

Ser Ser Ser Val Thr Ser Pro Ser Pro Leu Tyr Ser Thr Pro Ser
    9440            9445            9450

Gly Ser Ser His Ser Ser Pro Val Pro Val Thr Ser Leu Phe Thr
    9455            9460            9465

Ser Ile Met Met Lys Ala Thr Asp Met Leu Asp Ala Ser Leu Glu
    9470            9475            9480

Pro Glu Thr Thr Ser Ala Pro Asn Met Asn Ile Thr Ser Asp Glu
    9485            9490            9495

Ser Leu Ala Ala Ser Lys Ala Thr Thr Glu Thr Glu Ala Ile His
    9500            9505            9510

Val Phe Glu Asn Thr Ala Ala Ser His Val Glu Thr Thr Ser Ala
    9515            9520            9525

Thr Glu Glu Leu Tyr Ser Ser Ser Pro Gly Phe Ser Glu Pro Thr
    9530            9535            9540

Lys Val Ile Ser Pro Val Val Thr Ser Ser Ser Ile Arg Asp Asn
    9545            9550            9555

Met Val Ser Thr Thr Met Pro Gly Ser Ser Gly Ile Thr Arg Ile
    9560            9565            9570

Glu Ile Glu Ser Met Ser Ser Leu Thr Pro Gly Leu Arg Glu Thr
    9575            9580            9585

Arg Thr Ser Gln Asp Ile Thr Ser Ser Thr Glu Thr Ser Thr Val
    9590            9595            9600

Leu Tyr Lys Met Pro Ser Gly Ala Thr Pro Glu Val Ser Arg Thr
    9605            9610            9615

Glu Val Met Pro Ser Ser Arg Thr Ser Ile Pro Gly Pro Ala Gln
    9620            9625            9630
```

-continued

```
Ser Thr Met Ser Leu Asp Ile Ser Asp Glu Val Val Thr Arg Leu
    9635                9640            9645

Ser Thr Ser Pro Ile Met Thr Glu Ser Ala Glu Ile Thr Ile Thr
    9650                9655            9660

Thr Gln Thr Gly Tyr Ser Leu Ala Thr Ser Gln Val Thr Leu Pro
    9665                9670            9675

Leu Gly Thr Ser Met Thr Phe Leu Ser Gly Thr His Ser Thr Met
    9680                9685            9690

Ser Gln Gly Leu Ser His Ser Glu Met Thr Asn Leu Met Ser Arg
    9695                9700            9705

Gly Pro Glu Ser Leu Ser Trp Thr Ser Pro Arg Phe Val Glu Thr
    9710                9715            9720

Thr Arg Ser Ser Ser Ser Leu Thr Ser Leu Pro Leu Thr Thr Ser
    9725                9730            9735

Leu Ser Pro Val Ser Ser Thr Leu Leu Asp Ser Ser Pro Ser Ser
    9740                9745            9750

Pro Leu Pro Val Thr Ser Leu Ile Leu Pro Gly Leu Val Lys Thr
    9755                9760            9765

Thr Glu Val Leu Asp Thr Ser Ser Glu Pro Lys Thr Ser Ser Ser
    9770                9775            9780

Pro Asn Leu Ser Ser Thr Ser Val Glu Ile Pro Ala Thr Ser Glu
    9785                9790            9795

Ile Met Thr Asp Thr Glu Lys Ile His Pro Ser Ser Asn Thr Ala
    9800                9805            9810

Val Ala Lys Val Arg Thr Ser Ser Ser Val His Glu Ser His Ser
    9815                9820            9825

Ser Val Leu Ala Asp Ser Glu Thr Thr Ile Thr Ile Pro Ser Met
    9830                9835            9840

Gly Ile Thr Ser Ala Val Asp Asp Thr Thr Val Phe Thr Ser Asn
    9845                9850            9855

Pro Ala Phe Ser Glu Thr Arg Arg Ile Pro Thr Glu Pro Thr Phe
    9860                9865            9870

Ser Leu Thr Pro Gly Phe Arg Glu Thr Ser Thr Ser Glu Glu Thr
    9875                9880            9885

Thr Ser Ile Thr Glu Thr Ser Ala Val Leu Tyr Gly Val Pro Thr
    9890                9895            9900

Ser Ala Thr Thr Glu Val Ser Met Thr Glu Ile Met Ser Ser Asn
    9905                9910            9915

Arg Ile His Ile Pro Asp Ser Asp Gln Ser Thr Met Ser Pro Asp
    9920                9925            9930

Ile Ile Thr Glu Val Ile Thr Arg Leu Ser Ser Ser Ser Met Met
    9935                9940            9945

Ser Glu Ser Thr Gln Met Thr Ile Thr Thr Gln Lys Ser Ser Pro
    9950                9955            9960

Gly Ala Thr Ala Gln Ser Thr Leu Thr Leu Ala Thr Thr Thr Ala
    9965                9970            9975

Pro Leu Ala Arg Thr His Ser Thr Val Pro Pro Arg Phe Leu His
    9980                9985            9990

Ser Glu Met Thr Thr Leu Met Ser Arg Ser Pro Glu Asn Pro Ser
    9995               10000           10005

Trp Lys Ser Ser Leu Phe Val Glu Lys Thr Ser Ser Ser Ser
   10010               10015           10020
```

-continued

```
Leu Leu     Ser Leu Pro Val Thr     Thr Ser Pro Ser Val     Ser Ser Thr
    10025                   10030                   10035

Leu Pro     Gln Ser Ile Pro Ser     Ser Ser Phe Ser Val     Thr Ser Leu
    10040                   10045                   10050

Leu Thr     Pro Gly Met Val Lys     Thr Thr Asp Thr Ser     Thr Glu Pro
    10055                   10060                   10065

Gly Thr     Ser Leu Ser Pro Asn     Leu Ser Gly Thr Ser     Val Glu Ile
    10070                   10075                   10080

Leu Ala     Ala Ser Glu Val Thr     Thr Asp Thr Glu Lys     Ile His Pro
    10085                   10090                   10095

Ser Ser     Ser Met Ala Val Thr     Asn Val Gly Thr Thr     Ser Ser Gly
    10100                   10105                   10110

His Glu     Leu Tyr Ser Ser Val     Ser Ile His Ser Glu     Pro Ser Lys
    10115                   10120                   10125

Ala Thr     Tyr Pro Val Gly Thr     Pro Ser Ser Met Ala     Glu Thr Ser
    10130                   10135                   10140

Ile Ser     Thr Ser Met Pro Ala     Asn Phe Glu Thr Thr     Gly Phe Glu
    10145                   10150                   10155

Ala Glu     Pro Phe Ser His Leu     Thr Ser Gly Phe Arg     Lys Thr Asn
    10160                   10165                   10170

Met Ser     Leu Asp Thr Ser Ser     Val Thr Pro Thr Asn     Thr Pro Ser
    10175                   10180                   10185

Ser Pro     Gly Ser Thr His Leu     Leu Gln Ser Ser Lys     Thr Asp Phe
    10190                   10195                   10200

Thr Ser     Ser Ala Lys Thr Ser     Ser Pro Asp Trp Pro     Pro Ala Ser
    10205                   10210                   10215

Gln Tyr     Thr Glu Ile Pro Val     Asp Ile Ile Thr Pro     Phe Asn Ala
    10220                   10225                   10230

Ser Pro     Ser Ile Thr Glu Ser     Thr Gly Ile Thr Ser     Phe Pro Glu
    10235                   10240                   10245

Ser Arg     Phe Thr Met Ser Val     Thr Glu Ser Thr His     His Leu Ser
    10250                   10255                   10260

Thr Asp     Leu Leu Pro Ser Ala     Glu Thr Ile Ser Thr     Gly Thr Val
    10265                   10270                   10275

Met Pro     Ser Leu Ser Glu Ala     Met Thr Ser Phe Ala     Thr Thr Gly
    10280                   10285                   10290

Val Pro     Arg Ala Ile Ser Gly     Ser Gly Ser Pro Phe     Ser Arg Thr
    10295                   10300                   10305

Glu Ser     Gly Pro Gly Asp Ala     Thr Leu Ser Thr Ile     Ala Glu Ser
    10310                   10315                   10320

Leu Pro     Ser Ser Thr Pro Val     Pro Phe Ser Ser Ser     Thr Phe Thr
    10325                   10330                   10335

Thr Thr     Asp Ser Ser Thr Ile     Pro Ala Leu His Glu     Ile Thr Ser
    10340                   10345                   10350

Ser Ser     Ala Thr Pro Tyr Arg     Val Asp Thr Ser Leu     Gly Thr Glu
    10355                   10360                   10365

Ser Ser     Thr Thr Glu Gly Arg     Leu Val Met Val Ser     Thr Leu Asp
    10370                   10375                   10380

Thr Ser     Ser Gln Pro Gly Arg     Thr Ser Ser Ser Pro     Ile Leu Asp
    10385                   10390                   10395

Thr Arg     Met Thr Glu Ser Val     Glu Leu Gly Thr Val     Thr Ser Ala
    10400                   10405                   10410

Tyr Gln     Val Pro Ser Leu Ser     Thr Arg Leu Thr Arg     Thr Asp Gly
```

-continued

```
            10415               10420               10425
Ile Met  Glu His Ile Thr Lys  Ile Pro Asn Glu Ala  Ala His Arg
    10430               10435               10440
Gly Thr  Ile Arg Pro Val Lys  Gly Pro Gln Thr Ser  Thr Ser Pro
    10445               10450               10455
Ala Ser  Pro Lys Gly Leu His  Thr Gly Gly Thr Lys  Arg Met Glu
    10460               10465               10470
Thr Thr  Thr Thr Ala Leu Lys  Thr Thr Thr Thr Ala  Leu Lys Thr
    10475               10480               10485
Thr Ser  Arg Ala Thr Leu Thr  Thr Ser Val Tyr Thr  Pro Thr Leu
    10490               10495               10500
Gly Thr  Leu Thr Pro Leu Asn  Ala Ser Met Gln Met  Ala Ser Thr
    10505               10510               10515
Ile Pro  Thr Glu Met Met Ile  Thr Thr Pro Tyr Val  Phe Pro Asp
    10520               10525               10530
Val Pro  Glu Thr Thr Ser Ser  Leu Ala Thr Ser Leu  Gly Ala Glu
    10535               10540               10545
Thr Ser  Thr Ala Leu Pro Arg  Thr Thr Pro Ser Val  Phe Asn Arg
    10550               10555               10560
Glu Ser  Glu Thr Thr Ala Ser  Leu Val Ser Arg Ser  Gly Ala Glu
    10565               10570               10575
Arg Ser  Pro Val Ile Gln Thr  Leu Asp Val Ser Ser  Ser Glu Pro
    10580               10585               10590
Asp Thr  Thr Ala Ser Trp Val  Ile His Pro Ala Glu  Thr Ile Pro
    10595               10600               10605
Thr Val  Ser Lys Thr Thr Pro  Asn Phe Phe His Ser  Glu Leu Asp
    10610               10615               10620
Thr Val  Ser Ser Thr Ala Thr  Ser His Gly Ala Asp  Val Ser Ser
    10625               10630               10635
Ala Ile  Pro Thr Asn Ile Ser  Pro Ser Glu Leu Asp  Ala Leu Thr
    10640               10645               10650
Pro Leu  Val Thr Ile Ser Gly  Thr Asp Thr Ser Thr  Thr Phe Pro
    10655               10660               10665
Thr Leu  Thr Lys Ser Pro His  Glu Thr Glu Thr Arg  Thr Thr Trp
    10670               10675               10680
Leu Thr  His Pro Ala Glu Thr  Ser Ser Thr Ile Pro  Arg Thr Ile
    10685               10690               10695
Pro Asn  Phe Ser His His Glu  Ser Asp Ala Thr Pro  Ser Ile Ala
    10700               10705               10710
Thr Ser  Pro Gly Ala Glu Thr  Ser Ser Ala Ile Pro  Ile Met Thr
    10715               10720               10725
Val Ser  Pro Gly Ala Glu Asp  Leu Val Thr Ser Gln  Val Thr Ser
    10730               10735               10740
Ser Gly  Thr Asp Arg Asn Met  Thr Ile Pro Thr Leu  Thr Leu Ser
    10745               10750               10755
Pro Gly  Glu Pro Lys Thr Ile  Ala Ser Leu Val Thr  His Pro Glu
    10760               10765               10770
Ala Gln  Thr Ser Ser Ala Ile  Pro Thr Ser Thr Ile  Ser Pro Ala
    10775               10780               10785
Val Ser  Arg Leu Val Thr Ser  Met Val Thr Ser Leu  Ala Ala Lys
    10790               10795               10800
Thr Ser  Thr Thr Asn Arg Ala  Leu Thr Asn Ser Pro  Gly Glu Pro
    10805               10810               10815
```

-continued

| | | | | | | | | | | | |
|---|---|---|---|---|---|---|---|---|---|---|---|
| Ala | Thr | Thr | Val | Ser | Leu | Val | Thr | His | Pro | Ala | Gln | Thr | Ser | Pro |
| 10820 | | | | 10825 | | | | 10830 | | | |
| Thr | Val | Pro | Trp | Thr | Thr | Ser | Ile | Phe | Phe | His | Ser | Lys | Ser | Asp |
| 10835 | | | | 10840 | | | | 10845 | | | |
| Thr | Thr | Pro | Ser | Met | Thr | Thr | Ser | His | Gly | Ala | Glu | Ser | Ser | Ser |
| 10850 | | | | 10855 | | | | 10860 | | | |
| Ala | Val | Pro | Thr | Pro | Thr | Val | Ser | Thr | Glu | Val | Pro | Gly | Val | Val |
| 10865 | | | | 10870 | | | | 10875 | | | |
| Thr | Pro | Leu | Val | Thr | Ser | Ser | Arg | Ala | Val | Ile | Ser | Thr | Thr | Ile |
| 10880 | | | | 10885 | | | | 10890 | | | |
| Pro | Ile | Leu | Thr | Leu | Ser | Pro | Gly | Glu | Pro | Glu | Thr | Thr | Pro | Ser |
| 10895 | | | | 10900 | | | | 10905 | | | |
| Met | Ala | Thr | Ser | His | Gly | Glu | Glu | Ala | Ser | Ser | Ala | Ile | Pro | Thr |
| 10910 | | | | 10915 | | | | 10920 | | | |
| Pro | Thr | Val | Ser | Pro | Gly | Val | Pro | Gly | Val | Val | Thr | Ser | Leu | Val |
| 10925 | | | | 10930 | | | | 10935 | | | |
| Thr | Ser | Ser | Arg | Ala | Val | Thr | Ser | Thr | Thr | Ile | Pro | Ile | Leu | Thr |
| 10940 | | | | 10945 | | | | 10950 | | | |
| Phe | Ser | Leu | Gly | Glu | Pro | Glu | Thr | Thr | Pro | Ser | Met | Ala | Thr | Ser |
| 10955 | | | | 10960 | | | | 10965 | | | |
| His | Gly | Thr | Glu | Ala | Gly | Ser | Ala | Val | Pro | Thr | Val | Leu | Pro | Glu |
| 10970 | | | | 10975 | | | | 10980 | | | |
| Val | Pro | Gly | Met | Val | Thr | Ser | Leu | Val | Ala | Ser | Ser | Arg | Ala | Val |
| 10985 | | | | 10990 | | | | 10995 | | | |
| Thr | Ser | Thr | Thr | Leu | Pro | Thr | Leu | Thr | Leu | Ser | Pro | Gly | Glu | Pro |
| 11000 | | | | 11005 | | | | 11010 | | | |
| Glu | Thr | Thr | Pro | Ser | Met | Ala | Thr | Ser | His | Gly | Ala | Glu | Ala | Ser |
| 11015 | | | | 11020 | | | | 11025 | | | |
| Ser | Thr | Val | Pro | Thr | Val | Ser | Pro | Glu | Val | Pro | Gly | Val | Val | Thr |
| 11030 | | | | 11035 | | | | 11040 | | | |
| Ser | Leu | Val | Thr | Ser | Ser | Ser | Gly | Val | Asn | Ser | Thr | Ser | Ile | Pro |
| 11045 | | | | 11050 | | | | 11055 | | | |
| Thr | Leu | Ile | Leu | Ser | Pro | Gly | Glu | Leu | Glu | Thr | Thr | Pro | Ser | Met |
| 11060 | | | | 11065 | | | | 11070 | | | |
| Ala | Thr | Ser | His | Gly | Ala | Glu | Ala | Ser | Ser | Ala | Val | Pro | Thr | Pro |
| 11075 | | | | 11080 | | | | 11085 | | | |
| Thr | Val | Ser | Pro | Gly | Val | Ser | Gly | Val | Val | Thr | Pro | Leu | Val | Thr |
| 11090 | | | | 11095 | | | | 11100 | | | |
| Ser | Ser | Arg | Ala | Val | Thr | Ser | Thr | Thr | Ile | Pro | Ile | Leu | Thr | Leu |
| 11105 | | | | 11110 | | | | 11115 | | | |
| Ser | Ser | Ser | Glu | Pro | Glu | Thr | Thr | Pro | Ser | Met | Ala | Thr | Ser | His |
| 11120 | | | | 11125 | | | | 11130 | | | |
| Gly | Val | Glu | Ala | Ser | Ser | Ala | Val | Leu | Thr | Val | Ser | Pro | Glu | Val |
| 11135 | | | | 11140 | | | | 11145 | | | |
| Pro | Gly | Met | Val | Thr | Ser | Leu | Val | Thr | Ser | Ser | Arg | Ala | Val | Thr |
| 11150 | | | | 11155 | | | | 11160 | | | |
| Ser | Thr | Thr | Ile | Pro | Thr | Leu | Thr | Ile | Ser | Ser | Asp | Glu | Pro | Glu |
| 11165 | | | | 11170 | | | | 11175 | | | |
| Thr | Thr | Thr | Ser | Leu | Val | Thr | His | Ser | Glu | Ala | Lys | Met | Ile | Ser |
| 11180 | | | | 11185 | | | | 11190 | | | |
| Ala | Ile | Pro | Thr | Leu | Ala | Val | Ser | Pro | Thr | Val | Gln | Gly | Leu | Val |
| 11195 | | | | 11200 | | | | 11205 | | | |

```
Thr Ser Leu Val Thr Ser Ser     Gly Ser Glu Thr Ser     Ala Phe Ser
    11210               11215                   11220

Asn Leu Thr Val Ala Ser Ser     Gln Pro Glu Thr Ile     Asp Ser Trp
    11225               11230                   11235

Val Ala His Pro Gly Thr Glu     Ala Ser Ser Val Val     Pro Thr Leu
    11240               11245                   11250

Thr Val Ser Thr Gly Glu Pro     Phe Thr Asn Ile Ser     Leu Val Thr
    11255               11260                   11265

His Pro Ala Glu Ser Ser Ser     Thr Leu Pro Arg Thr     Thr Ser Arg
    11270               11275                   11280

Phe Ser His Ser Glu Leu Asp     Thr Met Pro Ser Thr     Val Thr Ser
    11285               11290                   11295

Pro Glu Ala Glu Ser Ser Ser     Ala Ile Ser Thr Thr     Ile Ser Pro
    11300               11305                   11310

Gly Ile Pro Gly Val Leu Thr     Ser Leu Val Thr Ser     Ser Gly Arg
    11315               11320                   11325

Asp Ile Ser Ala Thr Phe Pro     Thr Val Pro Glu Ser     Pro His Glu
    11330               11335                   11340

Ser Glu Ala Thr Ala Ser Trp     Val Thr His Pro Ala     Val Thr Ser
    11345               11350                   11355

Thr Thr Val Pro Arg Thr Thr     Pro Asn Tyr Ser His     Ser Glu Pro
    11360               11365                   11370

Asp Thr Thr Pro Ser Ile Ala     Thr Ser Pro Gly Ala     Glu Ala Thr
    11375               11380                   11385

Ser Asp Phe Pro Thr Ile Thr     Val Ser Pro Asp Val     Pro Asp Met
    11390               11395                   11400

Val Thr Ser Gln Val Thr Ser     Ser Gly Thr Asp Thr     Ser Ile Thr
    11405               11410                   11415

Ile Pro Thr Leu Thr Leu Ser     Ser Gly Glu Pro Glu     Thr Thr Thr
    11420               11425                   11430

Ser Phe Ile Thr Tyr Ser Glu     Thr His Thr Ser Ser     Ala Ile Pro
    11435               11440                   11445

Thr Leu Pro Val Ser Pro Gly     Ala Ser Lys Met Leu     Thr Ser Leu
    11450               11455                   11460

Val Ile Ser Ser Gly Thr Asp     Ser Thr Thr Thr Phe     Pro Thr Leu
    11465               11470                   11475

Thr Glu Thr Pro Tyr Glu Pro     Glu Thr Thr Ala Ile     Gln Leu Ile
    11480               11485                   11490

His Pro Ala Glu Thr Asn Thr     Met Val Pro Arg Thr     Thr Pro Lys
    11495               11500                   11505

Phe Ser His Ser Lys Ser Asp     Thr Thr Leu Pro Val     Ala Ile Thr
    11510               11515                   11520

Ser Pro Gly Pro Glu Ala Ser     Ser Ala Val Ser Thr     Thr Thr Ile
    11525               11530                   11535

Ser Pro Asp Met Ser Asp Leu     Val Thr Ser Leu Val     Pro Ser Ser
    11540               11545                   11550

Gly Thr Asp Thr Ser Thr Thr     Phe Pro Thr Leu Ser     Glu Thr Pro
    11555               11560                   11565

Tyr Glu Pro Glu Thr Thr Ala     Thr Trp Leu Thr His     Pro Ala Glu
    11570               11575                   11580

Thr Ser Thr Thr Val Ser Gly     Thr Ile Pro Asn Phe     Ser His Arg
    11585               11590                   11595

Gly Ser Asp Thr Ala Pro Ser     Met Val Thr Ser Pro     Gly Val Asp
```

-continued

```
             11600               11605               11610
Thr Arg  Ser Gly Val Pro Thr  Thr Thr Ile Pro Pro  Ser Ile Pro
    11615               11620               11625

Gly Val  Val Thr Ser Gln Val  Thr Ser Ser Ala Thr  Asp Thr Ser
    11630               11635               11640

Thr Ala  Ile Pro Thr Leu Thr  Pro Ser Pro Gly Glu  Pro Glu Thr
    11645               11650               11655

Thr Ala  Ser Ser Ala Thr His  Pro Gly Thr Gln Thr  Gly Phe Thr
    11660               11665               11670

Val Pro  Ile Arg Thr Val Pro  Ser Ser Glu Pro Asp  Thr Met Ala
    11675               11680               11685

Ser Trp  Val Thr His Pro Pro  Gln Thr Ser Thr Pro  Val Ser Arg
    11690               11695               11700

Thr Thr  Ser Ser Phe Ser His  Ser Ser Pro Asp Ala  Thr Pro Val
    11705               11710               11715

Met Ala  Thr Ser Pro Arg Thr  Glu Ala Ser Ser Ala  Val Leu Thr
    11720               11725               11730

Thr Ile  Ser Pro Gly Ala Pro  Glu Met Val Thr Ser  Gln Ile Thr
    11735               11740               11745

Ser Ser  Gly Ala Ala Thr Ser  Thr Thr Val Pro Thr  Leu Thr His
    11750               11755               11760

Ser Pro  Gly Met Pro Glu Thr  Thr Ala Leu Leu Ser  Thr His Pro
    11765               11770               11775

Arg Thr  Glu Thr Ser Lys Thr  Phe Pro Ala Ser Thr  Val Phe Pro
    11780               11785               11790

Gln Val  Ser Glu Thr Thr Ala  Ser Leu Thr Ile Arg  Pro Gly Ala
    11795               11800               11805

Glu Thr  Ser Thr Ala Leu Pro  Thr Gln Thr Thr Ser  Ser Leu Phe
    11810               11815               11820

Thr Leu  Leu Val Thr Gly Thr  Ser Arg Val Asp Leu  Ser Pro Thr
    11825               11830               11835

Ala Ser  Pro Gly Val Ser Ala  Lys Thr Ala Pro Leu  Ser Thr His
    11840               11845               11850

Pro Gly  Thr Glu Thr Ser Thr  Met Ile Pro Thr Ser  Thr Leu Ser
    11855               11860               11865

Leu Gly  Leu Leu Glu Thr Thr  Gly Leu Leu Ala Thr  Ser Ser Ser
    11870               11875               11880

Ala Glu  Thr Ser Thr Ser Thr  Leu Thr Leu Thr Val  Ser Pro Ala
    11885               11890               11895

Val Ser  Gly Leu Ser Ser Ala  Ser Ile Thr Thr Asp  Lys Pro Gln
    11900               11905               11910

Thr Val  Thr Ser Trp Asn Thr  Glu Thr Ser Pro Ser  Val Thr Ser
    11915               11920               11925

Val Gly  Pro Pro Glu Phe Ser  Arg Thr Val Thr Gly  Thr Thr Met
    11930               11935               11940

Thr Leu  Ile Pro Ser Glu Met  Pro Thr Pro Pro Lys  Thr Ser His
    11945               11950               11955

Gly Glu  Gly Val Ser Pro Thr  Thr Ile Leu Arg Thr  Thr Met Val
    11960               11965               11970

Glu Ala  Thr Asn Leu Ala Thr  Thr Gly Ser Ser Pro  Thr Val Ala
    11975               11980               11985

Lys Thr  Thr Thr Thr Phe Asn  Thr Leu Ala Gly Ser  Leu Phe Thr
    11990               11995               12000
```

-continued

Pro Leu Thr Thr Pro Gly Met Ser Thr Leu Ala Ser Glu Ser Val
12005             12010                 12015

Thr Ser Arg Thr Ser Tyr Asn His Arg Ser Trp Ile Ser Thr Thr
12020             12025                 12030

Ser Ser Tyr Asn Arg Arg Tyr Trp Thr Pro Ala Thr Ser Thr Pro
12035             12040                 12045

Val Thr Ser Thr Phe Ser Pro Gly Ile Ser Thr Ser Ser Ile Pro
12050             12055                 12060

Ser Ser Thr Ala Ala Thr Val Pro Phe Met Val Pro Phe Thr Leu
12065             12070                 12075

Asn Phe Thr Ile Thr Asn Leu Gln Tyr Glu Glu Asp Met Arg His
12080             12085                 12090

Pro Gly Ser Arg Lys Phe Asn Ala Thr Glu Arg Glu Leu Gln Gly
12095             12100                 12105

Leu Leu Lys Pro Leu Phe Arg Asn Ser Ser Leu Glu Tyr Leu Tyr
12110             12115                 12120

Ser Gly Cys Arg Leu Ala Ser Leu Arg Pro Glu Lys Asp Ser Ser
12125             12130                 12135

Ala Thr Ala Val Asp Ala Ile Cys Thr His Arg Pro Asp Pro Glu
12140             12145                 12150

Asp Leu Gly Leu Asp Arg Glu Arg Leu Tyr Trp Glu Leu Ser Asn
12155             12160                 12165

Leu Thr Asn Gly Ile Gln Glu Leu Gly Pro Tyr Thr Leu Asp Arg
12170             12175                 12180

Asn Ser Leu Tyr Val Asn Gly Phe Thr His Arg Ser Ser Met Pro
12185             12190                 12195

Thr Thr Ser Thr Pro Gly Thr Ser Thr Val Asp Val Gly Thr Ser
12200             12205                 12210

Gly Thr Pro Ser Ser Ser Pro Ser Pro Thr Thr Ala Gly Pro Leu
12215             12220                 12225

Leu Met Pro Phe Thr Leu Asn Phe Thr Ile Thr Asn Leu Gln Tyr
12230             12235                 12240

Glu Glu Asp Met Arg Arg Thr Gly Ser Arg Lys Phe Asn Thr Met
12245             12250                 12255

Glu Ser Val Leu Gln Gly Leu Leu Lys Pro Leu Phe Lys Asn Thr
12260             12265                 12270

Ser Val Gly Pro Leu Tyr Ser Gly Cys Arg Leu Thr Leu Leu Arg
12275             12280                 12285

Pro Glu Lys Asp Gly Ala Ala Thr Gly Val Asp Ala Ile Cys Thr
12290             12295                 12300

His Arg Leu Asp Pro Lys Ser Pro Gly Leu Asn Arg Glu Gln Leu
12305             12310                 12315

Tyr Trp Glu Leu Ser Lys Leu Thr Asn Asp Ile Glu Glu Leu Gly
12320             12325                 12330

Pro Tyr Thr Leu Asp Arg Asn Ser Leu Tyr Val Asn Gly Phe Thr
12335             12340                 12345

His Gln Ser Ser Val Ser Thr Thr Ser Thr Pro Gly Thr Ser Thr
12350             12355                 12360

Val Asp Leu Arg Thr Ser Gly Thr Pro Ser Ser Leu Ser Ser Pro
12365             12370                 12375

Thr Ile Met Ala Ala Gly Pro Leu Leu Val Pro Phe Thr Leu Asn
12380             12385                 12390

-continued

Phe Thr Ile Thr Asn Leu Gln    Tyr Gly Glu Asp Met    Gly His Pro
    12395           12400               12405

Gly Ser Arg Lys Phe Asn Thr    Thr Glu Arg Val Leu    Gln Gly Leu
    12410           12415               12420

Leu Gly Pro Ile Phe Lys Asn    Thr Ser Val Gly Pro    Leu Tyr Ser
    12425           12430               12435

Gly Cys Arg Leu Thr Ser Leu    Arg Ser Glu Lys Asp    Gly Ala Ala
    12440           12445               12450

Thr Gly Val Asp Ala Ile Cys    Ile His His Leu Asp    Pro Lys Ser
    12455           12460               12465

Pro Gly Leu Asn Arg Glu Arg    Leu Tyr Trp Glu Leu    Ser Gln Leu
    12470           12475               12480

Thr Asn Gly Ile Lys Glu Leu    Gly Pro Tyr Thr Leu    Asp Arg Asn
    12485           12490               12495

Ser Leu Tyr Val Asn Gly Phe    Thr His Arg Thr Ser    Val Pro Thr
    12500           12505               12510

Ser Ser Thr Pro Gly Thr Ser    Thr Val Asp Leu Gly    Thr Ser Gly
    12515           12520               12525

Thr Pro Phe Ser Leu Pro Ser    Pro Ala Thr Ala Gly    Pro Leu Leu
    12530           12535               12540

Val Leu Phe Thr Leu Asn Phe    Thr Ile Thr Asn Leu    Lys Tyr Glu
    12545           12550               12555

Glu Asp Met His Arg Pro Gly    Ser Arg Lys Phe Asn    Thr Thr Glu
    12560           12565               12570

Arg Val Leu Gln Thr Leu Leu    Gly Pro Met Phe Lys    Asn Thr Ser
    12575           12580               12585

Val Gly Leu Leu Tyr Ser Gly    Cys Arg Leu Thr Leu    Leu Arg Ser
    12590           12595               12600

Glu Lys Asp Gly Ala Ala Thr    Gly Val Asp Ala Ile    Cys Thr His
    12605           12610               12615

Arg Leu Asp Pro Lys Ser Pro    Gly Val Asp Arg Glu    Gln Leu Tyr
    12620           12625               12630

Trp Glu Leu Ser Gln Leu Thr    Asn Gly Ile Lys Glu    Leu Gly Pro
    12635           12640               12645

Tyr Thr Leu Asp Arg Asn Ser    Leu Tyr Val Asn Gly    Phe Thr His
    12650           12655               12660

Trp Ile Pro Val Pro Thr Ser    Ser Thr Pro Gly Thr    Ser Thr Val
    12665           12670               12675

Asp Leu Gly Ser Gly Thr Pro    Ser Ser Leu Pro Ser    Pro Thr Thr
    12680           12685               12690

Ala Gly Pro Leu Leu Val Pro    Phe Thr Leu Asn Phe    Thr Ile Thr
    12695           12700               12705

Asn Leu Lys Tyr Glu Glu Asp    Met His Cys Pro Gly    Ser Arg Lys
    12710           12715               12720

Phe Asn Thr Thr Glu Arg Val    Leu Gln Ser Leu Leu    Gly Pro Met
    12725           12730               12735

Phe Lys Asn Thr Ser Val Gly    Pro Leu Tyr Ser Gly    Cys Arg Leu
    12740           12745               12750

Thr Leu Leu Arg Ser Glu Lys    Asp Gly Ala Ala Thr    Gly Val Asp
    12755           12760               12765

Ala Ile Cys Thr His Arg Leu    Asp Pro Lys Ser Pro    Gly Val Asp
    12770           12775               12780

Arg Glu Gln Leu Tyr Trp Glu    Leu Ser Gln Leu Thr    Asn Gly Ile

```
            12785               12790               12795

Lys Glu  Leu Gly Pro Tyr Thr  Leu Asp Arg Asn Ser  Leu Tyr Val
    12800               12805               12810

Asn Gly  Phe Thr His Gln Thr  Ser Ala Pro Asn Thr  Ser Thr Pro
    12815               12820               12825

Gly Thr  Ser Thr Val Asp Leu  Gly Thr Ser Gly Thr  Pro Ser Ser
    12830               12835               12840

Leu Pro  Ser Pro Thr Ser Ala  Gly Pro Leu Leu Val  Pro Phe Thr
    12845               12850               12855

Leu Asn  Phe Thr Ile Thr Asn  Leu Gln Tyr Glu Glu  Asp Met His
    12860               12865               12870

His Pro  Gly Ser Arg Lys Phe  Asn Thr Thr Glu Arg  Val Leu Gln
    12875               12880               12885

Gly Leu  Leu Gly Pro Met Phe  Lys Asn Thr Ser Val  Gly Leu Leu
    12890               12895               12900

Tyr Ser  Gly Cys Arg Leu Thr  Leu Leu Arg Pro Glu  Lys Asn Gly
    12905               12910               12915

Ala Ala  Thr Gly Met Asp Ala  Ile Cys Ser His Arg  Leu Asp Pro
    12920               12925               12930

Lys Ser  Pro Gly Leu Asn Arg  Glu Gln Leu Tyr Trp  Glu Leu Ser
    12935               12940               12945

Gln Leu  Thr His Gly Ile Lys  Glu Leu Gly Pro Tyr  Thr Leu Asp
    12950               12955               12960

Arg Asn  Ser Leu Tyr Val Asn  Gly Phe Thr His Arg  Ser Ser Val
    12965               12970               12975

Ala Pro  Thr Ser Thr Pro Gly  Thr Ser Thr Val Asp  Leu Gly Thr
    12980               12985               12990

Ser Gly  Thr Pro Ser Ser Leu  Pro Ser Pro Thr Thr  Ala Val Pro
    12995               13000               13005

Leu Leu  Val Pro Phe Thr Leu  Asn Phe Thr Ile Thr  Asn Leu Gln
    13010               13015               13020

Tyr Gly  Glu Asp Met Arg His  Pro Gly Ser Arg Lys  Phe Asn Thr
    13025               13030               13035

Thr Glu  Arg Val Leu Gln Gly  Leu Leu Gly Pro Leu  Phe Lys Asn
    13040               13045               13050

Ser Ser  Val Gly Pro Leu Tyr  Ser Gly Cys Arg Leu  Ile Ser Leu
    13055               13060               13065

Arg Ser  Glu Lys Asp Gly Ala  Ala Thr Gly Val Asp  Ala Ile Cys
    13070               13075               13080

Thr His  His Leu Asn Pro Gln  Ser Pro Gly Leu Asp  Arg Glu Gln
    13085               13090               13095

Leu Tyr  Trp Gln Leu Ser Gln  Met Thr Asn Gly Ile  Lys Glu Leu
    13100               13105               13110

Gly Pro  Tyr Thr Leu Asp Arg  Asn Ser Leu Tyr Val  Asn Gly Phe
    13115               13120               13125

Thr His  Arg Ser Ser Gly Leu  Thr Thr Ser Thr Pro  Trp Thr Ser
    13130               13135               13140

Thr Val  Asp Leu Gly Thr Ser  Gly Thr Pro Ser Pro  Val Pro Ser
    13145               13150               13155

Pro Thr  Thr Thr Gly Pro Leu  Leu Val Pro Phe Thr  Leu Asn Phe
    13160               13165               13170

Thr Ile  Thr Asn Leu Gln Tyr  Glu Glu Asn Met Gly  His Pro Gly
    13175               13180               13185
```

-continued

| | | | | | | | | | | | |
|---|---|---|---|---|---|---|---|---|---|---|---|
|Ser|Arg|Lys|Phe|Asn|Ile|Thr|Glu|Ser|Val|Leu|Gln|Gly|Leu|Leu|
| |13190| | | |13195| | | |13200| | | | | |

Ser Arg Lys Phe Asn Ile Thr Glu Ser Val Leu Gln Gly Leu Leu
    13190           13195           13200

Lys Pro Leu Phe Lys Ser Thr Ser Val Gly Pro Leu Tyr Ser Gly
    13205           13210           13215

Cys Arg Leu Thr Leu Leu Arg Pro Glu Lys Asp Gly Val Ala Thr
    13220           13225           13230

Arg Val Asp Ala Ile Cys Thr His Arg Pro Asp Pro Lys Ile Pro
    13235           13240           13245

Gly Leu Asp Arg Gln Gln Leu Tyr Trp Glu Leu Ser Gln Leu Thr
    13250           13255           13260

His Ser Ile Thr Glu Leu Gly Pro Tyr Thr Leu Asp Arg Asp Ser
    13265           13270           13275

Leu Tyr Val Asn Gly Phe Thr Gln Arg Ser Ser Val Pro Thr Thr
    13280           13285           13290

Ser Thr Pro Gly Thr Phe Thr Val Gln Pro Glu Thr Ser Glu Thr
    13295           13300           13305

Pro Ser Ser Leu Pro Gly Pro Thr Ala Thr Gly Pro Val Leu Leu
    13310           13315           13320

Pro Phe Thr Leu Asn Phe Thr Ile Thr Asn Leu Gln Tyr Glu Glu
    13325           13330           13335

Asp Met Arg Arg Pro Gly Ser Arg Lys Phe Asn Thr Thr Glu Arg
    13340           13345           13350

Val Leu Gln Gly Leu Leu Met Pro Leu Phe Lys Asn Thr Ser Val
    13355           13360           13365

Ser Ser Leu Tyr Ser Gly Cys Arg Leu Thr Leu Leu Arg Pro Glu
    13370           13375           13380

Lys Asp Gly Ala Ala Thr Arg Val Asp Ala Val Cys Thr His Arg
    13385           13390           13395

Pro Asp Pro Lys Ser Pro Gly Leu Asp Arg Glu Arg Leu Tyr Trp
    13400           13405           13410

Lys Leu Ser Gln Leu Thr His Gly Ile Thr Glu Leu Gly Pro Tyr
    13415           13420           13425

Thr Leu Asp Arg His Ser Leu Tyr Val Asn Gly Phe Thr His Gln
    13430           13435           13440

Ser Ser Met Thr Thr Thr Arg Thr Pro Asp Thr Ser Thr Met His
    13445           13450           13455

Leu Ala Thr Ser Arg Thr Pro Ala Ser Leu Ser Gly Pro Met Thr
    13460           13465           13470

Ala Ser Pro Leu Leu Val Leu Phe Thr Ile Asn Phe Thr Ile Thr
    13475           13480           13485

Asn Leu Arg Tyr Glu Glu Asn Met His His Pro Gly Ser Arg Lys
    13490           13495           13500

Phe Asn Thr Thr Glu Arg Val Leu Gln Gly Leu Leu Arg Pro Val
    13505           13510           13515

Phe Lys Asn Thr Ser Val Gly Pro Leu Tyr Ser Gly Cys Arg Leu
    13520           13525           13530

Thr Leu Leu Arg Pro Lys Lys Asp Gly Ala Ala Thr Lys Val Asp
    13535           13540           13545

Ala Ile Cys Thr Tyr Arg Pro Asp Pro Lys Ser Pro Gly Leu Asp
    13550           13555           13560

Arg Glu Gln Leu Tyr Trp Glu Leu Ser Gln Leu Thr His Ser Ile
    13565           13570           13575

```
Thr Glu  Leu Gly Pro Tyr  Thr Leu Asp Arg Asp Ser  Leu Tyr Val
    13580            13585            13590

Asn Gly  Phe Thr Gln Arg Ser  Ser Val Pro Thr Thr  Ser Ile Pro
    13595            13600            13605

Gly Thr  Pro Thr Val Asp Leu  Gly Thr Ser Gly Thr  Pro Val Ser
    13610            13615            13620

Lys Pro  Gly Pro Ser Ala Ala  Ser Pro Leu Leu Val  Leu Phe Thr
    13625            13630            13635

Leu Asn  Phe Thr Ile Thr Asn  Leu Arg Tyr Glu Glu  Asn Met Gln
    13640            13645            13650

His Pro  Gly Ser Arg Lys Phe  Asn Thr Thr Glu Arg  Val Leu Gln
    13655            13660            13665

Gly Leu  Leu Arg Ser Leu Phe  Lys Ser Thr Ser Val  Gly Pro Leu
    13670            13675            13680

Tyr Ser  Gly Cys Arg Leu Thr  Leu Leu Arg Pro Glu  Lys Asp Gly
    13685            13690            13695

Thr Ala  Thr Gly Val Asp Ala  Ile Cys Thr His His  Pro Asp Pro
    13700            13705            13710

Lys Ser  Pro Arg Leu Asp Arg  Glu Gln Leu Tyr Trp  Glu Leu Ser
    13715            13720            13725

Gln Leu  Thr His Asn Ile Thr  Glu Leu Gly Pro Tyr  Ala Leu Asp
    13730            13735            13740

Asn Asp  Ser Leu Phe Val Asn  Gly Phe Thr His Arg  Ser Ser Val
    13745            13750            13755

Ser Thr  Thr Ser Thr Pro Gly  Thr Pro Thr Val Tyr  Leu Gly Ala
    13760            13765            13770

Ser Lys  Thr Pro Ala Ser Ile  Phe Gly Pro Ser Ala  Ala Ser His
    13775            13780            13785

Leu Leu  Ile Leu Phe Thr Leu  Asn Phe Thr Ile Thr  Asn Leu Arg
    13790            13795            13800

Tyr Glu  Glu Asn Met Trp Pro  Gly Ser Arg Lys Phe  Asn Thr Thr
    13805            13810            13815

Glu Arg  Val Leu Gln Gly Leu  Leu Arg Pro Leu Phe  Lys Asn Thr
    13820            13825            13830

Ser Val  Gly Pro Leu Tyr Ser  Gly Cys Arg Leu Thr  Leu Leu Arg
    13835            13840            13845

Pro Glu  Lys Asp Gly Glu Ala  Thr Gly Val Asp Ala  Ile Cys Thr
    13850            13855            13860

His Arg  Pro Asp Pro Thr Gly  Pro Gly Leu Asp Arg  Glu Gln Leu
    13865            13870            13875

Tyr Leu  Glu Leu Ser Gln Leu  Thr His Ser Ile Thr  Glu Leu Gly
    13880            13885            13890

Pro Tyr  Thr Leu Asp Arg Asp  Ser Leu Tyr Val Asn  Gly Phe Thr
    13895            13900            13905

His Arg  Ser Ser Val Pro Thr  Thr Ser Thr Gly Val  Val Ser Glu
    13910            13915            13920

Glu Pro  Phe Thr Leu Asn Phe  Thr Ile Asn Asn Leu  Arg Tyr Met
    13925            13930            13935

Ala Asp  Met Gly Gln Pro Gly  Ser Leu Lys Phe Asn  Ile Thr Asp
    13940            13945            13950

Asn Val  Met Gln His Leu Leu  Ser Pro Leu Phe Gln  Arg Ser Ser
    13955            13960            13965

Leu Gly  Ala Arg Tyr Thr Gly  Cys Arg Val Ile Ala  Leu Arg Ser
```

```
              13970               13975               13980

Val Lys  Asn Gly Ala Glu Thr  Arg Val Asp Leu Leu  Cys Thr Tyr
     13985               13990               13995

Leu Gln  Pro Leu Ser Gly Pro  Gly Leu Pro Ile Lys  Gln Val Phe
     14000               14005               14010

His Glu  Leu Ser Gln Gln Thr  His Gly Ile Thr Arg  Leu Gly Pro
     14015               14020               14025

Tyr Ser  Leu Asp Lys Asp Ser  Leu Tyr Leu Asn Gly  Tyr Asn Glu
     14030               14035               14040

Pro Gly  Pro Asp Glu Pro Pro  Thr Thr Pro Lys Pro  Ala Thr Thr
     14045               14050               14055

Phe Leu  Pro Pro Leu Ser Glu  Ala Thr Thr Ala Met  Gly Tyr His
     14060               14065               14070

Leu Lys  Thr Leu Thr Leu Asn  Phe Thr Ile Ser Asn  Leu Gln Tyr
     14075               14080               14085

Ser Pro  Asp Met Gly Lys Gly  Ser Ala Thr Phe Asn  Ser Thr Glu
     14090               14095               14100

Gly Val  Leu Gln His Leu Leu  Arg Pro Leu Phe Gln  Lys Ser Ser
     14105               14110               14115

Met Gly  Pro Phe Tyr Leu Gly  Cys Gln Leu Ile Ser  Leu Arg Pro
     14120               14125               14130

Glu Lys  Asp Gly Ala Ala Thr  Gly Val Asp Thr Thr  Cys Thr Tyr
     14135               14140               14145

His Pro  Asp Pro Val Gly Pro  Gly Leu Asp Ile Gln  Gln Leu Tyr
     14150               14155               14160

Trp Glu  Leu Ser Gln Leu Thr  His Gly Val Thr Gln  Leu Gly Phe
     14165               14170               14175

Tyr Val  Leu Asp Arg Asp Ser  Leu Phe Ile Asn Gly  Tyr Ala Pro
     14180               14185               14190

Gln Asn  Leu Ser Ile Arg Gly  Glu Tyr Gln Ile Asn  Phe His Ile
     14195               14200               14205

Val Asn  Trp Asn Leu Ser Asn  Pro Asp Pro Thr Ser  Ser Glu Tyr
     14210               14215               14220

Ile Thr  Leu Leu Arg Asp Ile  Gln Asp Lys Val Thr  Thr Leu Tyr
     14225               14230               14235

Lys Gly  Ser Gln Leu His Asp  Thr Phe Arg Phe Cys  Leu Val Thr
     14240               14245               14250

Asn Leu  Thr Met Asp Ser Val  Leu Val Thr Val Lys  Ala Leu Phe
     14255               14260               14265

Ser Ser  Asn Leu Asp Pro Ser  Leu Val Glu Gln Val  Phe Leu Asp
     14270               14275               14280

Lys Thr  Leu Asn Ala Ser Phe  His Trp Leu Gly Ser  Thr Tyr Gln
     14285               14290               14295

Leu Val  Asp Ile His Val Thr  Glu Met Glu Ser Ser  Val Tyr Gln
     14300               14305               14310

Pro Thr  Ser Ser Ser Ser Thr  Gln His Phe Tyr Leu  Asn Phe Thr
     14315               14320               14325

Ile Thr  Asn Leu Pro Tyr Ser  Gln Asp Lys Ala Gln  Pro Gly Thr
     14330               14335               14340

Thr Asn  Tyr Gln Arg Asn Lys  Arg Asn Ile Glu Asp  Ala Leu Asn
     14345               14350               14355

Gln Leu  Phe Arg Asn Ser Ser  Ile Lys Ser Tyr Phe  Ser Asp Cys
     14360               14365               14370
```

```
Gln Val Ser Thr Phe Arg Ser     Val Pro Asn Arg His     His Thr Gly
        14375           14380               14385

Val Asp Ser Leu Cys Asn Phe     Ser Pro Leu Ala Arg     Arg Val Asp
        14390           14395               14400

Arg Val Ala Ile Tyr Glu Glu     Phe Leu Arg Met Thr     Arg Asn Gly
        14405           14410               14415

Thr Gln Leu Gln Asn Phe Thr     Leu Asp Arg Ser Ser     Val Leu Val
        14420           14425               14430

Asp Gly Tyr Ser Pro Asn Arg     Asn Glu Pro Leu Thr     Gly Asn Ser
        14435           14440               14445

Asp Leu Pro
        14450

<210> SEQ ID NO 3
<211> LENGTH: 400
<212> TYPE: PRT
<213> ORGANISM: Homo sapiens

<400> SEQUENCE: 3

Met Thr Ser Tyr Ser Tyr Arg Gln Ser Ser Ala Thr Ser Ser Phe Gly
1               5                   10                  15

Gly Leu Gly Gly Gly Ser Val Arg Phe Gly Pro Gly Val Ala Phe Arg
            20                  25                  30

Ala Pro Ser Ile His Gly Gly Ser Gly Gly Arg Gly Val Ser Val Ser
        35                  40                  45

Ser Ala Arg Phe Val Ser Ser Ser Ser Gly Ala Tyr Gly Gly Gly
    50                  55                  60

Tyr Gly Gly Val Leu Thr Ala Ser Asp Gly Leu Leu Ala Gly Asn Glu
65                  70                  75                  80

Lys Leu Thr Met Gln Asn Leu Asn Asp Arg Leu Ala Ser Tyr Leu Asp
                85                  90                  95

Lys Val Arg Ala Leu Glu Ala Ala Asn Gly Glu Leu Glu Val Lys Ile
            100                 105                 110

Arg Asp Trp Tyr Gln Lys Gln Gly Pro Gly Pro Ser Arg Asp Tyr Ser
        115                 120                 125

His Tyr Tyr Thr Thr Ile Gln Asp Leu Arg Asp Lys Ile Leu Gly Ala
    130                 135                 140

Thr Ile Glu Asn Ser Arg Ile Val Leu Gln Ile Asp Asn Ala Arg Leu
145                 150                 155                 160

Ala Ala Asp Asp Phe Arg Thr Lys Phe Glu Thr Glu Gln Ala Leu Arg
                165                 170                 175

Met Ser Val Glu Ala Asp Ile Asn Gly Leu Arg Arg Val Leu Asp Glu
            180                 185                 190

Leu Thr Leu Ala Arg Thr Asp Leu Glu Met Gln Ile Glu Gly Leu Lys
        195                 200                 205

Glu Glu Leu Ala Tyr Leu Lys Lys Asn His Glu Glu Ile Ser Thr
    210                 215                 220

Leu Arg Gly Gln Val Gly Gly Gln Val Ser Val Glu Val Asp Ser Ala
225                 230                 235                 240

Pro Gly Thr Asp Leu Ala Lys Ile Leu Ser Asp Met Arg Ser Gln Tyr
                245                 250                 255

Glu Val Met Ala Glu Gln Asn Arg Lys Asp Ala Glu Ala Trp Phe Thr
            260                 265                 270

Ser Arg Thr Glu Glu Leu Asn Arg Glu Val Ala Gly His Thr Glu Gln
```

```
                275                 280                 285
Leu Gln Met Ser Arg Ser Glu Val Thr Asp Leu Arg Arg Thr Leu Gln
    290                 295                 300
Gly Leu Glu Ile Glu Leu Gln Ser Gln Leu Ser Met Lys Ala Ala Leu
305                 310                 315                 320
Glu Asp Thr Leu Ala Glu Thr Glu Ala Arg Phe Gly Ala Gln Leu Ala
                325                 330                 335
His Ile Gln Ala Leu Ile Ser Gly Ile Glu Ala Gln Leu Gly Asp Val
                340                 345                 350
Arg Ala Asp Ser Glu Arg Gln Asn Gln Glu Tyr Gln Arg Leu Met Asp
                355                 360                 365
Ile Lys Ser Arg Leu Glu Gln Glu Ile Ala Thr Tyr Arg Ser Leu Leu
370                 375                 380
Glu Gly Gln Glu Asp His Tyr Asn Asn Leu Ser Ala Ser Lys Val Leu
385                 390                 395                 400

<210> SEQ ID NO 4
<211> LENGTH: 381
<212> TYPE: PRT
<213> ORGANISM: Homo sapiens

<400> SEQUENCE: 4

Met Ala Glu Ser His Leu Leu Gln Trp Leu Leu Leu Leu Pro Thr
1               5                   10                  15
Leu Cys Gly Pro Gly Thr Ala Ala Trp Thr Thr Ser Ser Leu Ala Cys
                20                  25                  30
Ala Gln Gly Pro Glu Phe Trp Cys Gln Ser Leu Glu Gln Ala Leu Gln
                35                  40                  45
Cys Arg Ala Leu Gly His Cys Leu Gln Glu Val Trp Gly His Val Gly
    50                  55                  60
Ala Asp Asp Leu Cys Gln Glu Cys Glu Asp Ile Val His Ile Leu Asn
65                  70                  75                  80
Lys Met Ala Lys Glu Ala Ile Phe Gln Asp Thr Met Arg Lys Phe Leu
                85                  90                  95
Glu Gln Glu Cys Asn Val Leu Pro Leu Lys Leu Leu Met Pro Gln Cys
                100                 105                 110
Asn Gln Val Leu Asp Asp Tyr Phe Pro Leu Val Ile Asp Tyr Phe Gln
                115                 120                 125
Asn Gln Thr Asp Ser Asn Gly Ile Cys Met His Leu Gly Leu Cys Lys
    130                 135                 140
Ser Arg Gln Pro Glu Pro Glu Gln Glu Pro Gly Met Ser Asp Pro Leu
145                 150                 155                 160
Pro Lys Pro Leu Arg Asp Pro Leu Pro Asp Pro Leu Leu Asp Lys Leu
                165                 170                 175
Val Leu Pro Val Leu Pro Gly Ala Leu Gln Ala Arg Pro Gly Pro His
                180                 185                 190
Thr Gln Asp Leu Ser Glu Gln Gln Phe Pro Ile Pro Leu Pro Tyr Cys
                195                 200                 205
Trp Leu Cys Arg Ala Leu Ile Lys Arg Ile Gln Ala Met Ile Pro Lys
    210                 215                 220
Gly Ala Leu Ala Val Ala Val Ala Gln Val Cys Arg Val Val Pro Leu
225                 230                 235                 240
Val Ala Gly Gly Ile Cys Gln Cys Leu Ala Glu Arg Tyr Ser Val Ile
                245                 250                 255
```

-continued

| | | | | | | | | | | | | | |
|---|---|---|---|---|---|---|---|---|---|---|---|---|---|
| Leu | Leu | Asp | Thr 260 | Leu | Leu | Gly | Arg | Met 265 | Leu | Pro | Gln | Leu | Val 270 | Cys | Arg |
| Leu | Val | Leu | Arg 275 | Cys | Ser | Met | Asp 280 | Asp | Ser | Ala | Gly | Pro 285 | Arg | Ser | Pro |
| Thr | Gly | Glu 290 | Trp | Leu | Pro | Arg 295 | Asp | Ser | Glu | Cys | His 300 | Leu | Cys | Met | Ser |
| Val 305 | Thr | Thr | Gln | Ala | Gly 310 | Asn | Ser | Ser | Glu | Gln 315 | Ala | Ile | Pro | Gln | Ala 320 |
| Met | Leu | Gln | Ala | Cys 325 | Val | Gly | Ser | Trp | Leu 330 | Asp | Arg | Glu | Lys | Cys 335 | Lys |
| Gln | Phe | Val | Glu 340 | Gln | His | Thr | Pro | Gln 345 | Leu | Leu | Thr | Leu | Val 350 | Pro | Arg |
| Gly | Trp | Asp | Ala 355 | His | Thr | Thr | Cys 360 | Gln | Ala | Leu | Gly | Val 365 | Cys | Gly | Thr |
| Met | Ser | Ser 370 | Pro | Leu | Gln | Cys 375 | Ile | His | Ser | Pro | Asp 380 | Leu | | | |

METHODS FOR THE DETECTION AND TREATMENT OF LUNG CANCER

CROSS REFERENCE TO RELATED APPLICATIONS

This application claims the benefit of U.S. Provisional Application No. 62/456,731, filed Feb. 9, 2017, the disclosure of which is hereby incorporated by reference in its entirety.

STATEMENT REGARDING FEDERALLY SPONSORED RESEARCH OR DEVELOPMENT

This invention was made with government support under grant number W81XWH-10-1-0632 awarded by the U.S. Department of the Army. The government has certain rights in the invention.

INCORPORATION OF SEQUENCE LISTING

The sequence listing that is contained in the file named "MDA0025401PC_ST25," which is 140 kilobytes as measured in Microsoft Windows operating system and was created on Jan. 4, 2018, is filed electronically herewith and incorporated herein by reference.

BACKGROUND

Lung cancer is the most prevalent cancer in the United States, with a five-year survival rate of less than 15%. Therapy for lung cancer is transitioning from use of a limited selection of therapies consisting of radiation, folate metabolism, platinum-based drugs, and/or taxol-based drugs to more targeted treatments that require histological characterization of the tumor and/or the presence or absence of key biomarker or therapeutic target proteins.

Lung cancer is the leading cancer killer world-wide and accounts for one in four of all cancer deaths in the U.S. Data from the National Lung Screening Trial (NLST) suggest that yearly screening with thoracic LDCT for high-risk current and ex-smokers reduces lung cancer mortality by 20% and total mortality by 7%. As a result, the U.S. Preventive Services Task Force (USPSTF) has recommended LDCT-screening for lung cancer in ever-smokers aged 55-80 years who have smoked 30 pack-years with no more than 15 years since quitting. However, the NLST study highlighted several important negative aspects associated with CT screening in terms of morbidity associated with over-diagnosis, treatment of benign nodules, and financial costs. Importantly, based on current screening criteria, the number of lives that would be saved through screening as a percentage of total number of deaths due to lung cancer is estimated to be relatively modest. Further, data from over a million subjects recruited from a general population cohort (UK Biobank and the European Prospective Investigation into Cancer and Nutrition (EPIC) study) indicate that less than 50% of incident lung cancer cases would have been eligible for screening based on the USPSTF criteria.

There is an abundance of literature on lung cancer risk prediction that provides convincing arguments on the benefit of replacing the dichotomous USPSTF screening criteria with a risk-based model when identifying subjects for CT-screening. For instance, recently it was estimated that 20% additional lung cancer deaths could be avoided by using a screening criterion based on individual risk-assessment. Considering that the information required to utilize such a risk-prediction tool can be readily ascertained by a general practitioner—or even self-assessed using an online risk-calculator—future lung cancer screening programs would seem likely to implement such tools when assessing screening eligibility.

An alternative to the USPSTF screening criteria would be an individual-level risk-based screening criteria that accurately estimates the risk of lung cancer within the near future (e.g., 1-3 years) for each individual. Several risk prediction models that rely on demographic data (age and sex) and risk factor data from questionnaires (primarily cigarette smoking) have been published. However, substantial improvement would be gained by incorporating biomarkers that incorporate information that cannot be captured with questionnaires.

Efforts to develop blood-based biomarkers for early detection of lung cancer are currently ongoing using a variety of analytical platforms that target nucleic acids, proteins, and metabolites, as well as circulating tumor cells and microparticles. For example, proteomic studies have led to the identification of several candidate circulating markers, including surfactant protein B (SFTPB), and its precursor form (Pro-SFTPB) that has been demonstrated to substantially improve lung cancer risk prediction in combination with smoking information when assayed using blood samples collected at the time of LDCT (AUC improvement: 0.67 to 0.74), as well as in pre-diagnostic blood samples from the Physicians Health Study. Other circulating proteins have been found to exhibit increased levels in lung cancer but with limited sensitivity and specificity to have utility as single markers for lung cancer screening.

Given the performance of SFTPB and its precursor form Pro-SFTPB in samples collected before the diagnosis of lung cancer, and in a screening setting, the potential of improving upon the USPSTF criteria using a panel of selected tumor-related proteins was investigated. The study was based on a high risk lung cancer prospective cohort, the Beta-Carotene and Retinol Efficacy Trial (CARET) study for building the panel, and cases and controls selected from two, large, general-population cohorts, the European Prospective Investigation into Cancer and Nutrition (EPIC) study, and the Northern Sweden Health and Disease Study (NSHDS) that involved 367,000 participants for validation.

SUMMARY

The present disclosure provides methods and kits for the early detection of lung cancer. The methods and kits use multiple assays of biomarkers contained within a biological sample obtained from a subject. The combined analysis of at least four biomarkers: CEA, CA125, CYFRA21-1, and Pro-SFTPB, provides high-accuracy diagnosis of lung cancer when screened against cohorts with known lung cancer status, i.e., lung cancer-positive, or lung cancer-negative. Optionally, the level of diacetylspermine (DAS) may be analyzed as well.

A regression model was identified that can predict the lung cancer status for a subject based on the levels of CEA, CA125, CYFRA21-1, and Pro-SFTPB that are found in a biological sample from the subject.

A biomarker-score based on four separate biomarkers was developed in a U.S. cohort, and external validation in two European cohorts confirmed that incorporating the biomarker-score with smoking information in an integrated risk prediction model provided a notable improvement in overall discrimination between cases and controls compared with a model based on smoking information alone. The integrated risk-prediction model identified 76% of future lung cancer cases in the validation sample, as compared to 42% of the USPSTF screening criteria, without increasing the number of false positives.

Accordingly, provided herein are:

methods of detection of lung cancer and risk of lung cancer in a subject;

methods of determining and/or quantifying the increased risk for the presence of lung cancer in a subject;

methods of determining the risk of a subject for harboring lung cancer; each comprising measuring the level of CEA, CA125, CYFRA21-1, and Pro-SFTPB, and optionally, diacetylspermine (DAS), in a sample from the subject.

Also provided are methods of treatment or prevention of progression of lung cancer in a subject in whom the levels of CEA, CA125, CYFRA21-1, and pro-SFTPB, and optionally, diacetylspermine (DAS), classifies the subject as having or being at risk of harboring lung cancer.

Also provided are corresponding kits for determining the presence of indicators of lung cancer in a sample from the subject, for detection of lung cancer and risk of lung cancer in a subject, and for determining and/or quantifying the increased risk for the presence of lung cancer in a subject, comprising materials for measuring CEA, CA125, CYFRA21-1, and pro-SFTPB, and optionally, diacetylspermine (DAS) in the sample.

In some embodiments, biomarkers are measured in blood samples drawn from subjects. In some embodiments, the presence or absence of biomarkers in a biological sample can be determined. In some embodiments, the level of biomarkers in a biological sample can be quantified.

In some embodiments, a surface is provided to analyze a biological sample. In some embodiment, biomarkers of interest adsorb nonspecifically onto this surface. In some embodiments, receptors specific for biomarkers of interest are incorporated onto this surface. In some embodiments, the surface is associated with a particle, for example, a bead.

In some embodiments, the biomarker binds to a particular receptor molecule, and the presence or absence of the biomarker-receptor complex can be determined. In some embodiments, the amount of biomarker-receptor complex can be quantified. In some embodiments, the receptor molecule is linked to an enzyme to facilitate detection and quantification.

In some embodiments, the biomarker binds to a particular relay molecule, and the biomarker-relay molecule complex in turn binds to a receptor molecule. In some embodiments, the presence or absence of the biomarker-relay-receptor complex can be determined. In some embodiments, the amount of biomarker-relay-receptor complex can be quantified. In some embodiments, the receptor molecule is linked to an enzyme to facilitate detection and quantification.

In some embodiments, a biological sample is analyzed sequentially for individual biomarkers. In some embodiments, a biological sample is divided into separate portions to allow for simultaneous analysis for multiple biomarkers. In some embodiments, a biological sample is analyzed in a single process for multiple biomarkers.

In some embodiments, the absence or presence of biomarker can be determined by visual inspection. In some embodiments, the quantity of biomarker can be determined by use of a spectroscopic technique. In some embodiments, the spectroscopic technique is mass spectrometry. In some embodiments, the spectroscopic technique is UV/Vis spectrometry. In some embodiments, the spectroscopic technique is an excitation/emission technique such as fluorescence spectrometry.

In some embodiments, the analysis of biomarkers CEA, CA125, CYFRA21-1, and Pro-SFTPB can be combined with analysis of additional biomarkers. In some embodiments, the additional biomarkers can be protein biomarkers. In some embodiments, the additional biomarkers can be non-protein biomarkers. In some embodiments, the non-protein biomarkers can be circulating tumor DNA (ctDNA). In some embodiments, such a method may further comprise measuring the level of a metabolite, for example diacetylspermine (DAS), in the biological sample; wherein the amount of diacetylspermine (DAS) classifies the subject as being at risk of harboring lung cancer or not at risk of harboring lung cancer. In some embodiments, additional metabolites may be incorporated as necessary.

In some embodiments, a kit is provided for analysis of a biological sample. In some embodiments, the kit can contain the chemicals and reagents required to perform the analysis. In some embodiments, the kit contains a means for manipulating biological samples in order to minimize the required operator intervention. In some embodiments, the kit can record the outcome of an analysis digitally. In some embodiments, the kit can perform any needed mathematical processing of data generated by the analysis.

In another aspect, the disclosure provides a method of determining the risk of a subject for harboring lung cancer, comprising obtaining a biological sample from the subject; measuring the level of diacetylspermine (DAS) in the biological sample; wherein the amount of diacetylspermine (DAS) classifies the subject as being at risk of harboring lung cancer or not at risk of harboring lung cancer.

In another aspect, the disclosure provides a method of determining the risk of a subject for harboring lung cancer, comprising a plasma-derived biomarker panel and a protein marker panel wherein the plasma-derived biomarker panel comprises diacetylspermine (DAS); wherein the protein biomarker panel comprises CEA, CA125, CYFRA21-1, and pro-SFTPB; wherein the method comprises obtaining a biological sample from the subject; measuring the levels of the plasma-derived biomarkers and the protein biomarkers in the biological sample; wherein the amount of the plasma-derived biomarkers and the protein biomarkers classifies the subject as being at risk of harboring ung cancer or not at risk of harboring lung cancer.

In another aspect, the disclosure provides a method of determining the risk of a subject for harboring lung cancer, comprising determining the levels of one or more protein biomarkers and one or more metabolite markers, said method comprising obtaining a biological sample from the subject; contacting the sample with a first reporter molecule that binds CEA antigen; contacting the sample with a second reporter molecule that binds CA125 antigen; contacting the sample with a third reporter molecule that binds CYFRA21-1 antigen; and contacting the sample with a fourth reporter molecule that binds pro-SFTPB antigen; and determining the levels of the one or more biomarkers, wherein the one or more biomarkers is selected from the group consisting of diacetylspermine (DAS); wherein the amount of the first reporter molecule, the second reporter molecule, the third reporter molecule, the fourth reporter molecule, and the one or more biomarkers classifies the subject as being at risk of harboring lunc cancer or not at risk of harboring lung cancer.

In another aspect, the disclosure provides a method of determining the risk of a subject for harboring lung cancer, comprising obtaining a biological sample from the subject; measuring the levels of CEA, CA125, CYFRA21-1, and pro-SFTPB antigens in the biological sample; and measuring the levels of one or more metabolite markers selected from the group consisting of diacetylspermine (DAS) in the biological sample; assigning the condition of the subject as either at risk of harboring lung cancer or not at risk of harboring lung cancer, as determined by statistical analysis of the levels of CEA antigen, CA125 antigen, CYFRA21-1 antigen, pro-SFTPB antigen, and diacetylspermine (DAS) in the biological sample.

In another aspect, the disclosure provides a method of treating a subject suspected of having or at risk of harboring lung cancer, comprising analyzing the subject for risk of harboring lung cancer with a method as described herein; administering a therapeutically effective amount of a treatment for the cancer. In one embodiment, the treatment is surgery, chemotherapy, immunotherapy, radiation therapy, targeted therapy, or a combination thereof. In another embodiment, such a method comprises at least one receptor molecule that selectively binds to an antigen selected from the group consisting of CEA, CA125, CYFRA21-1, and pro-SFTPB. In another embodiment, detection of the amount of CEA, CA125, CYFRA21-1, pro-SFTPB, and diacetylspermine (DAS) comprises the use of a solid particle. In another embodiment, the solid particle is a bead. In another embodiment, at least one of the reporter molecules is linked to an enzyme. In another embodiment, at least one of the protein or metabolite markers generates a detectable signal. In another embodiment, the detectable signal is detectable by a spectrometric method. In another embodiment, the spectrometric method is mass spectrometry. In another embodiment, such a method may comprise inclusion of patient history information into the assignment of having lung cancer or not having lung cancer. In another embodiment, such a method may comprise administering at least one alternate diagnostic test for a patient assigned as having lung cancer. In another embodiment, the at least one alternate diagnostic test comprises an assay or sequencing of at least one ctDNA.

In another aspect, the disclosure provides a kit for a method as described herein, comprising a reagent solution that comprises a first solute for detection of CEA antigen; a second solute for detection of CA125 antigen; a third solute for detection of CYFRA21-1 antigen; a fourth solute for detection of pro-SFTPB antigen; and a fifth solute for detection of diacetylspermine (DAS).

In another aspect, the disclosure provides a kit for a method as described herein, comprising a first reagent solution that comprises a first solute for detection of CEA antigen; a second reagent solution that comprises a second solute for detection of CA125 antigen; a third reagent solution that comprises a third solute for detection of CYFRA21-1 antigen; a fourth reagent solution that comprises a fourth solute for detection of pro-SFTPB; a fifth reagent solution that comprises a fifth solute for detection of diacetylspermine (DAS).

In one embodiment, such a kit comprises a device for contacting the reagent solutions with a biological sample. In another embodiment, such a kit comprises at least one surface with means for binding at least one antigen. In another embodiment, the at least one antigen is selected from the group consisting of CEA, CA125, CYFRA21-1, pro-SFTPB. In another embodiment, the at least one surface comprises a means for binding ctDNA.

In another aspect, the disclosure provides a method of treating a subject suspected of risk of harboring lung cancer, comprising: analyzing the subject for risk of harboring lung cancer with a method as described herein; administering a therapeutically effective amount of a treatment for the lung cancer. In one embodiment, the treatment is surgery, chemotherapy, radiation therapy, targeted therapy, or a combination thereof. In another embodiment, such a method comprises at least one receptor molecule that selectively binds to an antigen selected from the group consisting of CEA, CA125, CYFRA21-1, and pro-SFTPB. In another embodiment, detection of the amount of CEA, CA125, CYFRA21-1, pro-SFTPB, or diacetylspermine (DAS) comprises the use of a solid particle. In another embodiment, the solid particle is a bead. In another embodiment, at least one of the reporter molecules is linked to an enzyme. In another embodiment, at least one of the protein or metabolite markers generates a detectable signal. In another embodiment, the detectable signal is detectable by a spectrometric method. In another embodiment, the spectrometric method is mass spectrometry. In another embodiment, such a method comprises inclusion of patient history information into the assignment of having lung cancer or not having lung cancer. In another embodiment, such a method comprises administering at least one alternate diagnostic test for a patient assigned as having lung cancer. In another embodiment, the at least one alternate diagnostic test comprises an assay or sequencing of at least one ctDNA.

In another aspect, the disclosure provides a method of treatment or prevention of progression of lung cancer in a subject in whom the levels of CEA antigen, CA125 antigen, CYFRA21-1 antigen, and pro-SFTPB antigen classifies the subject as having or being at risk of harboring lung cancer comprising one or more of administering a chemotherapeutic drug to the subject with lung cancer; administering therapeutic radiation to the subject with lung cancer; and surgery for partial or complete surgical removal of cancerous tissue in the subject with lung cancer. In one embodiment, the levels of CEA antigen, CA125 antigen, CYFRA21-1 antigen, and pro-SFTPB antigen are elevated. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that does not have lung cancer. In another embodiment, the reference subject or group is healthy. In another embodiment, the AUC (95% CI) is at least 0.83, or is at least 0.80. In another embodiment, the classification of the subject as having lung cancer has a sensitivity of 0.76 and 0.42 at 78% and 94% specificity, respectively. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has adenocarcinoma. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has squamous cell cancer. In another embodiment, the AUC (95% CI) is at least 0.830 or at least 0.800. In another embodiment, the classification of the subject as having lung cancer has a sensitivity of 0.76 and 0.42 at 78% and 94% specificity, respectively. In another embodiment, the lung cancer is diagnosed at or before the borderline resectable stage. In another embodiment, the lung cancer is diagnosed at the resectable stage.

In another aspect, the disclosure provides a method of treatment or prevention of progression of lung cancer in a subject in whom the levels of CEA antigen, CA125 antigen, CYFRA21-1 antigen, pro-SFTPB antigen, diacetylspermine (DAS) classifies the subject as having or being at risk of harboring lung cancer comprising one or more of administering a chemotherapeutic drug to the subject with lung cancer; administering therapeutic radiation to the subject with lung cancer; and surgery for partial or complete surgical removal of cancerous tissue in the subject with lung cancer. In one embodiment, the levels of CEA antigen, CA125 antigen, CYFRA21-1 antigen, and pro-SFTPB antigen are elevated. In another embodiment, the levels of CEA antigen, CA125 antigen, CYFRA21-1 antigen, pro-SFTPB antigen are elevated in comparison to the levels of CEA antigen, CA125 antigen, CYFRA21-1 antigen, pro-SFTPB antigen in a reference subject or group that does not have lung cancer. In another embodiment, the reference subject or group is healthy. In another embodiment, the levels of CEA antigen, CA125 antigen, CYFRA21-1 antigen, pro-SFTPB antigen are elevated in comparison to the levels of CEA antigen, CA125 antigen, CYFRA21-1 antigen, pro-SFTPB antigen in a reference subject or group that has adenocarcinoma. In another embodiment, the levels of CEA antigen, CA125 antigen, CYFRA21-1 antigen, pro-SFTPB antigen are elevated in comparison to the levels of CEA antigen, CA125 antigen, CYFRA21-1 antigen, pro-SFTPB antigen in a reference subject or group that has squamous cell cancer. In another embodiment, the subject is at high-risk of lung cancer.

In another aspect, the disclosure provides a method of treating a subject suspected of risk of harboring lung cancer, comprising analyzing the subject for risk of harboring lung cancer with a method as disclosed herein; administering a therapeutically effective amount of a treatment for the lung cancer. In one embodiment, the treatment is surgery, chemotherapy, radiation therapy, targeted therapy, or a combination thereof.

DETAILED DESCRIPTION

Figure 1:
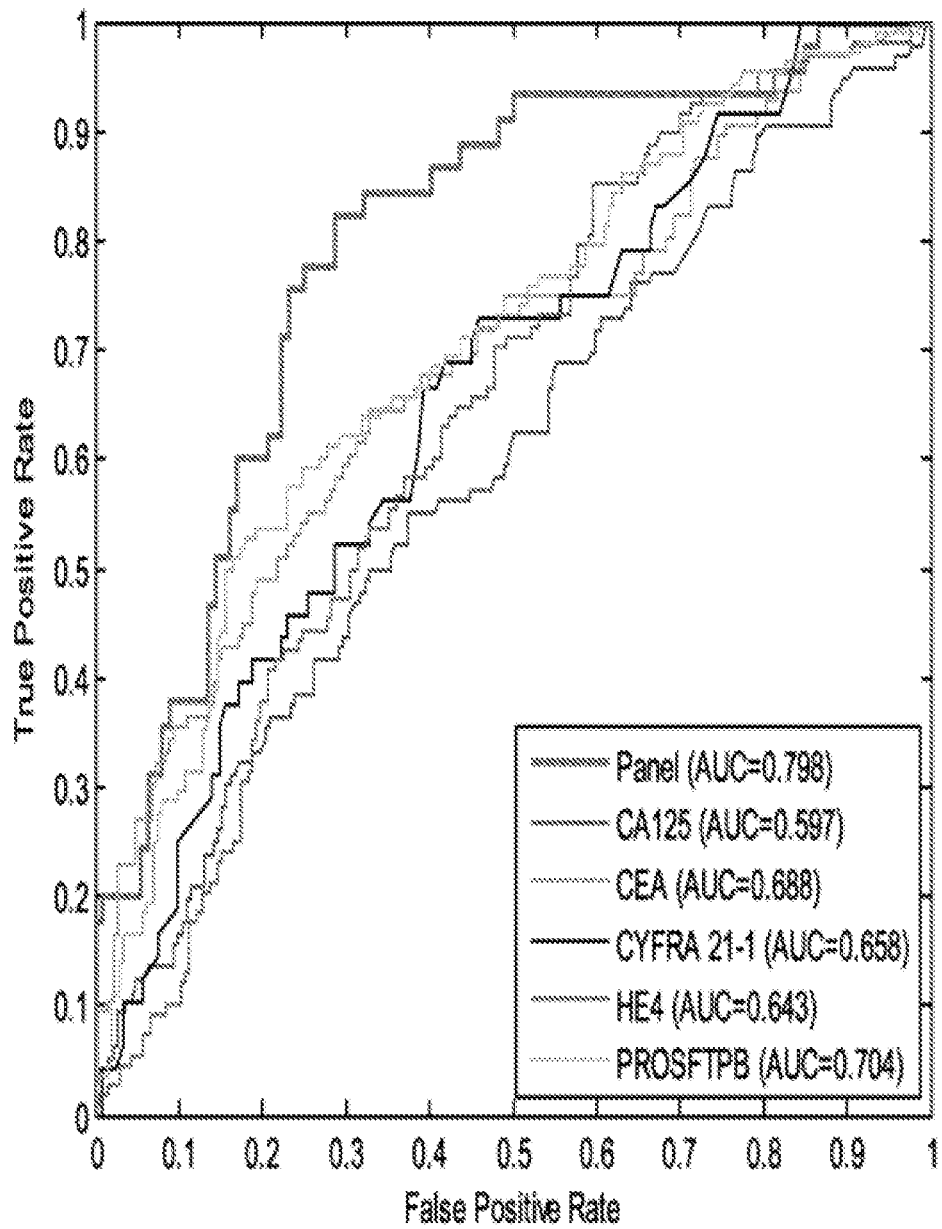
FIG. 1 depicts ROC curves for all 5 biomarkers in CARET along with the 4 marker panel.

In one aspect, the invention provides a method of determining the risk of a subject for harboring lung cancer, comprising obtaining a biological sample from the subject; measuring the level of CEA in the biological sample; measuring the level of CA125 in the biological sample; measuring the level of CYFRA21-1 in the biological sample; measuring the level of Pro-SFTPB in the biological sample; wherein the amount of CEA, CA125, CYFRA21-1, and Pro-SFTPB classifies the subject as being at risk of harboring lung cancer or not at risk of harboring lung cancer.

In another aspect, the invention provides a method of determining the risk of a subject for harboring lung cancer, comprising obtaining a biological sample from the subject; contacting the sample with a first reporter molecule that binds CEA; contacting the sample with a second reporter molecule that binds CA125; contacting the sample with a third reporter molecule that binds CYFRA21-1; contacting the sample with a fourth reporter molecule that binds Pro-SFTPB; wherein the amount of the first reporter molecule, the second reporter molecule, the third reporter molecule, and the fourth reporter molecule classifies the subject as being at risk of harboring lung cancer or not at risk of harboring lung cancer.

In another aspect, the invention provides a method of determining the risk of a subject for harboring lung cancer, comprising obtaining a biological sample from the subject; providing a surface that binds CEA, CA125, CYFRA21-1, and Pro-SFTPB; incubating the surface with the biological sample; contacting the surface with a first reporter molecule that binds CEA; contacting the surface with a second reporter molecule that binds CA125; contacting the surface with a third reporter molecule that binds CYFRA21-1; contacting the surface with a fourth reporter molecule that binds Pro-SFTPB; measuring the amount of the first reporter molecule that is associated with the surface; measuring the amount of the second reporter molecule that is associated with the surface; measuring the amount of the third reporter molecule that is associated with the surface; measuring the amount of the fourth reporter molecule that is associated with the surface; wherein the amount of the first reporter molecule, the second reporter molecule, the third reporter molecule, and the fourth reporter molecule classifies the subject as being at risk of harboring lung cancer or not at risk of harboring lung cancer.

In another aspect, the invention provides a method of determining the risk of a subject for harboring lung cancer, comprising obtaining a biological sample from the subject; providing a first surface with means for binding CEA; providing a second surface with means for binding CA125; providing a third surface with means for binding CYFRA21-1; providing a fourth surface with means for binding Pro-SFTPB; incubating the first surface with the biological sample; incubating the second surface with the biological sample; incubating the third surface with the biological sample; incubating the fourth surface with the biological sample; contacting the first surface with a first reporter molecule that binds CEA; contacting the second surface with a second reporter molecule that binds CA125; contacting the third surface with a third reporter molecule that binds CYFRA21-1; contacting the fourth surface with a third reporter molecule that binds pro-SFTPB; measuring the amount of the first reporter molecule associated with the first surface; measuring the amount of the second reporter molecule associated with the second surface; measuring the amount of the third reporter molecule associated with the third surface; measuring the amount of the third reporter molecule associated with the fourth surface; wherein the amount of the first reporter molecule, the second reporter molecule, the third reporter molecule, and the fourth reporter molecule classifies the subject as being at risk of harboring lung cancer or not at risk of harboring lung cancer.

A method of determining the risk of a subject for harboring lung cancer, comprising obtaining a biological sample from the subject; providing a surface with means for binding CEA, CA125, CYFRA21-1, and Pro-SFTPB; incubating the surface with the biological sample; contacting the surface with a first relay molecule that binds CEA; contacting the surface with a second relay molecule that binds CA125; contacting the surface with a third relay molecule that binds CYFRA21-1; contacting the surface with a fourth relay molecule that binds Pro-SFTPB; contacting the surface with a first reporter molecule that binds to the first relay molecule; contacting the surface with a second reporter molecule that binds to the second relay molecule; contacting the surface with a third reporter molecule that binds to the third relay molecule; contacting the surface with a fourth reporter molecule that binds to the fourth relay molecule; measuring the amount of the first reporter molecule associated with the first relay molecule and CEA; measuring the amount of the second reporter molecule associated with the second relay molecule and CA125; measuring the amount of the third reporter molecule associated with the third relay molecule and CYFRA21-1; measuring the amount of the fourth reporter molecule associated with the fourth relay molecule and Pro-SFTPB; wherein the amount of the first reporter molecule, the second reporter molecule, the third reporter molecule, and the fourth reporter molecule classifies the subject as being at risk of harboring lung cancer or not at risk of harboring lung cancer.

In another aspect, the invention provides a method of determining the risk of a subject for harboring lung cancer, comprising obtaining a biological sample from the subject; providing a first surface with means for binding CEA; providing a second surface with means for binding CA125; providing a third surface with means for binding CYFRA21-1; providing a fourth surface with means for binding Pro-SFTPB; incubating the first surface with the biological sample; incubating the second surface with the biological sample; incubating the third surface with the biological sample; incubating the fourth surface with the biological sample; contacting the first surface with a first relay molecule that binds CEA; contacting the second surface with a second relay molecule that binds CA125; contacting the third surface with a third relay molecule that binds CYFRA21-1; contacting the fourth surface with a fourth relay molecule that binds Pro-SFTPB; contacting the first surface with a first reporter molecule that binds to the first relay molecule; contacting the second surface with a second reporter molecule that binds to the second relay molecule; contacting the third surface with a third reporter molecule that binds to the third relay molecule; contacting the fourth surface with a fourth reporter molecule that binds to the fourth relay molecule; measuring the amount of the first reporter molecule that is associated with the first relay molecule and CEA; measuring the amount of the second reporter molecule that is associated with the second relay molecule and CA125; measuring the amount of the third reporter molecule that is associated with the third relay molecule and CYFRA21-1; measuring the amount of the fourth reporter molecule that is associated with the fourth relay molecule and Pro-SFTPB; wherein the amount of the first reporter molecule, the second reporter molecule, the third reporter molecule, and the fourth reporter molecule classifies the subject as being at risk of harboring lung cancer or not at risk of harboring lung cancer.

In one embodiment, the amounts of CEA, CA125, CYFRA21-1, and pro-SFTPB or the reporter molecules bound thereto are elevated in the subject relative to a healthy subject. The method as recited in any one of claims 1-7, wherein at least one of the surfaces further comprises at least one receptor molecule that selectively binds to a biomarker selected from CEA, CA125, CYFRA21-1, and Pro-SFTPB.

In another embodiment, the amounts of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that does not have lung cancer. In another embodiment, at least one of the surfaces further comprises at least one receptor molecule that selectively binds to a biomarker or antigen selected from CEA, CA125, CYFRA21-1, and Pro-SFTPB. In another embodiment, the reference subject or group is healthy. In another embodiment, such methods further comprising: measuring the level of diacetylspermine (DAS) in the biological sample; wherein the amount of diacetylspermine (DAS) classifies the patient as being at risk of harboring lung cancer or not at risk of harboring lung cancer. In another embodiment, the sample comprises a biological sample selected from blood, plasma, and serum. In another embodiment, the biological sample is serum. In another embodiment, the amount of CEA, CA125, CYFRA21-1, and pro-SFTPB is quantified. In another embodiment, the concentrations of CEA, CA125, CYFRA21-1, Pro-SFTPB, and diacetylspermine (DAS) are measured. In another embodiment, the subject is determined to have lung cancer based on the measured concentrations of the biomarkers. In another embodiment, the measured concentrations are used to calculate a biomarker score based on sensitivity and specificity values at a cutoff set forth in Table 10. In another embodiment, such methods further comprising the steps of: comparing the measured concentrations of each biomarker in the biological sample to the prediction of a statistical model. In another embodiment, the panel is selected from the group consisting of: a. the panel consisting of CEA, CA125, CYFRA21-1, and Pro-SFTPB; or b. the panel consisting of CEA, CA125, CYFRA21-1, Pro-SFTPB, and diacetylspermine (DAS). In another embodiment, at least one of the surfaces is the surface of a solid particle. In another embodiment, the solid particle is a bead. In another embodiment, at least one of the reporter molecules is linked to an enzyme. In another embodiment, at least one of the reporter molecules provides a detectable signal. In another embodiment, the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the spectrometric method is mass spectrometry. In another embodiment, the panel comprises biomarkers that have been identified by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the panel comprises biomarkers that have been identified by UV-visible spectroscopy or proton NMR spectroscopy. In another embodiment, the first reporter binds selectively to CEA. In another embodiment, the second reporter binds selectively to CA125. In another embodiment, the third reporter binds selectively to CYFRA21-1. In another embodiment, the fourth reporter binds selectively to Pro-SFTPB. In another embodiment, determination of CEA, CA125, CYFRA21-1, and pro-SFTPB levels is made at substantially the same time. In another embodiment, determination of CEA, CA125, CYFRA21-1, and pro-SFTPB levels is made in a stepwise manner. In another embodiment, such methods comprise inclusion of subject history information into the assignment of having lung cancer or not having lung cancer. In another embodiment, such methods comprise administering at least one alternate diagnostic test for a subject assigned as having lung cancer. In another embodiment, the at least one alternate diagnostic test comprises an assay or sequencing of at least one ctDNA.

In another aspect, the invention provides a method of treating a subject suspected of harboring lung cancer, comprising analyzing the subject for risk of harboring lung cancer with a method as described herein, and administering a therapeutically effective amount of a treatment for the cancer. In one embodiment, the treatment is surgery, chemotherapy, immunotherapy, radiation therapy, targeted therapy, or a combination thereof In another embodiment, the classification of the subject as having lung cancer has a sensitivity of 0.76 and 0.42 at 78% and 94% specificity, respectively. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has adenocarcinoma. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has squamous cell cancer. In another embodiment, such methods further comprise comparing the amount of CEA, CA125, CYFRA21-1, and pro-SFTPB with a cutoff value as exemplified in Table 10. In another embodiment, the cutoff value comprises an AUC (95% CI) of at least 0.83. In another embodiment, the cutoff value comprises an AUC (95% CI) of at least 0.80. In another embodiment, the classification of the subject as having lung cancer has a sensitivity of 0.76 and 0.42 at 78% and 94% specificity, respectively. In another embodiment, the lung cancer is diagnosed at or before the borderline resectable stage. In another embodiment, the lung cancer is diagnosed at the resectable stage.

In another aspect, the invention provides a method of determining the risk of a subject for harboring lung cancer, comprising obtaining a biological sample from the subject; measuring the level of CEA in the biological sample by contacting the biological sample with a CEA antibody and observing binding between CEA and the antibody; measuring the level of CA125 in the biological sample by contacting the biological sample with a CA125 antibody and observing binding between CA125 and the antibody; measuring the level of CYFRA21-1 in the biological sample by contacting the biological sample with a CYFRA21-1 antibody and observing binding between CYFRA21-1 and the antibody; measuring the level of pro-SFTPB in the biological sample by contacting the biological sample with a pro-SFTPB antibody and observing binding between pro-SFTPB and the antibody; assigning the condition of the subject as either at risk of harboring lung cancer or not at risk of harboring lung cancer, as determined by the measurements of CEA, CA125, CYFRA21-1, and pro-SFTPB levels.

In another aspect, the invention provides a method of determining the risk of a subject for harboring lung cancer, comprising obtaining a biological sample from the subject; measuring the level of CEA in the biological sample; measuring the level of CA125 in the biological sample; measuring the level of CYFRA21-1 in the biological sample; measuring the level of pro-SFTPB in the biological sample; determining the level of CEA relative to a first standard value, wherein the ratio is predictive of presence of lung cancer; determining the level of CA125 relative to a second standard value, wherein the ratio is predictive of presence of lung cancer; determining the level of CYFRA21-1 relative to a third standard value, wherein the ratio is predictive of presence of lung cancer; and determining the level of pro-SFTPB relative to a fourth standard value, wherein the ratio is predictive of presence of lung cancer; and assigning the condition of the subject as either at risk of harboring lung cancer or not at risk of harboring lung cancer, as determined by statistical analysis of the ratios of CEA, CA125, CYFRA21-1, and pro-SFTPB levels.

In another aspect, the invention provides a method of predicting the risk of a subject for harboring lung, comprising obtaining a biological sample from the subject; measuring the levels of the CEA, CA125, CYFRA21-1, and pro-SFTPB biomarkers in the biological sample; and calculating a predictive factor as determined by statistical analysis of the CEA, CA125, CYFRA21-1, and pro-SFTPB levels.

In another aspect, the invention provides a method of determining the risk of a subject for harboring lung cancer, comprising obtaining a biological sample from the subject; measuring the levels of CEA, CA125, CYFRA21-1, and pro-SFTPB biomarkers in the biological sample; assigning the condition of the subject as either at risk of harboring lung cancer or not at risk of harboring lung cancer, as determined by statistical analysis of the levels of CEA, CA125, CYFRA21-1, and pro-SFTPB in the biological sample.

In another aspect, the invention provides a method for determining the risk of a subject for harboring lung cancer using a biological sample obtained from a subject suspected of having lung cancer, comprising assaying for the level of CEA present in the biological sample using at least one antibody or antibody fraction specific for CEA; and assaying for the level of CA125 present in the biological sample using at least one antibody or antibody fraction specific for CA125; and assaying for the level of CYFRA21-1 present in the biological sample using at least one antibody or antibody fraction specific for CYFRA21-1; and assaying for the level of pro-SFTPB present in the biological sample using at least one antibody or antibody fraction specific for pro-SFTPB; and determining whether the levels of CEA, CA125, CYFRA21-1, and pro-SFTPB are indicative of the subject having lung cancer.

In another aspect, the invention provides a method for determining the risk of a subject for harboring lung cancer comprising obtaining a biological sample sample from a subject; performing an immunoassay on the sample with an anti-CEA antibody or antigen-binding fragment thereof; performing an immunoassay on the sample with an anti-CA125 antibody or antigen-binding fragment thereof; performing an immunoassay on the sample with an anti-CYFRA21-1 antibody or antigen-binding fragment thereof; performing an immunoassay on the sample with an anti-pro-SFTPB antibody or antigen-binding fragment thereof; wherein binding of the antibodies is indicative of lung cancer in the subject and the immunoassay can detect early stage lung cancer.

In another aspect, the invention provides a method for determining the risk of a subject for harboring lung cancer comprising obtaining a biological sample sample from the subject; performing an immunoassay with an anti-CEA antibody or antigen-binding fragment thereof; performing an immunoassay with an anti-CA125 antibody or antigen-binding fragment thereof; performing an immunoassay with an anti-CYFRA21-1 antibody or antigen-binding fragment thereof; performing an immunoassay with an anti-pro-SFTPB antibody or antigen-binding fragment thereof; determining whether the levels of CEA, CA125, CYFRA21-1, and pro-SFTPB are indicative of the subject having lung cancer. In one embodiment, the levels of CEA, CA125, CYFRA21-1, and pro-SFTPB are elevated in the subject relative to a healthy subject. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that does not have lung cancer. In another embodiment, the reference subject or group is healthy. In another embodiment, at least one of the surfaces further comprises at least one receptor molecule that selectively binds to a biomarker or antigen selected from CEA, CA125, CYFRA21-1, and Pro-SFTPB. In another embodiment, at least one of the surfaces is the surface of a solid particle. In another embodiment, such methods further comprise measuring the level of diacetylspermine (DAS) in the biological sample; wherein the amount of diacetylspermine (DAS) classifies the patient as being at risk of harboring lung cancer or not at risk of harboring lung cancer. In another embodiment, the sample comprises a biological sample selected from blood, plasma, and serum. In another embodiment, the biological sample is serum. In another embodiment, the amount of CEA, CA125, CYFRA21-1, and pro-SFTPB is quantified. In another embodiment, detection of the amount of CEA, CA125, CYFRA21-1, pro-SFTPB, and diacetylspermine (DAS) comprises the use of a solid particle. In another embodiment, the solid particle is a bead. In another embodiment, at least one of the reporter molecules is linked to an enzyme. In another embodiment, at least one of the reporter molecules provides a detectable signal. In another embodiment, the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the concentrations of CEA, CA125, CYFRA21-1, Pro-SFTPB, and diacetylspermine (DAS) are measured. In another embodiment, the subject is determined to have lung cancer based on the measured concentrations of the biomarkers. In another embodiment, the measured concentrations are used to calculate a biomarker score based on sensitivity and specificity values at a cutoff set forth in Table 10. In another embodiment, such methods further comprise the steps of: comparing the measured concentrations of each biomarker in the biological sample to the prediction of a statistical model. In another embodiment, the panel is selected from the group consisting of: a. the panel consisting of CEA, CA125, CYFRA21-1, and Pro-SFTPB; or b. the panel consisting of CEA, CA125, CYFRA21-1, Pro-SFTPB, and diacetylspermine (DAS). In another embodiment, the panel comprises biomarkers that have been identified by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the panel comprises biomarkers that have been identified by UV-visible spectroscopy or proton NMR spectroscopy. In another embodiment, the first reporter binds selectively to CEA. In another embodiment, the second reporter binds selectively to CA125. In another embodiment, the third reporter binds selectively to CYFRA21-1. In another embodiment, the fourth reporter binds selectively to Pro-SFTPB. In another embodiment, determination of CEA, CA125, CYFRA21-1, and pro-SFTPB levels is made at substantially the same time. In another embodiment, determination of CEA, CA125, CYFRA21-1, and pro-SFTPB levels is made in a stepwise manner. In another embodiment, such methods further comprise inclusion of subject history information into the assignment of having lung cancer or not having lung cancer. In another embodiment, such methods comprise administering at least one alternate diagnostic test for a subject assigned as having lung cancer. In another embodiment, the at least one alternate diagnostic test comprises an assay or sequencing of at least one ctDNA.

In another aspect, the invention provides a method of treating a subject suspected of harboring lung cancer, comprising analyzing the subject for risk of harboring lung cancer with a method as described herein; and administering a therapeutically effective amount of a treatment for the cancer. In another embodiment, the treatment is surgery, chemotherapy, immunotherapy, radiation therapy, targeted therapy, or a combination thereof. In another embodiment, the classification of the subject as having lung cancer has a sensitivity of 0.76 and 0.42 at 78% and 94% specificity, respectively. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has adenocarcinoma. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has squamous cell cancer. In another embodiment, such methods further comprise comparing the amount of CEA, CA125, CYFRA21-1, and pro-SFTPB with a cutoff value as exemplified in Table 10. In another embodiment, the cutoff value comprises an AUC (95% CI) of at least 0.83. In another embodiment, the cutoff value comprises an AUC (95% CI) of at least 0.80. In another embodiment, the classification of the subject as having lung cancer has a sensitivity of 0.76 and 0.42 at 78% and 94% specificity, respectively. In another embodiment, the lung cancer is diagnosed at or before the borderline resectable stage. In another embodiment, the lung cancer is diagnosed at the resectable stage.

In another aspect, the invention provides a kit for the methods disclosed herein, comprising a reagent solution that comprises a first solute for detection of CEA; a second solute for detection of CA125; a third solute for detection of CYFRA21-1; and a fourth solute for detection of pro-SFTPB.

In another aspect, the invention provides a kit for the methods disclosed herein, comprising a first reagent solution that comprises a first solute for detection of CEA; a second reagent solution that comprises a second solute for detection of CA125; a third reagent solution that comprises a third solute for detection of CYFRA21-1; and a fourth reagent solution that comprises a fourth solute for detection of pro-SFTPB. In another embodiment, such methods further comprise: a reagent solution that comprises a first solute for detection of CEA antigen; a second solute for detection of CA125 antigen; a third solute for detection of CYFRA21-1 antigen; a fourth solute for detection of pro-SFTPB antigen; and a fifth solute for detection of diacetylspermine (DAS). In another embodiment, such methods further comprise a device for contacting the reagent solutions with a biological sample. In another embodiment, such methods comprise at least one surface with means for binding at least one biomarker or antigen. In another embodiment, the at least one biomarker is selected from the group consisting of CEA, CA125, CYFRA21-1, and pro-SFTPB. In another embodiment, the at least one surface comprises a means for binding ctDNA. In another embodiment, such methods further comprise an antibody or antigen-binding fragment thereof that binds to the metabolite biomarker diacetylspermine (DAS). In another embodiment, the antigen-binding reagent comprises antibodies or antigen-binding fragments thereof, RNA, DNA, or RNA/DNA hybrids.

In another aspect, the invention provides a method of determining the risk of a subject for harboring lung cancer, comprising obtaining a biological sample from the patient; measuring the level of diacetylspermine (DAS) in the biological sample; wherein the amount of diacetylspermine (DAS) classifies the subject as being at risk of harboring lung cancer or not at risk of harboring lung cancer.

In another aspect, the invention provides a method of determining the risk of a subject for harboring lung cancer, comprising a plasma-derived biomarker panel and a protein marker panel: wherein the plasma-derived biomarker panel comprises diacetylspermine (DAS); wherein the protein biomarker panel comprises CEA, CA125, CYFRA21-1, and pro-SFTPB; wherein the method comprises: obtaining a biological sample from the subject; measuring the levels of the plasma-derived biomarkers and the protein biomarkers in the biological sample; wherein the amount of the plasma-derived biomarkers and the protein biomarkers classifies the subject as being at risk of harboring lung cancer or not at risk of harboring lung cancer.

In another aspect, the invention provides a method of determining the risk of a subject for harboring lung cancer, comprising determining the levels of one or more protein biomarkers and one or more metabolite markers, said method comprising: obtaining a biological sample from the subject; contacting the sample with a first reporter molecule that binds CEA antigen; contacting the sample with a second reporter molecule that binds CA125 antigen; contacting the sample with a third reporter molecule that binds CYFRA21-1 antigen; and contacting the sample with a fourth reporter molecule that binds pro-SFTPB antigen; and determining the levels of the one or more biomarkers, wherein the one or more biomarkers is selected from the group consisting of diacetylspermine (DAS); wherein the amount of the first reporter molecule, the second reporter molecule, the third reporter molecule, the fourth reporter molecule, and the one or more biomarkers classifies the subject as being at risk of harboring lunc cancer or not at risk of harboring lung cancer.

In another aspect, the invention provides a method of determining the risk of a subject for harboring lung cancer, comprising obtaining a biological sample from the subject; measuring the levels of CEA, CA125, CYFRA21-1, and pro-SFTPB antigens in the biological sample; and measuring the levels of one or more metabolite markers selected from the group consisting of diacetylspermine (DAS) in the biological sample; assigning the condition of the subject as either at risk of harboring lung cancer or not at risk of harboring lung cancer, as determined by statistical analysis of the levels of CEA antigen, CA125 antigen, CYFRA21-1 antigen, pro-SFTPB antigen, and diacetylspermine (DAS) in the biological sample. In one embodiment, the levels of CEA, CA125, CYFRA21-1, and pro-SFTPB or the reporter molecules bound thereto are elevated in the subject relative to a healthy subject. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that does not have lung cancer. In another embodiment, the reference subject or group is healthy. In another embodiment, such methods comprise at least one receptor molecule that selectively binds to a biomarker or antigen selected from the group consisting of CEA, CA125, CYFRA21-1, and pro-SFTPB. In another embodiment, such methods further comprise: measuring the level of diacetylspermine (DAS) in the biological sample; wherein the amount of diacetylspermine (DAS) classifies the patient as being at risk of harboring lung cancer or not at risk of harboring lung cancer. In another embodiment, the sample comprises a biological sample selected from blood, plasma, and serum. In another embodiment, the biological sample is serum. In another embodiment, the amount of CEA, CA125, CYFRA21-1, and pro-SFTPB is quantified. In another embodiment, detection of the amount of CEA, CA125, CYFRA21-1, pro-SFTPB, and diacetylspermine (DAS) comprises the use of a solid particle. In another embodiment, the solid particle is a bead. In another embodiment, at least one of the reporter molecules is linked to an enzyme. In another embodiment, at least one of the reporter molecules provides a detectable signal. In another embodiment, the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the concentrations of CEA, CA125, CYFRA21-1, Pro-SFTPB, and diacetylspermine (DAS) are measured. In another embodiment, the subject is determined to have lung cancer based on the measured concentrations of the biomarkers. In another embodiment, the measured concentrations are used to calculate a biomarker score based on sensitivity and specificity values at a cutoff set forth in Table 10. In another embodiment, such methods further comprise the steps of: comparing the measured concentrations of each biomarker in the biological sample to the prediction of a statistical model. In another embodiment, the panel is selected from the group consisting of: a. the panel consisting of CEA, CA125, CYFRA21-1, and Pro-SFTPB; or b. the panel consisting of CEA, CA125, CYFRA21-1, Pro-SFTPB, and diacetylspermine (DAS). In another embodiment, the panel comprises biomarkers that have been identified by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the panel comprises biomarkers that have been identified by UV-visible spectroscopy or proton NMR spectroscopy. In another embodiment, the first reporter binds selectively to CEA. In another embodiment, the second reporter binds selectively to CA125. In another embodiment, the third reporter binds selectively to CYFRA21-1. In another embodiment, the fourth reporter binds selectively to Pro-SFTPB. In another embodiment, determination of CEA, CA125, CYFRA21-1, and pro-SFTPB levels is made at substantially the same time. In another embodiment, determination of CEA, CA125, CYFRA21-1, and pro-SFTPB levels is made in a stepwise manner. In another embodiment, such methods further comprise inclusion of subject history information into the assignment of having lung cancer or not having lung cancer. In another embodiment, such methods comprise administering at least one alternate diagnostic test for a subject assigned as having lung cancer. In another embodiment, the at least one alternate diagnostic test comprises an assay or sequencing of at least one ctDNA.

In another aspect, the invention provides a method of treating a subject suspected of harboring lung cancer, comprising analyzing the subject for risk of harboring lung cancer with a method as recited herein; and administering a therapeutically effective amount of a treatment for the cancer. In another embodiment, the treatment is surgery, chemotherapy, immunotherapy, radiation therapy, targeted therapy, or a combination thereof. In another embodiment, the classification of the subject as having lung cancer has a sensitivity of 0.76 and 0.42 at 78% and 94% specificity, respectively. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has adenocarcinoma. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has squamous cell cancer. In another embodiment, such methods further comprise comparing the amount of CEA, CA125, CYFRA21-1, and pro-SFTPB with a cutoff value as exemplified in Table 10. In another embodiment, the cutoff value comprises an AUC (95% CI) of at least 0.83. In another embodiment, the cutoff value comprises an AUC (95% CI) of at least 0.80. In another embodiment, the classification of the subject as having lung cancer has a sensitivity of 0.76 and 0.42 at 78% and 94% specificity, respectively. In another embodiment, the lung cancer is diagnosed at or before the borderline resectable stage. In another embodiment, the lung cancer is diagnosed at the resectable stage.

In another embodiment, the invention provides a kit for the method as described herein, comprising: a reagent solution that comprises a first solute for detection of CEA antigen; a second solute for detection of CA125 antigen; a third solute for detection of CYFRA21-1 antigen; a fourth solute for detection of pro-SFTPB antigen; and a fifth solute for detection of diacetylspermine (DAS).

In another embodiment, the invention provides a kit for a method as described herein, comprising a first reagent solution that comprises a first solute for detection of CEA antigen; a second reagent solution that comprises a second solute for detection of CA125 antigen; a third reagent solution that comprises a third solute for detection of CYFRA21-1 antigen; a fourth reagent solution that comprises a fourth solute for detection of pro-SFTPB; a fifth reagent solution that comprises a fifth solute for detection of diacetylspermine (DAS). In another embodiment, such a kit further comprises: a reagent solution that comprises a first solute for detection of CEA antigen; a second solute for detection of CA125 antigen; a third solute for detection of CYFRA21-1 antigen; a fourth solute for detection of pro-SFTPB antigen; and a fifth solute for detection of diacetylspermine (DAS). In another embodiment, the kit comprises a device for contacting the reagent solutions with a biological sample. In another embodiment, such a kit comprises at least one surface with means for binding at least one biomarker or antigen. In another embodiment, the at least one biomarker is selected from the group consisting of CEA, CA125, CYFRA21-1, and pro-SFTPB. In another embodiment, the at least one surface comprises a means for binding ctDNA. In another embodiment, such a kit further comprises an antibody or antigen-binding fragment thereof that binds to the metabolite biomarker diacetylspermine (DAS). In another embodiment, the antigen-binding reagent comprises antibodies or antigen-binding fragments thereof, RNA, DNA, or RNA/DNA hybrids.

In another aspect, the invention provides a method of treatment or prevention of progression of lung cancer in a subject in whom the levels of CEA antigen, CA125 antigen, CYFRA21-1 antigen, and pro-SFTPB antigen classifies the subject as having or being at risk of harboring lung cancer comprising one or more of: administering a chemotherapeutic drug to the subject with lung cancer; administering therapeutic radiation to the subject with lung cancer; and surgery for partial or complete surgical removal of cancerous tissue in the subject with lung cancer.

In another aspect, the invention provides a method of treatment or prevention of progression of lung cancer in a subject in whom the levels of CEA antigen, CA125 antigen, CYFRA21-1 antigen, pro-SFTPB antigen, diacetylspermine (DAS) classifies the subject as having or being at risk of harboring lung cancer comprising one or more of: administering a chemotherapeutic drug to the subject with lung cancer; administering therapeutic radiation to the subject with lung cancer; and surgery for partial or complete surgical removal of cancerous tissue in the subject with lung cancer.

In another aspect, the invention provides a method for detecting and treating lung cancer, comprising: detecting CEA, CA125, CYFRA21-1, and pro-SFTPB, in a biological sample obtained from a human, via an immunoassay; quantifying the amounts CEA, CA125, CYFRA21-1, and pro-SFTPB in said collected sample; comparing the amounts of CEA, CA125, CYFRA21-1, and pro-SFTPB with a cutoff value to determine whether said human is at increased risk of having lung cancer or not; wherein if the levels are above the cutoff value said human has lung cancer, and administering a treatment for lung cancer to said human having lung cancer.

In another aspect, the invention provides a method of determining risk of a subject of harboring lung cancer, comprising: in biological samples from a subject in need of analysis, measuring the concentration of CEA, CA125, CYFRA21-1, and Pro-SFTPB; and comparing the concentration of the biomarkers in the samples of the subject in need of diagnosis and the concentration in a normal or non-diseased subject, wherein the subject in need of diagnosis is diagnosed with lung cancer, wherein the diagnosis is based on a cutoff value at a sensitivity or specificity value as set forth in Table 10.

In another aspect, the invention provides a method of determining evidence of lung cancer in a biological sample, comprising measuring the concentration of a biomarker panel comprising CEA, CA125, CYFRA21-1, Pro-SFTPB, and diacetylspermine (DAS), and identifiable parts thereof in a biological sample from a subject, wherein a change in the concentration of each of the biomarkers based on a sensitivity or specificity for a cutoff set forth in Table 10 is characteristic of lung cancer. In another embodiment, the levels of CEA, CA125, CYFRA21-1, and pro-SFTPB or the reporter molecules bound thereto are elevated in the subject relative to a healthy subject. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that does not have lung cancer. In another embodiment, the reference subject or group is healthy. In another embodiment, at least one of the surfaces further comprises at least one receptor molecule that selectively binds to a biomarker or antigen selected from CEA, CA125, CYFRA21-1, and Pro-SFTPB. In another embodiment, at least one of the surfaces is the surface of a solid particle. In another embodiment, the solid particle comprises a bead. In another embodiment, such methods comprising: measuring the level of diacetylspermine (DAS) in the biological sample; wherein the amount of diacetylspermine (DAS) classifies the patient as being at risk of harboring lung cancer or not at risk of harboring lung cancer. In another embodiment, the sample comprises a biological sample selected from blood, plasma, and serum. In another embodiment, the biological sample is serum. In another embodiment, the amount of CEA, CA125, CYFRA21-1, and pro-SFTPB is quantified. In another embodiment, detection of the amount of CEA, CA125, CYFRA21-1, pro-SFTPB, and diacetylspermine (DAS) comprises the use of a solid particle. In another embodiment, the solid particle is a bead. In another embodiment, at least one of the reporter molecules is linked to an enzyme. In another embodiment, at least one of the reporter molecules provides a detectable signal. In another embodiment, the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the concentrations of CEA, CA125, CYFRA21-1, Pro-SFTPB, and diacetylspermine (DAS) are measured. In another embodiment, the subject is determined to have lung cancer based on the measured concentrations of the biomarkers. In another embodiment, the measured concentrations are used to calculate a biomarker score based on sensitivity and specificity values at a cutoff set forth in Table 10. In another embodiment, such methods further comprise the steps of: comparing the measured concentrations of each biomarker in the biological sample to the prediction of a statistical model. In another embodiment, the panel is selected from the group consisting of: a. the panel consisting of CEA, CA125, CYFRA21-1, and Pro-SFTPB; or b. the panel consisting of CEA, CA125, CYFRA21-1, Pro-SFTPB, and diacetylspermine (DAS). In another embodiment, the panel comprises biomarkers that have been identified by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry. In another embodiment, the panel comprises biomarkers that have been identified by UV-visible spectroscopy or proton NMR spectroscopy. In another embodiment, the first reporter binds selectively to CEA. In another embodiment, the second reporter binds selectively to CA125. In another embodiment, the third reporter binds selectively to CYFRA21-1. In another embodiment, the fourth reporter binds selectively to Pro-SFTPB. In another embodiment, determination of CEA, CA125, CYFRA21-1, and pro-SFTPB levels is made at substantially the same time. In another embodiment, determination of CEA, CA125, CYFRA21-1, and pro-SFTPB levels is made in a stepwise manner. In another embodiment, such methods comprise inclusion of subject history information into the assignment of having lung cancer or not having lung cancer. In another embodiment, such methods comprise administering at least one alternate diagnostic test for a subject assigned as having lung cancer. In another embodiment, the at least one alternate diagnostic test comprises an assay or sequencing of at least one ctDNA.

In another embodiment, the method of treating a subject suspected of harboring lung cancer, comprising analyzing the subject for risk of harboring lung cancer with a method as described herein; and administering a therapeutically effective amount of a treatment for the cancer. In another embodiment, the treatment is surgery, chemotherapy, immunotherapy, radiation therapy, targeted therapy, or a combination thereof. In another embodiment, the classification of the subject as having lung cancer has a sensitivity of 0.76 and 0.42 at 78% and 94% specificity, respectively. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has adenocarcinoma. In another embodiment, the levels of CEA antigen, CA125 antigen, CYFRA21-1 antigen, and pro-SFTPB antigen are elevated in comparison to the levels of CEA antigen, CA125 antigen, CYFRA21-1 antigen, and pro-SFTPB antigen in a reference subject or group that has squamous cell cancer. In another embodiment, such methods further comprise comparing the amount of CEA, CA125, CYFRA21-1, and pro-SFTPB with a cutoff value as exemplified in Table 10. In another embodiment, the cutoff value comprises an AUC (95% CI) of at least 0.83. In another embodiment, the cutoff value comprises an AUC (95% CI) of at least 0.80. In another embodiment, the classification of the subject as having lung cancer has a sensitivity of 0.76 and 0.42 at 78% and 94% specificity, respectively. In another embodiment, the lung cancer is diagnosed at or before the borderline resectable stage. In another embodiment, the lung cancer is diagnosed at the resectable stage. In another embodiment, such methods further comprise: providing a surface that binds CEA, CA125, CYFRA21-1, and Pro-SFTPB; incubating the surface with the biological sample; contacting the surface with a first reporter molecule that binds CEA; contacting the surface with a second reporter molecule that binds CA125; contacting the surface with a third reporter molecule that binds CYFRA21-1; contacting the surface with a fourth reporter molecule that binds Pro-SFTPB; measuring the amount of the first reporter molecule that is associated with the surface; measuring the amount of the second reporter molecule that is associated with the surface; measuring the amount of the third reporter molecule that is associated with the surface; measuring the amount of the fourth reporter molecule that is associated with the surface; wherein the amount of the first reporter molecule, the second reporter molecule, the third reporter molecule, and the fourth reporter molecule classifies the subject as being at risk of harboring lung cancer or not at risk of harboring lung cancer.

In another aspect, the invention provides a kit for determining the presence of indicators of lung cancer in a sample from the subject comprising: (a) antigen-binding reagents that bind to each of the protein biomarkers selected from the group consisting of CEA, CA125, CYFRA21-1, and pro-SFTPB, or an array comprising said antigen-binding reagents; and (b) instructions for performing a method for determining the presence of lung cancer in an individual. In one embodiment, such a kit further comprises: a reagent solution that comprises a first solute for detection of CEA antigen; a second solute for detection of CA125 antigen; a third solute for detection of CYFRA21-1 antigen; a fourth solute for detection of pro-SFTPB antigen; and a fifth solute for detection of diacetylspermine (DAS). In another embodiment, such a kit comprises a device for contacting the reagent solutions with a biological sample. In another embodiment, such a kit comprises at least one surface with means for binding at least one biomarker or antigen. In another embodiment, the at least one biomarker or antigen is selected from the group consisting of CEA, CA125, CYFRA21-1, and pro-SFTPB. In another embodiment, the at least one surface comprises a means for binding ctDNA. In another embodiment, such a kit further comprises an antibody or antigen-binding fragment thereof that binds to the metabolite biomarker diacetylspermine (DAS). In another embodiment, the antigen-binding reagent comprises antibodies or antigen-binding fragments thereof, RNA, DNA, or RNA/DNA hybrids.

In another aspect, the invention provides a method comprising: a) obtaining a sample from a subject asymptomatic for lung cancer; b) measuring a panel of markers in the sample, wherein the markers comprise CEA, CA125, Cyfra 21-1, and diacetylspermine (DAS); c) determining a biomarker score for each marker; d) summing the biomarker scores for each marker to obtain a composite score for each subject, quantifying the increased risk for the presence of lung cancer for the subject as a risk score, wherein the composite score is matched to a risk category of a grouping of stratified subject populations, wherein each risk category comprises a multiplier indicating increased likelihood of having the lung cancer correlated to a range of composite scores as compared to use of a single threshold value, wherein the multiplier is determined from positive predictive scores of retrospective samples; and, e) administering a computerized tomography (CT) scan or other imagine modality to the subject with a quantified increased risk for the presence of lung cancer. In another embodiment, the markers consist of CEA, CA125, CYFRA21-1, Pro-SFTPB, and diacetylspermine (DAS). In another embodiment, the sample is blood, blood serum, blood plasma, or some part thereof. In another embodiment, the grouping of a stratified subject population, the multiplier indicating increased likelihood of having the cancer and the range of composite scores are determined from retrospective clinical samples of a population. In another embodiment, the risk category further comprises a risk identifier. In another embodiment, the risk identifier is selected from low risk, intermediate-low risk, intermediate risk, intermediate-high risk and highest risk. In another embodiment, calculating the multiplier indicating increased likelihood of having the cancer for each risk category comprises stratifying the subject cohort based on retrospective biomarker scores and weighting a known prevalence of the cancer in the cohort by a positive predictive score for each stratified population. In another embodiment, the grouping of a stratified subject population comprises at least three risk categories wherein the multiplier indicating increased likelihood of having cancer is about 2 or greater. In another embodiment, the grouping of a stratified subject population comprises at least two risk categories wherein the multiplier indicating increased likelihood of having cancer is about 5 or greater. In another embodiment, the subject is aged 50 years or older and has a history of smoking tobacco. In another embodiment, such methods further comprise generating a risk categorization table, wherein the panel of markers is measured, a biomarker score for each marker is determined, a composite score is obtained by summing the biomarker scores; determining a threshold value used to divide the composite scores into risk groups and assigning a multiplier to each group indicating the likelihood of an asymptomatic subject having a quantified increased risk for the presence of cancer. In another embodiment, the groups are in a form selected from an electronic table form, a software application, a computer program, and an excel spreadsheet. In another embodiment, the panel of markers comprise proteins, polypeptides, or metabolites measured in a binding assay. In another embodiment, the panel of markers comprise proteins or polypeptides measured using a flow cytometer.

Provided are methods for identifying lung cancer in a subject, the method generally comprising: (a) applying a blood sample obtained from the subject to analysis for four biomarkers: CEA, CA125, CYFRA21-1, and Pro-SFTPB; (b) quantifying the amount of the four biomarkers present in the blood sample; and (c) applying statistical analysis based on the amount of biomarkers present to determine a biomarker score with respect to corresponding lung cancer, thereby classifying a subject as either positive for lung cancer or negative for cancer.

The methods presented herein enable the screening of high-risk subjects, such as those with a family history of lung cancer, or subjects with other risk factors such as obesity, heavy smoking, and possibly diabetes. The logistic regression model disclosed herein can incorporate these factors into its classification method.

As used herein, "lung cancer status" refers to classification of an individual, subject, or patient as having lung cancer or as not having lung cancer. In some embodiments, an individual having lung cancer may be referred to as "lung cancer-positive." In other embodiments, an individual not having lung cancer may be referred to as "lung cancer-negative." For subjects that are classified as lung cancer-positive, further methods can be provided to clarify lung cancer status. Classification as lung cancer-positive can be followed by methods including, but not limited to, computed tomography (CT).

Detection of CEA can be accomplished by contact with a biomolecule with the sequence as laid out in SEQ ID NO.:1.

Detection of CA125 can be accomplished by contact with a biomolecule with the sequence as laid out in SEQ ID NO.:2.

Detection of CYFRA21-1 can be accomplished by contact with a biomolecule with the sequence as laid out in SEQ ID NO.:3.

Detection of Pro-SFTPB can be accomplished by contact with a biomolecule with the sequence as laid out in SEQ ID NO.:4.

A combination of at least the four biomarkers CEA, CA125, CYFRA21-1, and Pro-SFTPB can afford a previously unseen, highly reliable lung cancer predictive power. The integrated risk prediction model resulted in an AUC of 0.83 (95% CI: 0.77-0.89), compared to an AUC of 0.72 (95% CI: 0.65-0.79) of a model only including smoking information (p-value for difference in AUC: 0.001). At the USPSTF specificity of 0.78 (95% CI: 0.64-0.87), the sensitivity for the integrated risk prediction model was 0.76 (95% CI: 0.57-0.86), compared to 0.41 (95% CI: 0.28-0.66) for the smoking model. Conversely, at the USPSTF sensitivity of 0.42 (95% CI: 0.26-0.54), the specificity of the integrated risk-prediction model was 0.94 (95% CI: 0.88-0.98), compared to 0.78 (95% CI: 0.70-0.90) of the smoking model. These improvements in AUC, sensitivity and specificity estimates were consistently observed across relevant strata defined by sex and smoking status.

The disclosure is not limited to the specific biomolecules that are reported herein for detection of the biomarkers. Other molecules may be chosen for use in other embodiments, including, but not limited to, biomolecules based on proteins, antibodies, nucleic acids, aptamers, and synthetic organic compounds. Other molecules may demonstrate advantages in terms of sensitivity, efficiency, speed of assay, cost, safety, or ease of manufacture or storage.

In some embodiments, levels of CEA, CA125, CYFRA21-1, and Pro-SFTPB in a biological sample are measured. In some embodiments, CEA, CA125, CYFRA21-1, and Pro-SFTPB are contacted with reporter molecules, and the levels of respective reporter molecules are measured. In some embodiments, four reporter molecules are provided which specifically bind CEA, CA125, CYFRA21-1, and Pro-SFTPB, respectively. Use of reporter molecules can provide gains in convenience and sensitivity for the assay.

In some embodiments, CEA, CA125, CYFRA21-1, and Pro-SFTPB are adsorbed onto a surface that is provided in a kit. In some embodiments, reporter molecules bind to surface-adsorbed CEA, CA125, CYFRA21-1, and Pro-SFTPB. Adsorption of biomarkers can be nonselective or selective. In some embodiments, the surface comprises a receptor functionality for increasing selectivity towards adsorption of one or more biomarkers.

In some embodiments, CEA, CA125, CYFRA21-1, and Pro-SFTPB are adsorbed onto four surfaces that are selective for one or more of the biomarkers. A reporter molecule or multiple reporter molecules can then bind to surface-adsorbed biomarkers, and the level of reporter molecule(s) associated with a particular surface can allow facile quantification of the particular biomarker that is present on that surface.

In some embodiments, CEA, CA125, CYFRA21-1, and Pro-SFTPB are adsorbed onto a surface that is provided in a kit; relay molecules that are specific for one or more of these biomarkers bind to surface-adsorbed biomarkers; and receptor molecules that are specific for one or more relay molecules bind to relay molecules. Relay molecules can provide specificity for certain biomarkers, and receptor molecules can enable detection.

In some embodiments, four relay molecules are provided which specifically bind CEA, CA125, CYFRA21-1, and Pro-SFTPB, respectively. Relay molecules can be intentionally designed for specificity towards a biomarker, or can be selected from a pool of candidates due to their binding properties.

In some embodiments, CEA, CA125, CYFRA21-1, and Pro-SFTPB are adsorbed onto four discrete surfaces that are provided in a kit; relay molecules that are specific for one or more of these biomarkers bind to surface-adsorbed biomarkers; and receptor molecules bind to relay molecules. Analysis of the surfaces can be accomplished in a stepwise or concurrent fashion.

In some embodiments, the reporter molecule is linked to an enzyme, facilitating quantification of reporter molecule. In some embodiments, quantification can be achieved by catalytic production of a substance with desirable spectroscopic properties.

In some embodiments, the amount of biomarker is determined with spectroscopy. In some embodiments, the spectroscopy that is utilized is UV-visible spectroscopy. In some embodiments, the spectroscopy that is utilized is mass spectrometry. In other embodiments, the spectroscopy that is utilized is nuclear magnetic resonance (NMR) spectroscopy, such as including, but not limited to, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry.

The quantity of biomarker or biomarkers that is found in a particular assay can be directly reported to an operator, or alternately it can be stored digitally and readily made available for mathematical processing. A system can be provided for performing mathematical analysis, and can further report classification as lung cancer-positive or lung cancer-negative to an operator.

In some embodiments, additional assays known to those of ordinary skill in the art can function with the disclosure herein. Other assays include, but are not limited to, assays utilizing mass-spectrometry, immunoaffinity LC-MS/MS, surface plasmon resonance, chromatography, electrochemistry, acoustic waves, immunohistochemistry and array technologies.

In certain embodiments, the lung cancer is non-small call lung cancer (NSCLC).

The various system components discussed herein may include one or more of the following: a computer comprising one or more processors for processing digital data; short- or long-term digital memory; an input analog-to-digital converter for providing digitized data; an application program made available to the processor for directing processing of digital data by the processor; an input device for collecting information from the subject or operator, and an output device for displaying information to the subject or operator.

Also provided herein are methods of treatment for subjects who are classified as lung cancer-positive. Treatment for lung cancer-positive patients can include, but is not limited to, surgery, chemotherapy, radiation therapy, targeted therapy, or a combination thereof.

With regard to the detection of the biomarkers detailed herein, the disclosure is not limited to the specific biomolecules reported herein. In some embodiments, other biomolecules can be chosen for the detection and analysis of the disclosed biomarkers including, but not limited to, biomolecules based on proteins, antibodies, nucleic acids, aptamers, and synthetic organic compounds. Other molecules may demonstrate advantages in terms of sensitivity, efficiency, speed of assay, cost, safety, or ease of manufacture or storage. In this regard, those of ordinary skill in the art will appreciate that the predicative and diagnostic power of the biomarkers disclosed herein may extend to the analysis of not just the protein form of these biomarkers, but other representations of the biomarkers as well (e.g., nucleic acid). Further, those of ordinary skill in the art will appreciate that the predicative and diagnostic power of the biomarkers disclosed herein can also be used in combination with an analysis of other biomarkers associated with lung cancer. In some embodiments, other biomarkers associated with lung cancer can be protein-based biomarkers. In some embodiments, other biomarkers associated with lung cancer can be non-protein-based biomarkers, such as, for instance, ctDNA.

The foregoing has outlined rather broadly the features and technical benefits of the disclosure in order that the detailed description may be better understood. It should be appreciated by those skilled in the art that the specific embodiments disclosed may be readily utilized as a basis for modifying or designing other structures or processes for carrying out the same purposes of the disclosure. It is to be understood that the present disclosure is not limited to the particular embodiments described, as variations of the particular embodiments may be made and still fall within the scope of the appended claims.

Definitions

As used herein, the term "lung cancer" refers to a malignant neoplasm of the lung characterized by the abnormal proliferation of cells, the growth of which cells exceeds and is uncoordinated with that of the normal tissues around it.

As used herein, the term "lung cancer-positive" refers to classification of a subject as having lung cancer.

As used herein, the term "lung cancer-negative" refers to classification of a subject as not having lung cancer.

As used herein, the terms "subject" or "patient" refer to a mammal, preferably a human, for whom a classification as lung cancer-positive or lung cancer-negative is desired, and for whom further treatment can be provided.

As used herein, a "reference patient," "reference subject," or "reference group" refers to a group of patients or subjects to which a test sample from a patient or subject suspected of having or being at risk of harboring lung cancer may be compared. In some embodiments, such a comparison may be used to determine whether the test subject has lung cancer. A reference patient or group may serve as a control for testing or diagnostic purposes. As described herein, a reference patient or group may be a sample obtained from a single patient, or may represent a group of samples, such as a pooled group of samples.

As used herein, "healthy" refers to an individual in whom no evidence of lung cancer is found, i.e., the individual does not have lung cancer. Such an individual may be classified as "lung cancer-negative" or as having healthy lungs, or normal, non-compromised lung function. A healthy patient or subject has no symptoms of lung cancer or other lung disease. In some embodiments, a healthy patient or subject may be used as a reference patient for comparison to diseased or suspected diseased samples for determination of lung cancer in a patient or a group of patients.

As used herein, the terms "treatment" or "treating" refer to the administration of medicine or the performance of medical procedures with respect to a subject, for either prophylaxis (prevention) or to cure or reduce the extent of or likelihood of occurrence or recurrence of the infirmity or malady or condition or event in the instance where the subject or patient is afflicted. As related to the present disclosure, the term may also mean the administration of pharmacological substances or formulations, or the performance of non-pharmacological methods including, but not limited to, radiation therapy and surgery. Pharmacological substances as used herein may include, but are not limited to, chemotherapeutics that are established in the art, such as Erlotinib (TARCEVA and others), Afatinib (GILOTRIF), Gefitinib (IRESSA), Bevacizumab (AVASTIN), Crizotinib (XALKORI), Ceritinib (ZYKADIA). cisplatin (PLATINOL), carboplatin (PARAPLATIN), docetaxel (TAXOTERE), gemcitabine (GEMZAR), paclitaxel (TAXOL and others), vinorelbine (NAVELBINE and others), or pemetrexed (ALIMTA). Pharmacological substances may include substances used in immunotherapy, such as checkpoint inhibitors. Treatment may include a multiplicity of pharmacological substances, or a multiplicity of treatment methods, including, but not limited to, surgery and chemotherapy.

As used herein, the term "CARET" refers to the Beta-Carotene and Retinol Efficacy Trial study.

As used herein, the term "NLST" refers to National Lung Screening Trial.

As used herein, the term "USPSTF" refers to the US Preventive Services Task Force.

As used herein, the term "EPIC" refers to European Prospective Investigation into Cancer and Nutrition.

As used herein, the term "NSHDS" refers to the Northern Sweden Health and Disease Study.

As used herein, the term "ICD-O-2" refers to the International Classification of Diseases for Oncology, Second Edition.

As used herein, the term "ELISA" refers to enzyme-linked immunosorbent assay. This assay generally involves contacting a fluorescently tagged sample of proteins with antibodies having specific affinity for those proteins. Detection of these proteins can be accomplished with a variety of means, including but not limited to laser fluorimetry.

As used herein, the term "regression" refers to a statistical method that can assign a predictive value for an underlying characteristic of a sample based on an observable trait (or set of observable traits) of said sample. In some embodiments, the characteristic is not directly observable. For example, the regression methods used herein can link a qualitative or quantitative outcome of a particular biomarker test, or set of biomarker tests, on a certain subject, to a probability that said subject is for lung cancer-positive.

As used herein, the term "logistic regression" refers to a regression method in which the assignment of a prediction from the model can have one of several allowed discrete values. For example, the logistic regression models used herein can assign a prediction, for a certain subject, of either lung cancer-positive or lung cancer-negative.

As used herein, the term "biomarker score" refers to a numerical score for a particular subject that is calculated by inputting the particular biomarker levels for said subject to a statistical method.

As used herein, the term "composite score" refers to a summation of the normalized values for the predetermined markers measured in the sample from the subject. In one embodiment, the normalized values are reported as a biomarker score and those biomarker score values are then summed to provide a composite score for each subjected tested. When used in the context of the risk categorization table and correlated to a stratified grouping based on a range of composite scores in the Risk Categorization Table, the "composite score" is used to determine the "risk score" for each subject tested wherein the multiplier indicating increased likelihood of having the cancer for the stratified grouping becomes the "risk score".

As used herein, the term "risk score" refers to a single numerical value that indicates an asymptomatic human subject's increased risk for harboring a cancer as compared to the known prevalence of cancer in the disease cohort. In certain embodiments, the composite score as calculated for a human subject and correlated to a multiplier indicating increased risk of harboring the cancer, wherein the composite score is correlated based on the range of composite scores for each stratified grouping in the risk categorization table. In this way the composite score is converted to a risk score based on the multiplier indicating increased likelihood of having the cancer for the grouping that is the best match for the composite score.

As used herein, the term "cutoff" or "cutoff point" refers to a mathematical value associated with a specific statistical method that can be used to assign a classification of lung cancer-positive of lung cancer-negative to a subject, based on said subject's biomarker score.

As used herein, when a numerical value above or below a cutoff value "is characteristic of lung cancer," what is meant is that the subject, analysis of whose sample yielded the value, either has lung cancer or is at risk of harboring lung cancer.

As used herein, a subject who is "at risk of harboring lung cancer" is one who may not yet evidence overt symptoms of lung cancer, but who is producing levels of biomarkers which indicate that the subject has lung cancer, or may develop it in the near term. A subject who has lung cancer or is suspected of harboring lung cancer may be treated for the cancer or suspected cancer.

As used herein, the term "classification" refers to the assignment of a subject as either lung cancer-positive or lung cancer-negative, based on the result of the biomarker score that is obtained for said subject.

As used herein, the term "lung cancer-positive" refers to an indication that a subject is predicted as at risk of harboring lung cancer, based on the results of the outcome of the methods of the disclosure.

As used herein, the term "lung cancer-negative" refers to an indication that a subject is predicted as not at risk of harboring lung cancer, based on the results of the outcome of the methods of the disclosure.

As used herein, the term "Wilcoxon rank sum test," also known as the Mann-Whitney U test, Mann-Whitney-Wilcoxon test, or Wilcoxon-Mann-Whitney test, refers to a specific statistical method used for comparison of two populations. For example, the test can be used herein to link an observable trait, in particular a biomarker level, to the absence or presence of lung cancer in subjects of a certain population.

As used herein, the term "true positive rate" refers to the probability that a given subject classified as positive by a certain method is truly positive.

As used herein, the term "false positive rate" refers to the probability that a given subject classified as positive by a certain method is truly negative.

As used herein, the term "sensitivity" refers to, in the context of various biochemical assays, the ability of an assay to correctly identify those with a disease (i.e., the true positive rate). By comparison, as used herein, the term "specificity" refers to, in the context of various biochemical assays, the ability of an assay to correctly identify those without the disease (i.e., the true negative rate). Sensitivity and specificity are statistical measures of the performance of a binary classification test (i.e., classification function). Sensitivity quantifies the avoiding of false negatives, and specificity does the same for false positives.

As used herein, a "sample" refers to a test substance to be tested for the presence of, and levels or concentrations thereof, of a biomarker as described herein. A sample may be any substance appropriate in accordance with the present disclosure, including, but not limited to, blood, blood serum, blood plasma, or any part thereof.

As used herein, an "antigen" refers to a protein, metabolite, or other molecule to which an antibody or antigen-binding reagent or fragment may bind for detection of a biomarker as described herein. In some embodiments, a biomarker may serve as an antigen. In other embodiments, a portion of a biomarker may serve as an antigen. In some embodiments, an antibody may be used for detection of an antigen as described herein. In other embodiments, a nucleic acid, such as DNA, RNA, DNR/RNA hybrids, antibodies, antibody fragments, or any other compound or molecule capable of binding to an antigen, may be used to detect an antigen, such as a biomarker as described herein. An antigen as described herein may serve as the basis for detection of the levels, concentrations, or amounts of a protein or metabolite marker for use with the methods as described herein.

As used herein, the term "CEA" refers to carcinoembryonic antigen.

As used herein, the term "CA125" refers to cancer antigen 125.

As used herein, the term "CYFRA21-1," also known as Cyfra 21-1, refers to cytokeratin fragment 19, also known as cytokeratin-19 fragment.

As used herein, the term "SFTPB" refers to Surfactant Protein B.

As used herein, the term "Pro-SFTPB," refers to Pro-Surfactant Protein B, which is a precursor form of SFTPB.

As used herein, the term "HE4," also known as WFDC2, refers to human epididymis protein 4.

As used herein, the term "ctDNA" refers to cell-free or circulating tumor DNA. ctDNA is tumor DNA found circulating freely in the blood of a cancer patient. Without being limited by theory, ctDNA is thought to originate from dying tumor cells and can be present in a wide range of cancers but at varying levels and mutant allele fractions. Generally, ctDNA carry unique somatic mutations formed in the originating tumor cell and not found in the host's healthy cells. As such, the ctDNA somatic mutations can act as cancer-specific biomarkers.

As used herein, a "metabolite" refers to small molecules that are intermediates and/or products of cellular metabolism. Metabolites may perform a variety of functions in a cell, for example, structural, signaling, stimulatory and/or inhibitory effects on enzymes. In some embodiments, a metabolite may be a non-protein, plasma-derived metabolite marker, such as including, but not limited to, acetylspermidine, diacetylspermine, lysophosphatidylcholine (18:0), lysophosphatidylcholine (20:3), and an indole-derivative.

As used herein, the term "ROC" refers to receiver operating characteristic, which is a graphical plot used herein to gauge the performance of a certain diagnostic method at various cutoff points. A ROC plot can be constructed from the fraction of true positives and false positives at various cutoff points.

As used herein, the term "AUC" refers to the area under the curve of the ROC plot. AUC can be used to estimate the predictive power of a certain diagnostic test. Generally, a larger AUC corresponds to increasing predictive power, with decreasing frequency of prediction errors. Possible values of AUC range from 0.5 to 1.0, with the latter value being characteristic of an error-free prediction method.

As used herein, the term "p-value" or "p" refers to the probability that the distributions of biomarker scores for lung cancer-positive and lung cancer-negative subjects are identical in the context of a Wilcoxon rank sum test. Generally, a p-value close to zero indicates that a particular statistical method will have high predictive power in classifying a subject.

As used herein, the term "CI" refers to a confidence interval, i.e., an interval in which a certain value can be predicted to lie with a certain level of confidence. As used herein, the term "95% CI" refers to an interval in which a certain value can be predicted to lie with a 95% level of confidence.

The term "AIC" refers to Akaike Information Criterion, a method based on information theory that can be used to evaluate the relative merits of various regression models for a dataset.

EXAMPLES

The following examples are included to demonstrate embodiments of the disclosure. The following examples are presented only by way of illustration and to assist one of ordinary skill in using the disclosure. The examples are not intended in any way to otherwise limit the scope of the disclosure. Those of skill in the art should, in light of the present disclosure, appreciate that many changes can be made in the specific embodiments which are disclosed and still obtain a like or similar result without departing from the spirit and scope of the disclosure.

Example 1: Blood Sample Sets

Plasma samples from all study participants were sent on dry ice to the laboratory at MD Anderson, TX, US, where they were kept below −80° C. until analysis.

Training Cohort: The Beta-Carotene and Retinol Efficacy Trial (CARET) Study

Pre-diagnostic serum samples from CARET participants (current or former heavy smokers) were utilized to train the biomarker score of potential protein-based risk prediction markers. CARET was a randomized, double-blind, placebo-controlled trial evaluating the cancer prevention efficacy and the safety of daily supplementation with 30 mg of beta-carotene and 25,000 IU retinol palmitate in 18,314 persons with high risk for lung cancer. Eligible participants included two high-risk populations: 14,254 men and women aged 50 to 69 years who were current or former smokers (quit within the previous 6 years) who were exposed to at least 20 pack-years of cigarette smoking, and 4,060 men aged 45 to 69 years who were current or former smokers (quit no more than 15 years prior to the start of the study) and had a substantial history of occupational asbestos exposure. Participants were enrolled in 6 US centers from 1985 to 1994 and were followed for cancer and mortality outcomes until 2005. In total, samples were assayed from 108 subjects who subsequently developed non-small-cell lung cancer (NSCLC) within 12 months after providing a blood sample, and 216 controls matched to each case based on age at baseline (5-yr groups), sex, baseline smoking status (current vs former), and study enrollment period.

Pre-diagnostic serum samples from CARET participants (current or former heavy smokers), consisting of 108 subjects who subsequently developed non-small-cell luncancer (NSCLC) and 216 matched controls were utilized to test a set of potential protein-based risk prediction markers including Pro-SFTPB. None of these samples were part of any prior assays of the candidate markers to be tested and thus represented an independent set for marker assays consisting of 108 NSCLC and 216 matched controls. Case samples were collected up to a year prior to a diagnosis of NSCLC.

Validation Cohort: The EPIC and NSHDS Studies

The validation cohort used in this study were obtained from two European prospective studies: the European Prospective Investigation into Cancer and Nutrition (EPIC) study and The Northern Sweden Health and Disease Study (NSHDS).

European Prospective Investigation into Cancer and Nutrition

The EPIC study is an ongoing multi-center prospective cohort that recruited 521,330 participants between 1992 and 1998 from 23 centers across ten countries in Europe, The current biomarker study involved EPIC participants from 7 countries (Greece, Netherlands, UK, France, Germany, Spain, and Italy) who donated a blood sample at study recruitment that was part of a biorepository maintained in liquid nitrogen at the International Agency for Research on Cancer (IARC) in Lyon.

Northern Sweden Health and Disease Study

NSHDS is an ongoing prospective cohort of the general population of the Vasterbotten County in northern Sweden. After study initiation in 1985, all county residents have since been invited to participate by attending a health check-up at 40, 50, and 60 years of age. As of 2014, the cohort had recruited 99,404 study participants who donated a blood sample for future research. Details on EPIC and NSHDS recruitment procedures, collection of questionnaire and anthropometric data, and blood sample collection and storage have been described in detail elsewhere. Characteristics for the EPIC and NSHDS validation cohorts are presented below in Table 1.

The baseline characteristics of cases and controls in the CARET training study and the EPIC and NSHDS validation studies are presented in Table 1. The characteristics of the EPIC and NSHDS study sample used to train the smoking model are presented in Table 2.

TABLE 1

Clinical characteristics of patients and controls in training and validation cohorts.

| | N (%) | Training study (CARET) Cases | Training study (CARET) Controls | Validation study (EPIC and NSHDS) Cases | Validation study (EPIC and NSHDS) Controls |
|---|---|---|---|---|---|
| Overall | | 108 | 216 | 83 | 158 |
| Sex | Male | 75 (69.4) | 150 (69.4) | 50 (60.2) | 93 (58.9) |
| | Female | 33 (30.6) | 66 (30.6) | 33 (39.8) | 65 (41.1) |
| Race | White | 99 | 200 | | |
| | Black | 6 | 8 | | |
| | Other | 3 | 8 | | |
| Age, years | ≤40 | — | — | 3 (3.6) | 6 (3.8) |
| | 40-50 | 2 (1.9) | 4 (1.9) | 7 (8.4) | 13 (8.2) |
| | 50-60 | 35 (32.4) | 72 (33.3) | 40 (48.2) | 78 (49.4) |
| | 60-70 | 69 (63.9) | 136 (63.0) | 29 (34.9) | 54 (34.2) |
| | >70 | 2 (1.9) | 4 (1.9) | 4 (4.8) | 7 (4.4) |
| Pack-years | Mean | 54 | 49 | | |
| | SD | 23 | 20 | | |
| Age at diagnosis, years | Mean | 65.1 | | | |
| | SD | 6.3 | | | |
| | ≤40 | — | — | | |
| | 40-50 | 2 | 4 | | |
| | 50-60 | 35 | 72 | | |
| | 60-70 | 69 | 136 | | |
| | >70 | 2 | 4 | | |
| Yeas from blood collection to diagnosis | 0-0.5 | 40 (37.0) | — | 31 (37.3) | — |
| | 0.5-1 | 68 (63.0) | — | 33 (39.8) | — |
| | 1-2 | — | — | 19 (22.9) | — |
| | 2-5 | — | — | — | — |
| | 5-10 | — | — | — | — |
| Smoking status | Never | — | — | 9 (10.8) | 50 (31.7) |
| | Former | 36 (33.3) | 72 (33.3) | 26 (31.3) | 53 (33.5) |
| | Current | 72 (66.7) | 144 (66.7) | 48 (57.8) | 55 (34.8) |
| Histological subtype | ADC | 40 (37.0) | — | 32 (38.6) | — |
| | SCC | 38 (35.2) | — | 21 (25.3) | — |
| | Other | 30 (27.8) | — | 30 (36.1) | — |
| Stage | I and II | 26 | | | |
| | III and IV | 64 | | | |
| | Unknown | 18 | | | |
| Eligible for lung cancer screening (USPSTF) | Not Eligible | 29 (26.9) | 57 (26.4) | 51 (63.0) | 132 (85.2) |
| | Eligible | 79 (73.1) | 159 (73.6) | 30 (37.0) | 23 (14.8) |
| | N/A | — | — | 2 | 3 |

Abbreviations:
NSCLC, non-small cell lung cancer;
SCC, squamous cell carcinoma;
ADC Adenocarcinoma;
SD, standard deviation

TABLE 2

Baseline characteristics of the EPIC and NSHDS study with that were used to train the smoking-model.

| | N (%) | Training sample for the smoking-model (EPIC + NSHDS) Cases | Training sample for the smoking-model (EPIC + NSHDS) Controls |
|---|---|---|---|
| Overall | | 1008 | 1873 |
| Sex | Male | 605 (60) | 1088 (58.1) |
| | Female | 403 (40) | 785 (41.9) |
| Age, years | ≤40 | 20 (2.0) | 45 (2.4) |
| | 40-50 | 167 (16.6) | 315 (16.8) |
| | 50-60 | 430 (42.7) | 787 (42.0) |
| | 60-70 | 315 (31.2) | 599 (32.0) |
| | >70 | 76 (7.5) | 127 (6.8) |
| Yeas from blood collection to diagnosis | 0-0.5 | — | — |
| | 0.5-1 | — | — |
| | 1-2 | — | — |
| | 2-5 | 351 (34.8) | — |
| | 5-10 | 657 (65.2) | — |
| Smoking status | Never | 122 (12.1) | 524 (28.0) |
| | Former | 296 (29.4) | 606 (32.3) |
| | Current | 590 (58.5) | 743 (39.7) |

TABLE 2-continued

Baseline characteristics of the EPIC and NSHDS study with that were used to train the smoking-model.

| | N (%) | Training sample for the smoking-model (EPIC + NSHDS) | |
|---|---|---|---|
| | | Cases | Controls |
| Histological subtype | Adenocarcinoma | 366 (36.3) | — |
| | Squamous cell carc. | 200 (19.8) | — |
| | Other | 442 (43.6) | |
| Eligible for lung cancer screening (USPSTF) | Not Eligible | 688 (68.7) | 1599 (86.6) |
| | Eligible | 313 (31.3) | 248 (13.4) |
| | N/A | 7 | 26 |

Follow-Up and Selection of Cases and Controls

Follow-up for incident cancer cases was performed using a combination of methods, including record linkage with regional or national cancer registries, as well as health insurance records, cancer and pathology registries, and active follow-up through study subjects and their next-of-kin. Lung cancer cases were defined on the basis of the International Classification of Diseases for Oncology, Second Edition (ICD-O-2), and included all invasive cancers that were coded as C34. After excluding cases who had a history of another cancer (except non-melanoma skin cancer) and cases with missing blood samples or smoking information, 48 incident cases diagnosed within 1 year of blood draw in EPIC and 35 incident cases diagnosed within 2 years of blood draw in NSHDS were available for the current study. In Italy, the Netherlands, Spain, Sweden, and the UK, incident cancer cases were identified through record linkage with regional or national cancer registries. In France, Germany, and Greece, follow-up was based on a combination of methods, including health insurance records, cancer and pathology registries, and active follow-up through study subjects and their next-of-kin.

For each index case, two controls were chosen at random from risk sets consisting of all cohort members alive and free of cancer (except non-melanoma skin cancer) at the time of diagnosis of the index case. Matching criteria were study center, sex, date of blood collection (±1 month, relaxed to ±12 months for sets without available controls), time at blood collection (±1 hour, relaxed to ±12 hours), and age at blood collection (±3 months, relaxed to ±5 years). In order to improve the statistical power in smoking stratified analyses, each one of the controls was additionally matched based on smoking status of the index case from 5 categories; never smokers, short and long term quitters among former smokers (<10 years, ≥10 years since quitting), and light and heavy smokers among current smokers (<15 years, ≥15 cigarettes per day).

The final combined validation study from EPIC (cases diagnosed within 1 year of blood draw) and NSHDS (cases diagnosed within 2 years of blood draw) included 83 incident lung cancer cases and 158 matched controls. All study participants gave written informed consent to participate in the study and the research was approved by the local ethics committees in the participating countries, as well as the IARC and MD Anderson Ethical Review Committees.

For each EPIC and NSHDS index case, two controls were chosen at random from risk sets consisting of all cohort members alive and free of cancer (except non-melanoma skin cancer) at the time of diagnosis of the index case. For each case, one control was randomly chosen from risk-sets consisting of all cohort members alive and free of cancer (except non-melanoma skin cancer) at the time of diagnosis of the index case. Matching criteria were study center, sex, date of blood collection (±1 month, relaxed to ±3 months for sets without available controls), and date of birth (±1 year, relaxed to ±3 years). In order to improve the statistical power in smoking stratified analyses, one of the controls was additionally matched on the smoking status of the index case from 5 categories; never smokers, short and long term quitters among former smokers (<10 years, ≥10 years since quitting), and light and heavy smokers among current smokers (<15 years, ≥15 cigarettes per day).

The total combined validation cohort from EPIC and NSHDS included 74 incident lung cancer cases and 109 matched controls after excluding never smoking cases and controls. All participants gave written informed consent to participate in the study and the research was approved by the local ethics committees in the participating countries and the IARC Institutional Review Board.

Example 2: Selection of Biomarker Panel Candidates

Initial screening of biomarkers was performed on a set of five candidates: CEA, CA125, CYFRA 21-1, Pro-SFTPB, and HE4. CEA and CA125 are well-known tumor biomarkers and routinely used as prognostic and diagnostic markers of colorectal and ovarian cancer, respectively. CYFRA 21-1 has since the 90s been implicated as a marker of non-small cell lung cancer. SFTPB and HE4 are significantly associated with lung cancer both in mouse models of lung cancer and in blood samples collected up to one year prior to clinical diagnosis, compared to matched controls (Bach et al., J Natl Cancer Inst 95:470-8, 2003). A precursor form of SFTPB (Pro-SFTPB) was predictive of lung cancer risk in prospective cohort studies that encompassed the Pan-Canadian Early Detection of Lung Cancer Study, The Physicians' Health Study, and the CARET study (Cassidy et al., Br J Cancer 98:270-6, 2008; Hoggart et al., Cancer Prev Res (Phila) 5:834-46, 2012; Spitz et al., Cancer Prev Res (Phila) 1:250-4, 2008). Pro-SFTPB was originally found elevated in plasma of mice with lung cancer.

From this set, four biomarkers were selected for a panel based on their performance in the training cohort: CA-125, CYFRA 21-1, CEA, and Pro-SFTPB.

Observed levels of biomarkers for the control population are set forth in Table 3. Typical ranges for these values in healthy subjects are also provided.

TABLE 3

Observed biomarker levels in control population.

| Biomarker | Min* | Median | Max | Typical range |
|---|---|---|---|---|
| CEA | 0.47 | 1.96 | 10 | 0-5 |
| CA125 | 4.33 | 6.7 | 12.13 | 0-35 |
| CYFRA | 2.51 | 4.24 | 15.89 | 0.16-2.95 |
| Pro-SFTPB | 0 | 5.2 | 93.23 | N/A |

*Units in ng/mL for CEA, CYFRA, and Pro-SFTPB; Units in U/mL for CA125.

Observed levels of biomarkers for the cancer population are set forth in Table 4.

Typical ranges for these values in cancer-afflicted subjects are also provided.

TABLE 4

Observed biomarker levels in cancer population.

| Biomarker | Min* | Median | Max | Typical range |
|---|---|---|---|---|
| CEA | 0.62 | 9.26 | 120.6 | 0-20 |
| CA125 | 4.24 | 7.29 | 20.51 | >35 |
| CYFRA | 3.3 | 5.66 | 20.93 | 0.93-221.6 |
| Pro-SFTPB | 1.08 | 22.66 | 233.11 | N/A |

*Units in ng/mL for CEA, CYFRA, and Pro-SFTPB; Units in U/mL for CA125.

Example 3: Analysis of Samples

The five candidate markers were analyzed by immunoassay using serum samples from the training cohort. Concentrations for CA125, CEA, Pro-SFTPB, CYFRA 21-1 and HE4 were determined using bead-based immunoassays on the MAGPIX® instrument (Luminex Corporation, Austin TX). Samples were analyzed in batches of 36 samples in duplicates, and quality control procedures included 7 calibration samples, 2 quality control samples, and 1 blank sample in each batch. The coefficients of variation (CVs) within and between batches were, respectively, 6.86% and 15.54% for CA125, 1.45% and 9.32% for CEA, 6.55% and 17.26% for Pro-SFTPB, and 5.56% and 28.71% for CYFRA 21-1. All lung cancer cases and their individually matched controls were analyzed together within the same batches in random order. The laboratory staff was blinded to the case-control status of the blood samples.

Example 4: Regression Model

Each evaluated biomarker was initially log-transformed and standardized within each study sample separately. The biomarkers CA125, CEA, Pro-SFTPB, and CYFRA were combined into a biomarker-based risk score (biomarker-score) by fitting logistic regression models. CYFRA in CARET2 was lacking data for 47.53% of samples. In order to use as many observations as possible for model building, a two-stage method was employed: in the first stage, an optimal biomarker panel was selected based on the Akaike Information Criterion by using all biomarkers apart from CYFRA using logistic regression; in the second stage, the combined score from the first stage was fixed and combined with CYFRA to obtain the final model. Such two-stage method allows observations to also contribute to model training. All inference is based on the bootstrap that employs 1000 samples with replacement separately for the healthy and the diseased.

In order to evaluate the extent to which the biomarker score could improve on a risk prediction model based on smoking exposure history, we fitted a smoking-model using data from EPIC and NSHDS that were not used in the validation study, defined by cases diagnosed 2 to 10 years after study recruitment with controls individually matched with the same matching criteria as in the validation study (1,008 cases and 1,873 controls. With use of conditional logistic regression and conditioning on the individual case-sets, the smoking-model included smoking status (former vs. never, current vs. never), number of cigarettes per day for current smokers (continuous [not available in former smokers]), smoking duration (continuous in former and current smokers), and time since quitting in former smokers [continuous].

We evaluated the biomarker-score for its potential to improve a risk prediction model based on smoking variables alone using the combined EPIC and NSHDS sample, first by fitting a model (smoking model) including smoking variables using unconditional logistic regression. This model included age (continuous), sex (dichotomous), cohort (dichotomous), smoking status (former/current), cigarettes per day in current smokers (continuous [not available in former smokers]), smoking duration (continuous), and time since quitting in former smokers [continuous]. Parameter estimates for the smoking model are presented in Table 5.

The extent to which the biomarker score and smoking-model could discriminate between incident lung cancer cases and controls was subsequently evaluated externally and non-parametrically by assigning the respective models to each participant in the validation study (cases diagnosed 0 to 2 years after blood draw). In addition, in order to evaluate the potential of combining the biomarker score with the smoking-model, an integrated risk prediction model was developed by fitting a conditional logistic regression model using the smoking model-based risk score and biomarker score as two separate covariates in the validation study.

TABLE 5

Specifications of the smoking model developed in EPIC and NSHDS based on cases diagnosed between 2 to 10 years from blood draw.

| Variables included in the smoking score | Beta estimates for the smoking-score | OR | 95% CI |
|---|---|---|---|
| Former vs never | 1.417089 | 4.13 | [2.73-6.22] |
| Current vs never | 2.084509 | 8.04 | [5.45-11.9] |
| Duration of smoking (years) among ever smokers | 0.038906 | 1.04 | [1.02-1.06] |
| Time since smoking cessation (years) for former smokers | −0.027166 | 0.97 | [0.95-0.99] |
| Number of cigarette smoked per day for current smokers | 0.066884 | 1.07 | [1.05-1.09] |

The coefficients of the logarithm of the biomarker concentrations were as follows: CA-125, 0.4730; CYFRA 21-1, 0.2612; CEA, 0.6531; and Pro-SFTPB, 0.9238; constant, −8.4927.

log it(p)=−8.4927+0.4730×log CA125+0.2612×log CYFRA211+0.6531×log CEA+0.9238×log ProSFTPB Example 5: Performance of Regression Model Each candidate biomarker discriminated between cases and controls in the CARET training study (p-value<0.05), with AUC estimates ranging from 0.60 (95% CI: 0.53-0.67, CA125) to 0.70 (95% CI: 0.64-0.76, Pro-SFTPB) (Table 6). Based on AIC, HE4 was excluded from the model, and the final biomarker score was defined by CA125, CEA, Pro-SFTBP and CYFRA 21-1 and yielded an overall AUC of 0.80 (95% CI 0.72-0.87) in the training sample (FIG. 1).

TABLE 6

Individual biomarker performance.

| | Discriminative performance | | Sensitivity at 95% Specificity | Specificity at 95% Sensitivity | Model specification | |
|---|---|---|---|---|---|---|
| | AUC | 95% CI | | | Beta-estimate | 95% CI |
| CA125 | 0.597 | [0.53-0.67] | 0.1250 | 0.0979 | 0.4730 | [0.0886-0.08583] |
| CEA | 0.688 | [0.62-0.75] | 0.2708 | 0.1563 | 0.6531 | [0.1364-1.1698 |
| Pro-SFTPB | 0.704 | [0.64-0.76] | 0.1667 | 0.2272 | 0.9238 | [0.3627-1.4849] |
| CYFRA21-1 | 0.658 | [0.56-0.75] | 0.1042 | 0.1672 | 0.2612 | [−0.1601-0.6825] |
| HE4 | 0.645 | [0.58-0.71] | 0.1262 | 0.1053 | N/A | |

The biomarker score discriminated similarly for the two most prevalent histologic types of lung cancer in the training study, with an AUC of 0.79 for lung adenocarcinoma (95% CI: 0.67-0.92) and 0.79 in lung squamous carcinoma (95% CI: 0.62-0.96) (Table 7). The AUC was higher for lung cancer cases diagnosed within 6 months of blood draw (AUC: 0.86, 95% CI: 0.76-0.96) compared to cases diagnosed between 6 months and 12 months after blood draw (AUC: 0.77, 95% CI: 0.66-0.88) (Table 7).

TABLE 7

Performance of the biomarker score in the CARET training study

| | AUC | 95% CI | p value | Sensitivity at 95% Specificity | Specificity at 95% Sensitivity |
|---|---|---|---|---|---|
| ALL individuals | 0.798 | 0.72 0.87 | <0.0001 | 0.2000 | 0.1875 |
| Men | 0.783 | 0.68 0.88 | <0.0001 | 0.2581 | 0.1486 |
| Women | 0.829 | 0.70 0.96 | <0.0001 | 0.1429 | 0.2105 |
| Stage I-II | 0.677 | 0.45 0.90 | 0.0599 | 0.2000 | 0.1538 |
| Stage III-IV | 0.831 | 0.75 0.91 | <0.0001 | 0.1724 | 0.5857 |
| Time between blood draw and diagnostic: | | | | | |
| 0-6 months | 0.858 | 0.76 0.96 | <0.0001 | 0.3810 | 0.6957 |
| 6-12 months | 0.770 | 0.66 0.88 | <0.0001 | 0.2083 | 0.1667 |
| Histological subtype: | | | | | |
| ADC* | 0.794 | 0.67 0.92 | <0.0001 | 0.2143 | 0.4444 |
| Other NSCLC | 0.804 | 0.68 0.93 | <0.0001 | 0.3333 | 0.1316 |
| SCC* | 0.790 | 0.62 0.96 | 0.0004 | 0.1538 | 0.1579 |

ADC: Adenocarcinoma;
SCC: Squamous cell carcinoma;
NSCLC, non-small cell lung cancer The discriminative performance of the biomarker score in the validation study yielded an AUC of 0.89 (95% CI: 0.84-0.93). the smoking model at an AUC of 0.79 (95% CI: 0.73-0.85, with a P value for the difference between the two estimates 0.002, FIG. 1, Table 6. The AUC for the biomarker score was consistently higher than that for the smoking model across relevant strata, varying between 0.83 for former smokers and 0.93 for light smokers (subjects with less than 30 pack-years of smoking history, Table 8). Combining the biomarker score with the smoking model in the integrated risk prediction model did not notably improve the AUC compared with the biomarker score alone (AUC for integrated risk prediction model: 0.90, 95% CI: 0.86-0.94, FIG. 1).

The discriminative performances of the smoking-model, the biomarker score, and the integrated risk prediction model were evaluated using ROC analyses in the validation study. In order to estimate the fraction of future lung cancer cases that would have been identified using the different models, we estimated the sensitivity of each model at a specificity level corresponding to that provided by applying the USPSTF screening eligibility criteria to each subject in the validation study. Conversely, we also evaluated the model specificity at the level of sensitivity obtained using the USPSTF criteria in order to estimate the extent to which screening could be avoided for subjects not destined develop lung cancer.

Application of the dichotomous USPSTF screening criteria to the validation study resulted in a sensitivity of 0.37 (95% CI: 0.23-0.48) and a specificity of 0.85 (95% CI: 0.72-0.91) (Table 8). The biomarker score at the specificity of the USPSTF screening criteria of 0.85, yielded a sensitivity of 0.78 (95% CI: 0.65-0.87) whereas the smoking model yielded a sensitivity of 0.58 (95% CI: 0.31-0.71). The sensitivity of the biomarker score varied between 0.65 and 0.85 across the strata (Table 8). In comparison, the sensitivity of the smoking model at the same specificity varied between 0.12 and 0.73 across the strata. We also evaluated the potential for improve specificity compared to the USPTSF criteria, with a view to avoid screening of subjects who are unlikely to develop lung cancer. At the overall sensitivity of 0.37 based on the USPSTF criteria, the corresponding specificity in the validation study using the biomarker score was 0.98 (95% CI: 0.96-1.00), compared to 0.90 (95% CI: 0.84-0.94) for the smoking model. The specificity of the biomarker score varied between 0.96 and 1.00 across strata and was consistently and notably higher than that of the smoking model for current smokers (Tables 3 and 9).

TABLE 8

Performance of 4-marker panel in CARET cohort.

| | Cases | Controls | Specificity of USPSTF criteria | 95% CI | Sensitivity of USPSTF criteria | 95% CI | Risk model | AUC | 95% CI | Sensitivity at USPSTF Specificity | 95% CI | Specificity at USPSTF Sensitivity | 95% CI |
|---|---|---|---|---|---|---|---|---|---|---|---|---|---|
| All | 83 | 158 | 0.85 | [0.72-0.91] | 0.37 | [0.23-0.48] | Smoking | 0.79 | [0.73-0.85] | 0.58 | [0.31-0.71] | 0.90 | [0.84-0.94] |
| | | | | | | | Biomarkers | 0.89 | [0.84-0.93] | 0.78 | [0.65-0.87] | 0.98 | [0.96-1.00] |
| | | | | | | | Smoking + Biomarkers | 0.90 | [0.86-0.94] | 0.80 | [0.70-0.89] | 0.97 | [0.95-1.00] |
| Men | 50 | 93 | 0.80 | [0.61-0.88] | 0.53 | [0.33-0.67] | Smoking | 0.84 | [0.77-0.90] | 0.72 | [0.56-0.84] | 0.94 | [0.84-0.98] |
| | | | | | | | Biomarkers | 0.87 | [0.81-0.94] | 0.76 | [0.64-0.90] | 0.98 | [0.90-1.00] |
| | | | | | | | Smoking + Biomarkers | 0.89 | [0.84-0.95] | 0.82 | [0.70-0.94] | 0.96 | [0.90-1.00] |
| Women | 33 | 65 | 0.92 | [0.8-0.98] | 0.13 | [0.03-0.26] | Smoking | 0.71 | [0.61-0.82] | 0.12 | [0.00-0.30] | 0.89 | [0.77-0.98] |
| | | | | | | | Biomarkers | 0.91 | [0.84-0.97] | 0.70 | [0.52-0.88] | 1.00 | [0.97-1.00] |
| | | | | | | | Smoking + Biomarkers | 0.91 | [0.85-0.97] | 0.67 | [0.48-0.88] | 0.98 | [0.95-1.00] |
| Never smokers | 9 | 50 | N/A | | N/A | | Smoking | N/A | | N/A | | N/A | |
| | | | | | | | Biomarkers | 0.89 | [0.71-1.00] | N/A | | N/A | |
| | | | | | | | Smoking + Biomarkers | N/A | | N/A | | N/A | |
| Former smokers | 26 | 53 | 0.90 | [0.71-0.97] | 0.29 | [0.1-0.48] | Smoking | 0.81 | [0.70-0.91] | 0.58 | [0.23-0.77] | 0.96 | [0.89-1.00] |
| | | | | | | | Biomarkers | 0.83 | [0.73-0.93] | 0.65 | [0.31-0.85] | 0.96 | [0.89-1.00] |
| | | | | | | | Smoking + Biomarkers | 0.87 | [0.79-0.95] | 0.69 | [0.35-0.88] | 0.96 | [0.91-1.00] |
| Current smokers | 48 | 55 | 0.67 | [0.49-0.81] | 0.48 | [0.3-0.63] | Smoking | 0.69 | [0.59-0.79] | 0.73 | [0.31-0.85] | 0.75 | [0.60-0.85] |
| | | | | | | | Biomarkers | 0.88 | [0.82-0.95] | 0.85 | [0.75-0.98] | 0.98 | [0.93-1.00] |
| | | | | | | | Smoking + Biomarkers | 0.88 | [0.81-0.95] | 0.88 | [0.77-0.98] | 0.96 | [0.89-1.00] |
| NSCLC Cases | 70 | 158 | 0.85 | [0.72-0.91] | 0.35 | [0.21-0.47] | Smoking | 0.78 | [0.72-0.84] | 0.54 | [0.29-0.69] | 0.90 | [0.84-0.94] |
| | | | | | | | Biomarkers | 0.88 | [0.83-0.93] | 0.77 | [0.64-0.86] | 0.98 | [0.96-1.00] |
| | | | | | | | Smoking + Biomarkers | 0.90 | [0.85-0.94] | 0.79 | [0.69-0.89] | 0.98 | [0.96-1.00] |
| Heavy smokers | 25 | 19 | N/A | | N/A | | Smoking | 0.65 | [0.49-0.82] | N/A | | N/A | |
| | | | | | | | Biomarkers | 0.84 | [0.72-0.96] | N/A | | N/A | |
| | | | | | | | Smoking + Biomarkers | 0.83 | [0.70-0.95] | N/A | | N/A | |
| Light smokers | 23 | 36 | N/A | | N/A | | Smoking | 0.69 | [0.55-0.83] | | | | |
| | | | | | | | Biomarkers | 0.93 | [0.87-0.99] | | | | |
| | | | | | | | Smoking + Biomarkers | 0.92 | [0.85-0.99] | | | | |

TABLE 9

Discriminative Performance of three risk prediction models in the validation study among ever smokers

| | Cases | Controls | Specificity of USPSTF criteria | 95% CI | Sensitivity of USPSTF criteria | 95% CI | Risk model | AUC | 95% CI | Sensitivity at USPSTF Specificity | 95% CI | Specificity at USPSTF Sensitivity | 95% CI |
|---|---|---|---|---|---|---|---|---|---|---|---|---|---|
| All | 71 | 103 | 0.77 | [0.62-0.86] | 0.41 | [0.26-0.53] | Smoking | 0.77 | [0.70-0.84] | 0.58 | [0.42-0.73] | 0.88 | [0.79-0.96] |
| | | | | | | | Biomarkers | 0.86 | [0.81-0.92] | 0.75 | [0.63-0.89] | 0.97 | [0.92-1.00] |
| | | | | | | | Smoking + Biomarkers | 0.88 | [0.83-0.93] | 0.85 | [0.69-0.94] | 0.95 | [0.90-0.99] |
| Men | 44 | 69 | 0.73 | [0.51-0.84] | 0.58 | [0.37-0.72] | Smoking | 0.83 | [0.75-0.90] | 0.77 | [0.59-0.91] | 0.87 | [0.74-0.94] |
| | | | | | | | Biomarkers | 0.87 | [0.80-0.93] | 0.75 | [0.61-0.93] | 0.96 | [0.81-1.00] |
| | | | | | | | Smoking + Biomarkers | 0.89 | [0.83-0.95] | 0.89 | [0.73-0.98] | 0.96 | [0.88-1.00] |
| Women | 27 | 34 | 0.85 | [0.7-0.97] | 0.12 | [0.02-0.28] | Smoking | 0.63 | [0.49-0.77] | 0.26 | [0.07-0.48] | 0.94 | [0.76-1.00] |
| | | | | | | | Biomarkers | 0.86 | [0.77-0.96] | 0.70 | [0.48-0.93] | 0.97 | [0.91-1.00] |
| | | | | | | | Smoking + Biomarkers | 0.87 | [0.78-0.96] | 0.81 | [0.33-0.96] | 0.94 | [0.85-1.00] |
| Former smokers | 25 | 50 | 0.89 | [0.7-0.97] | 0.30 | [0.11-0.49] | Smoking | 0.83 | [0.72-0.93] | 0.56 | [0.32-0.80] | 0.96 | [0.90-1.00] |
| | | | | | | | Biomarkers | 0.84 | [0.74-0.93] | 0.64 | [0.40-0.80] | 0.98 | [0.92-1.00] |
| | | | | | | | Smoking + Biomarkers | 0.89 | [0.82-0.97] | 0.68 | [0.40-0.92] | 0.98 | [0.90-1.00] |
| Current smokers | 46 | 53 | 0.66 | [0.49-0.8] | 0.46 | [0.28-0.62] | Smoking | 0.70 | [0.59-0.80] | 0.61 | [0.41-0.80] | 0.79 | [0.62-0.91] |
| | | | | | | | Biomarkers | 0.88 | [0.81-0.95] | 0.89 | [0.74-1.00] | 0.94 | [0.89-1.00] |
| | | | | | | | Smoking + Biomarkers | 0.87 | [0.80-0.94] | 0.91 | [0.76-0.98] | 0.94 | [0.87-1.00] |
| NSCLC Cases | 58 | 103 | 0.77 | [0.61-0.86] | 0.39 | [0.23-0.53] | Smoking | 0.77 | [0.69-0.84] | 0.59 | [0.41-0.74] | 0.90 | [0.80-0.97] |
| | | | | | | | Biomarkers | 0.86 | [0.80-0.92] | 0.76 | [0.64-0.88] | 0.98 | [0.94-1.00] |
| | | | | | | | Smoking + Biomarkers | 0.88 | [0.82-0.93] | 0.81 | [0.67-0.91] | 0.95 | [0.91-0.99] |
| Heavy smokers | 23 | 18 | N/A | | N/A | | Smoking | 0.65 | [0.48-0.83] | | | | |
| | | | | | | | Biomarkers | 0.86 | [0.74-0.97] | | | | |
| | | | | | | | Smoking + Biomarkers | 0.86 | [0.75-0.97] | | | | |
| Light smokers | 20 | 35 | N/A | | N/A | | Smoking | 0.73 | [0.60-0.86] | | | | |
| | | | | | | | Biomarkers | 0.91 | [0.83-0.98] | | | | |
| | | | | | | | Smoking + Biomarkers | 0.89 | [0.80-0.97] | | | | |

Figure 2:
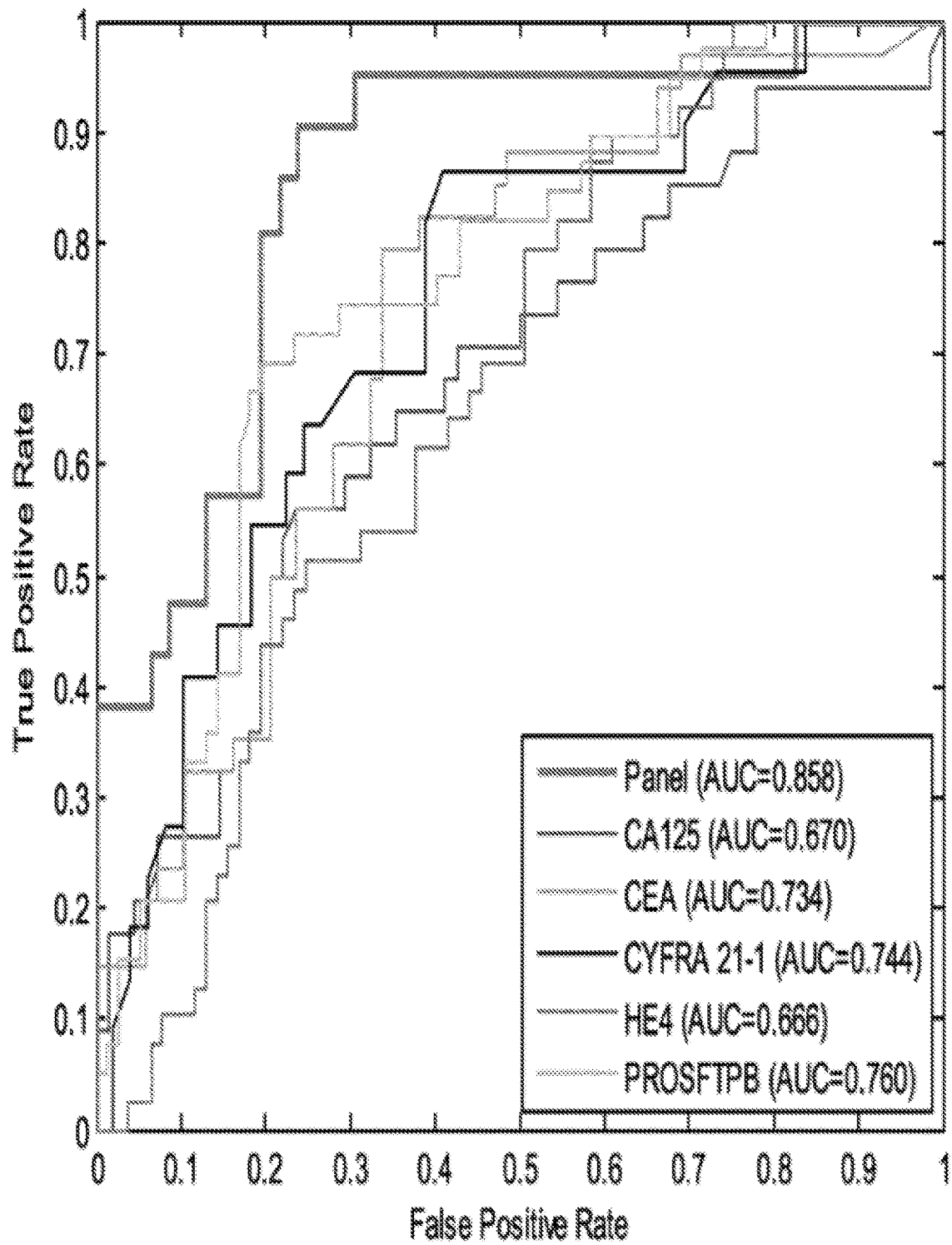
FIG. 2 depicts ROC curves for all 5 biomarkers in CARET along with the 4 marker panel for 0-6 months from diagnosis.
Figure 3:
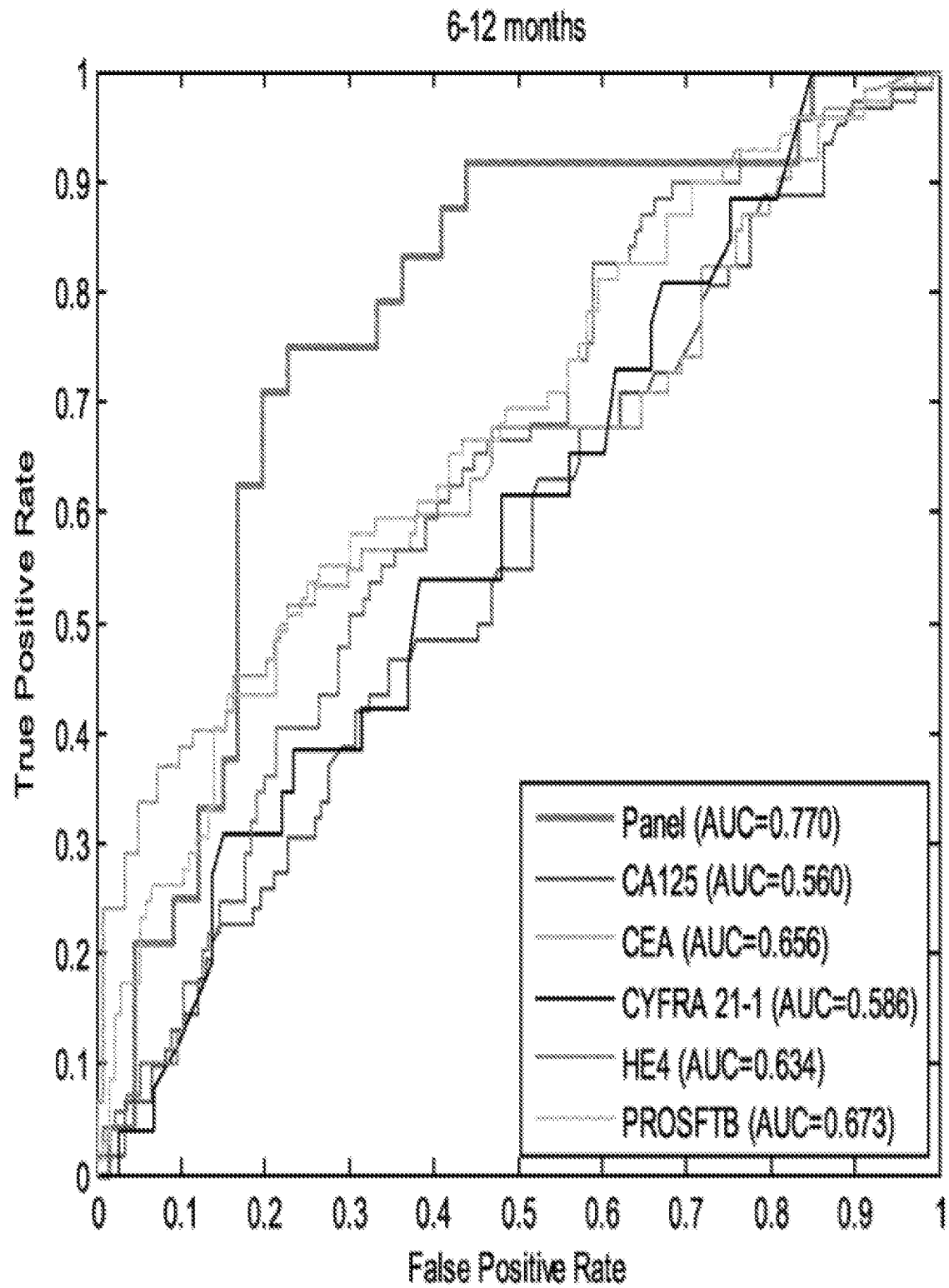
FIG. 3 depicts ROC curves for all 5 biomarkers in CARET along with the 4 marker panel for ≥6-12 months from diagnosis.

The sensitivity of the panel at 95% specificity was 38% for subjects who were diagnosed with lung cancer within 6 months of blood draw (FIG. 2) and 21% for subjects who developed lung cancer more than 6 months and up to 12 months following blood draw (FIG. 3) (AUC=0.858, 95% CI: 0.76-0.96; AUC=0.770, 95% CI: 0.66-0.88, respectively). The panel offered comparable classification for the two most prevalent histologic types of lung cancer: an AUC of 0.794 for lung adenocarcinoma (95% CI: 0.67-0.92; SN=21%, SP=95%), an AUC of 0.790 in lung squamous carcinoma (95% CI: 0.62-0.96; SN=15%, SP=95%). The remainder of NSCLC were classified with an AUC of 0.804 (95% CI: 0.68-0.93) with a sensitivity of 33% (SP=95%). Panel performance for females was (AUC=0.829; 95% CI: 0.70-0.96) and males (AUC=0.783; 95% CI: 0.69-0.88).

The extent to which the biomarker-score could discriminate between incident lung cancer cases and controls was evaluated externally and non-parametrically by combining EPIC and NSHDS samples and assigning each participant the biomarker-score, and evaluating the performance using receiver-operating characteristics (ROC) curve analyses.

The biomarker-score was evaluated for its potential to improve a risk prediction model based on smoking variables alone using the combined EPIC and NSHDS sample, first by fitting a model (smoking model) including smoking variables using unconditional logistic regression. This model included age (continuous), sex (dichotomous), cohort (dichotomous), smoking status (former/current), cigarettes per day in current smokers (continuous [not available in former smokers]), smoking duration (continuous), and time since quitting in former smokers (continuous). Subsequently, an integrated risk prediction model was determined by fitting a new model also including the biomarker-score with the smoking model. The discriminative performance of the integrated risk prediction model compared to the smoking model was primarily evaluated by analyzing the EPIC and NSHDS samples combined.

In order to estimate the fraction of future lung cancer cases that would have been identified using the different models, the sensitivity of each model at a specificity corresponding to that provided by applying the USPSTF screening eligibility criteria was set. Conversely, the model specificity was also examined at the USPSTF sensitivity in order to estimate the extent to which screening could be avoided in subjects who will not develop lung cancer.

In ROC analysis, the overall performance of the smoking model (demographic and questionnaire-based smoking variables only) in discriminating cases and controls in the combined EPIC and NSHDS validation sample was estimated at an AUC of 0.72 (95% CI: 0.65-0.79, FIG. 1). The corresponding discriminative performance of the biomarker-score alone was estimated at an AUC of 0.80 (95% CI: 0.74-0.87, p-value comparing the AUC with the smoking model: 0.07). Combining the biomarker-score with the smoking model in the integrated risk prediction model resulted in an AUC of 0.83 (95% CI: 0.77-0.89, p-value comparing the AUC with the smoking model: 0.001).

The AUC estimate afforded by the integrated risk prediction model was similar when stratifying by sex and smoking status (range: 0.79 to 0.84), but higher in study participants who smoked less than 30 pack-years of cigarettes (AUC: 0.90, 95% CI: 0.83-0.96) compared to study participants who smoked more than 30 pack-years (AUC: 0.67, 95% CI: 0.53-0.81, p-value: 0.0053).

Applying the dichotomous USPSTF screening criteria on the validation sample resulted in an overall sensitivity of 0.42 (95% CI: 0.26-0.54) and a specificity of 0.78 (95% CI: 0.64-0.87). In order to evaluate the potential of improving the sensitivity when referring future lung cancer cases to screening—as opposed to applying the currently used USPSTF criteria—the sensitivity of the integrated risk prediction model at the specificity of the USPSTF criteria was evaluated. Accordingly, at a specificity of 0.78, the sensitivity for the integrated risk prediction model was 0.76 (95% CI: 0.57-0.86) and varied between 0.61 and 0.83 across the strata, but was consistently higher than that of the USPSTF criterion (Table 9). In comparison, the overall sensitivity of the smoking model at the same specificity was 0.41 (95% CI: 0.28-0.66) and varied between 0.21 and 0.57 across the strata. Conversely, studies were undertaken to improve the specificity of the USPTSF criteria, with the view to avoid referring subjects who will not develop lung cancer for screening. Here, at the overall sensitivity of 0.42—that of the USPSTF criteria—the corresponding specificity using the integrated risk prediction model was 0.94 (95% CI: 0.88-0.98), as opposed to 0.78 (95% CI: 0.70-0.90) of the smoking model. Again, the specificity of the integrated risk prediction model was consistently and notably higher than that of the smoking model and varied between 0.88 and 1.00 across strata.

Example 6: Expansion of Panel with Additional Biomarkers

In an exploratory analysis, 16 additional promising biomarkers were also analyzed against the validation cohort to evaluate their potential in risk prediction. Based on data on these 16 biomarkers, further improvement to the discriminative performance of the biomarker-score developed in CARET was pursued. Based on penalized logistic regression (lasso), 2 additional biomarkers were selected from the 16 assayed biomarkers in addition to the biomarker score, resulting in a nominally higher AUC of 0.83 (95% CI: 0.77-0.90) overall, as compared to 0.80 (95% CI: 0.74-0.87) of the biomarker score alone (p-value: 0.11). The bootstrap-optimism corrected AUC estimate was 0.80, indicating that the potential of the additional 16 biomarkers to further improve lung cancer risk prediction is limited.

Example 7: Specificity and Sensitivity in the Range of Regression Model Diagnostic Scores It will be appreciated by those of ordinary skill in the art that different methods or assays of biomarker detection, quantitation, and analysis, which can include using different reagents, will produce different results which may require modification of the regression model. In particular, different assays can produce results expressed, for example, in different units. Further, duplicate reactions in duplicate assays of the same samples can also produce different raw results. However, it is the combined detection, quantitation, and analysis of at least the four biomarkers CEA, CA125, CYFRA21-1, and Pro-SFTPB that, when incorporated into a regression model as disclosed herein, produce a definitive diagnosis of lung cancer.

A range in the results reported for each particular assay used to detect, quantify, and analyze the four biomarkers will have a range in the resulting lung cancer-predictive score that depends, in part, on the degree of sensitivity or specificity (Table 10; where the preferred cutoff based on the Youden Index is −1.073 with a specificity of 0.714 and sensitivity of 0.822). The regression model used to generate the lung cancer-predictive score can dependent on the specific assays utilized to test the markers. As understood by those of skill in the art, different assays can target different epitopes of the four biomarkers or have different affinities and sensitivities. As such, the regression model algorithm used to generate the lung cancer-predictive score can be modified to take these assay variations into consideration.

Example 8: Assaying Samples and Lung Cancer-Patient Diagnosis

In one example, a patient being screened for lung cancer—based on the four-biomarker panel disclosed herein—has a blood sample drawn (or other fluid or tissue biopsy) and assayed by ELISA (or other assay) to quantitate the levels of CEA, CA125, CYFRA21-1, and Pro-SFTPB in the patient. Normalized values for at least these biomarkers that take into account the specific assay used could be, for example, CEA=3.2 ng/mL; CA125=3.5 U/mL; CYFRA21-1=2.1 ng/mL; and Pro-SFTPB=6 ng/mL. Raw assay data are then log 2-transformed, computing the mean and standard deviation for the healthy samples in each cohort. The data is then standardized so that healthy samples have a mean of 0 and a standard deviation of 1: where (Readj−meanhealthy)/(stdhealthy), where j is the jth sample.

When analyzed using the following regression model:

$$\log it(p) = -8.4927 + 0.4730 \times \log CA125 + 0.2612 \times \log CYFRA211 + 0.6531 \times \log CEA$$

the above patient would have a combined score of 1.344. In view of the preferred cutoff for consideration of both specificity and sensitivity (Table 10), a patient with such a combined score would have lung cancer with near certainty and consequently be directed for follow-up testing and treatment for lung cancer using other modalities discussed herein and known to those of skill in the art. Using the regression model described herein, the more positive the combined lung cancer-predictive score, the more certainty the patient has lung cancer. Conversely, the more negative the combined lung cancer-predictive score, the more certainty the patient does not have lung cancer.

By contrast, in another example, normalized values for biomarkers CEA, CA125, CYFRA21-1, and Pro-SFTPB that take into account the specific assay used could be, for example, CEA=0.1 ng/mL; CA125=2.0 U/mL; CYFRA21-1=−1.2 ng/mL; and Pro-SFTPB=4.0 ng/mL. When analyzed using the same regression model as above, such a patient would have a combined score of −4.3347. In view of the preferred cutoff for consideration of both specificity and sensitivity (Table 10), a patient with such a combined score would, with near certainty, not have lung cancer and, therefore, would or would not need to be followed for additional testing based on the strength of any other clinical conditions.

TABLE 10

Sensitivity and specificity at different cutoffs of the biomarker panel-based (CEA, CA125, CYFRA21-1 and Pro-SFTPB) scores in the combination validation set.

| Cutoff | Specificity | Sensitivity | Youden |
|---|---|---|---|
| 2.252 | 1.000 | 0.000 | 0.000 |
| 2.252 | 1.000 | 0.022 | 0.022 |
| 1.978 | 1.000 | 0.044 | 0.044 |
| 1.942 | 1.000 | 0.067 | 0.067 |
| 1.925 | 1.000 | 0.089 | 0.089 |
| 1.693 | 1.000 | 0.111 | 0.111 |
| 1.560 | 1.000 | 0.133 | 0.133 |
| 1.548 | 1.000 | 0.156 | 0.156 |
| 1.120 | 1.000 | 0.178 | 0.178 |
| 0.786 | 0.991 | 0.178 | 0.169 |

TABLE 10-continued

Sensitivity and specificity at different cutoffs of the biomarker panel-based (CEA, CA125, CYFRA21-1 and Pro-SFTPB) scores in the combination validation set.

| Cutoff | Specificity | Sensitivity | Youden |
|---|---|---|---|
| 0.786 | 0.991 | 0.200 | 0.191 |
| 0.779 | 0.982 | 0.200 | 0.182 |
| 0.579 | 0.973 | 0.200 | 0.173 |
| 0.546 | 0.964 | 0.200 | 0.164 |
| 0.526 | 0.955 | 0.200 | 0.155 |
| 0.507 | 0.946 | 0.200 | 0.146 |
| 0.464 | 0.946 | 0.222 | 0.169 |
| 0.426 | 0.946 | 0.244 | 0.191 |
| 0.407 | 0.938 | 0.244 | 0.182 |
| 0.400 | 0.938 | 0.267 | 0.204 |
| 0.357 | 0.938 | 0.289 | 0.226 |
| 0.249 | 0.938 | 0.311 | 0.249 |
| 0.230 | 0.929 | 0.311 | 0.240 |
| 0.191 | 0.920 | 0.311 | 0.231 |
| 0.138 | 0.920 | 0.333 | 0.253 |
| 0.120 | 0.920 | 0.356 | 0.275 |
| 0.083 | 0.911 | 0.356 | 0.266 |
| 0.053 | 0.911 | 0.378 | 0.288 |
| 0.037 | 0.902 | 0.378 | 0.280 |
| −0.019 | 0.893 | 0.378 | 0.271 |
| −0.027 | 0.884 | 0.378 | 0.262 |
| −0.030 | 0.875 | 0.378 | 0.253 |
| −0.043 | 0.866 | 0.378 | 0.244 |
| −0.052 | 0.866 | 0.400 | 0.266 |
| −0.055 | 0.866 | 0.422 | 0.288 |
| −0.098 | 0.866 | 0.444 | 0.311 |
| −0.127 | 0.866 | 0.467 | 0.333 |
| −0.169 | 0.857 | 0.467 | 0.324 |
| −0.174 | 0.857 | 0.489 | 0.346 |
| −0.197 | 0.857 | 0.511 | 0.368 |
| −0.231 | 0.848 | 0.511 | 0.359 |
| −0.233 | 0.839 | 0.511 | 0.350 |
| −0.257 | 0.839 | 0.533 | 0.373 |
| −0.302 | 0.839 | 0.556 | 0.395 |
| −0.348 | 0.830 | 0.556 | 0.386 |
| −0.404 | 0.830 | 0.578 | 0.408 |
| −0.466 | 0.830 | 0.600 | 0.430 |
| −0.491 | 0.821 | 0.600 | 0.421 |
| −0.515 | 0.813 | 0.600 | 0.413 |
| −0.521 | 0.804 | 0.600 | 0.404 |
| −0.552 | 0.795 | 0.600 | 0.395 |
| −0.586 | 0.795 | 0.622 | 0.417 |
| −0.629 | 0.786 | 0.622 | 0.408 |
| −0.692 | 0.777 | 0.622 | 0.399 |
| −0.700 | 0.777 | 0.644 | 0.421 |
| −0.707 | 0.777 | 0.667 | 0.443 |
| −0.708 | 0.777 | 0.689 | 0.466 |
| −0.735 | 0.777 | 0.711 | 0.488 |
| −0.773 | 0.768 | 0.711 | 0.479 |
| −0.794 | 0.768 | 0.733 | 0.501 |
| −0.796 | 0.768 | 0.756 | 0.523 |
| −0.822 | 0.759 | 0.756 | 0.514 |
| −0.930 | 0.750 | 0.756 | 0.506 |
| −0.949 | 0.750 | 0.778 | 0.528 |
| −0.994 | 0.741 | 0.778 | 0.519 |
| −1.033 | 0.732 | 0.778 | 0.510 |
| −1.055 | 0.723 | 0.778 | 0.501 |
| −1.065 | 0.714 | 0.778 | 0.492 |
| −1.066 | 0.714 | 0.800 | 0.514 |
| −1.073 | 0.714 | 0.822 | 0.537 |
| −1.084 | 0.705 | 0.822 | 0.528 |
| −1.093 | 0.696 | 0.822 | 0.519 |
| −1.101 | 0.688 | 0.822 | 0.510 |
| −1.121 | 0.679 | 0.822 | 0.501 |
| −1.145 | 0.679 | 0.844 | 0.523 |
| −1.157 | 0.670 | 0.844 | 0.514 |
| −1.168 | 0.661 | 0.844 | 0.505 |
| −1.168 | 0.652 | 0.844 | 0.496 |
| −1.186 | 0.643 | 0.844 | 0.487 |
| −1.186 | 0.634 | 0.844 | 0.478 |
| −1.194 | 0.625 | 0.844 | 0.469 |
| −1.306 | 0.616 | 0.844 | 0.461 |
| −1.339 | 0.607 | 0.844 | 0.452 |
| −1.378 | 0.598 | 0.844 | 0.443 |

TABLE 10-continued

Sensitivity and specificity at different cutoffs of the biomarker panel-based (CEA, CA125, CYFRA21-1 and Pro-SFTPB) scores in the combination validation set.

| Cutoff | Specificity | Sensitivity | Youden |
|---|---|---|---|
| −1.384 | 0.598 | 0.867 | 0.465 |
| −1.390 | 0.589 | 0.867 | 0.456 |
| −1.399 | 0.580 | 0.867 | 0.447 |
| −1.401 | 0.571 | 0.867 | 0.438 |
| −1.407 | 0.563 | 0.867 | 0.429 |
| −1.438 | 0.563 | 0.889 | 0.451 |
| −1.447 | 0.554 | 0.889 | 0.442 |
| −1.449 | 0.545 | 0.889 | 0.434 |
| −1.459 | 0.536 | 0.889 | 0.425 |
| −1.464 | 0.527 | 0.889 | 0.416 |
| −1.470 | 0.518 | 0.889 | 0.407 |
| −1.551 | 0.518 | 0.911 | 0.429 |
| −1.556 | 0.509 | 0.911 | 0.420 |
| −1.612 | 0.500 | 0.911 | 0.411 |
| −1.614 | 0.500 | 0.933 | 0.433 |
| −1.626 | 0.491 | 0.933 | 0.424 |
| −1.627 | 0.482 | 0.933 | 0.415 |
| −1.631 | 0.473 | 0.933 | 0.407 |
| −1.672 | 0.464 | 0.933 | 0.398 |
| −1.694 | 0.455 | 0.933 | 0.389 |
| −1.769 | 0.446 | 0.933 | 0.380 |
| −1.772 | 0.438 | 0.933 | 0.371 |
| −1.816 | 0.429 | 0.933 | 0.362 |
| −1.826 | 0.420 | 0.933 | 0.353 |
| −1.846 | 0.411 | 0.933 | 0.344 |
| −1.864 | 0.402 | 0.933 | 0.335 |
| −1.872 | 0.393 | 0.933 | 0.326 |
| −1.882 | 0.384 | 0.933 | 0.317 |
| −1.895 | 0.375 | 0.933 | 0.308 |
| −1.921 | 0.366 | 0.933 | 0.299 |
| −1.960 | 0.357 | 0.933 | 0.290 |
| −2.021 | 0.348 | 0.933 | 0.282 |
| −2.143 | 0.339 | 0.933 | 0.273 |
| −2.180 | 0.330 | 0.933 | 0.264 |
| −2.189 | 0.321 | 0.933 | 0.255 |
| −2.201 | 0.313 | 0.933 | 0.246 |
| −2.211 | 0.304 | 0.933 | 0.237 |
| −2.212 | 0.295 | 0.933 | 0.228 |
| −2.259 | 0.286 | 0.933 | 0.219 |
| −2.306 | 0.277 | 0.933 | 0.210 |
| −2.389 | 0.268 | 0.933 | 0.201 |
| −2.454 | 0.259 | 0.933 | 0.192 |
| −2.479 | 0.250 | 0.933 | 0.183 |
| −2.485 | 0.241 | 0.933 | 0.174 |
| −2.502 | 0.232 | 0.933 | 0.165 |
| −2.511 | 0.223 | 0.933 | 0.157 |
| −2.556 | 0.214 | 0.933 | 0.148 |
| −2.569 | 0.205 | 0.933 | 0.139 |
| −2.588 | 0.196 | 0.933 | 0.130 |
| −2.589 | 0.188 | 0.933 | 0.121 |
| −2.619 | 0.188 | 0.956 | 0.143 |
| −2.755 | 0.179 | 0.956 | 0.134 |
| −2.806 | 0.170 | 0.956 | 0.125 |
| −2.845 | 0.161 | 0.956 | 0.116 |
| −2.870 | 0.152 | 0.956 | 0.107 |
| −2.873 | 0.152 | 0.978 | 0.130 |
| −2.966 | 0.143 | 0.978 | 0.121 |
| −2.976 | 0.134 | 0.978 | 0.112 |
| −3.031 | 0.134 | 1.000 | 0.134 |
| −3.039 | 0.125 | 1.000 | 0.125 |
| −3.051 | 0.116 | 1.000 | 0.116 |
| −3.083 | 0.107 | 1.000 | 0.107 |
| −3.231 | 0.098 | 1.000 | 0.098 |
| −3.262 | 0.089 | 1.000 | 0.089 |
| −3.414 | 0.080 | 1.000 | 0.080 |
| −3.521 | 0.071 | 1.000 | 0.071 |
| −3.645 | 0.063 | 1.000 | 0.063 |
| −3.705 | 0.054 | 1.000 | 0.054 |
| −3.774 | 0.045 | 1.000 | 0.045 |
| −3.882 | 0.036 | 1.000 | 0.036 |
| −3.936 | 0.027 | 1.000 | 0.027 |
| −4.225 | 0.018 | 1.000 | 0.018 |
| −4.356 | 0.009 | 1.000 | 0.009 |
| −4.595 | 0.000 | 1.000 | 0.000 |

Example 9: Additive Effect of Metabolite and Protein Markers

Figure 4:
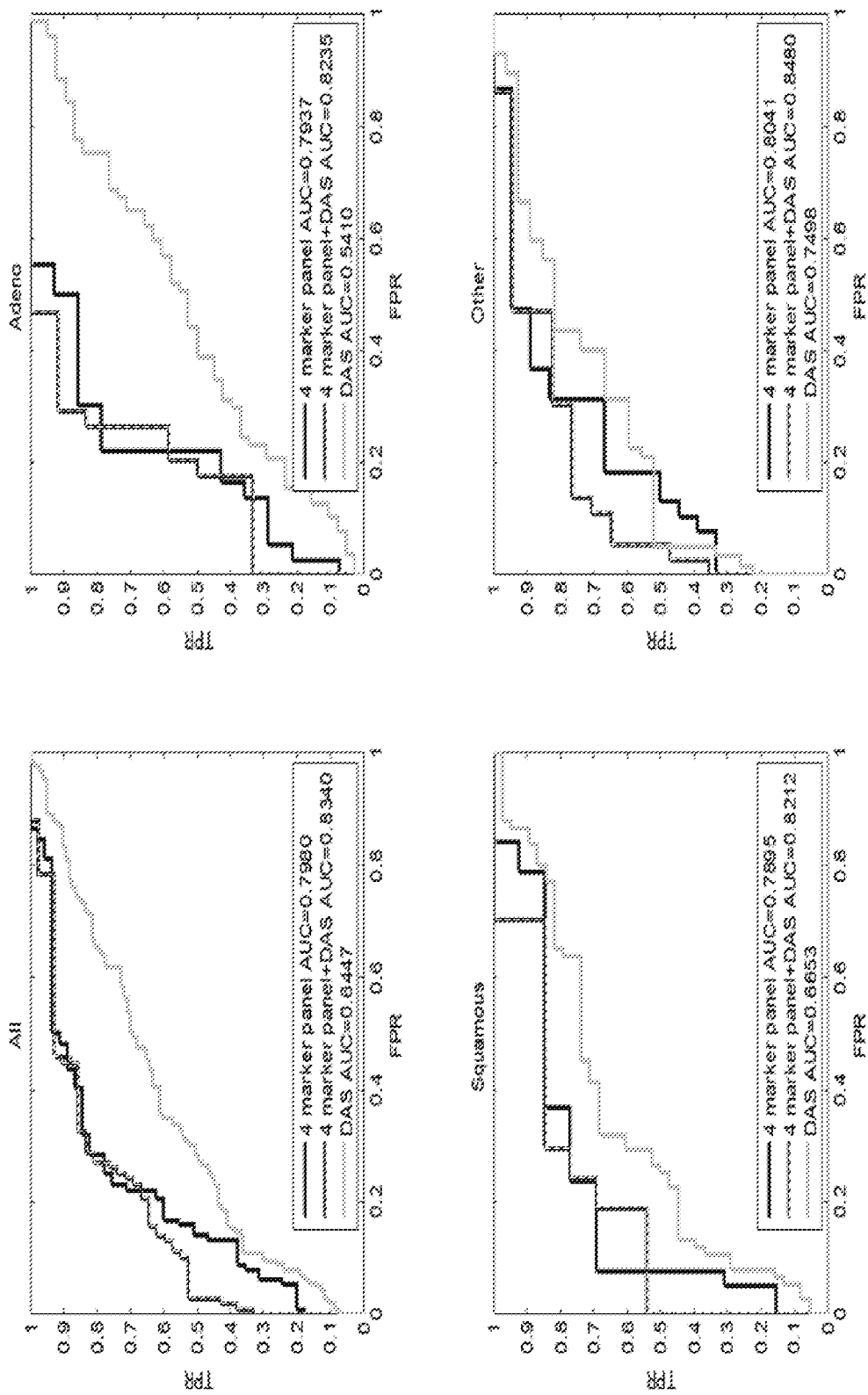
FIG. 4 depicts ROC curves for the 4-marker panel (dark grey line), the 4-marker panel with the addition of diacetylspermine (DAS) (dotted line), and DAS alone (light grey line) for all samples analyzed (top left panel), adenocarninoma samples (top right panel), squamous cell lung cancer (botton left panel), and samples other than squamous cell lung cancer and adenocarcinoma (bottom right panel).

An investigation was performed to evaluate the contribution of adding a metabolite such as di-acetyl spermine (DAS), which was previously identified as a marker for non small-cell lung cancer, to the four-marker lung cancer panel. The data indicated an additive performance, particularly in non-adenocarcinoma cases (FIG. 4).

The combination of metabolite and protein markers in pre-diagnostic blood samples from a group of 100 lung cancer cases and twice as many controls showed improved performance compared to the four-marker panel alone, with particularly improved performance for subjects that were subsequently diagnosed with squamous lung cancer or with other than squamous or adenocarcinoma. Therefore, the addition of a metabolite marker such as DAS to a panel of protein markers allows for improved early detection for lung cancer compared to protein markers alone.

Other Embodiments

The detailed description set-forth above is provided to aid those skilled in the art in practicing the present disclosure. However, the disclosure described and claimed herein is not to be limited in scope by the specific embodiments herein disclosed because these embodiments are intended as illustration of several aspects of the disclosure. Any equivalent embodiments are intended to be within the scope of this disclosure. Indeed, various modifications of the disclosure in addition to those shown and described herein will become apparent to those skilled in the art from the foregoing description, which do not depart from the spirit or scope of the present inventive discovery. Such modifications are also intended to fall within the scope of the appended claims.

What is claimed is:

1. A method of determining the risk of a subject for harboring lung cancer and treating lung cancer, comprising
   (a) measuring a level of biomarkers in a biological sample obtained from the subject, wherein the biomarkers comprise diacetylspermine (DAS), CEA, CA125, CYFRA21-1, and Pro-SFTPB, and wherein the biological sample is collected prior to a diagnosis of lung cancer;
   (b) combining the measured levels into a biomarker-based risk score, wherein the biomarker-based risk score is calculated using logistic regression analysis and wherein the subject's biomarker-based risk score is elevated relative to a healthy subject;
   (c) administering a computerized tomography (CT) scan or other imaging modality to the subject having the elevated biomarker-based risk score;
   (d) classifying the subject as lung cancer positive based on the increased risk of having lung cancer quantified in step (b) and the imaging results obtained in step (c); and
   (e) administering to the lung cancer positive subject a therapeutically effective amount of a treatment for the lung cancer comprising surgery, chemotherapy, immunotherapy, radiation therapy, targeted therapy, or a combination thereof.

2. The method of claim 1, wherein the lung cancer is non-small cell lung cancer, adenocarcinoma or squamous cell cancer.

3. The method of claim 1, wherein the lung cancer is diagnosed at or before the borderline resectable stage or at the resectable stage.

4. The method of claim 1, wherein the biological sample is selected from blood, plasma, and serum.

5. The method of claim 1, wherein the measuring of CEA, CA125, CYFRA21-1, pro-SFTPB, and DAS levels is made at substantially the same time or in a stepwise manner.

6. The method of claim 1, wherein measuring the level of biomarkers of CEA, CA125, CYFRA21-1, pro-SFTPB, and DAS comprises the use of one or more reporter molecules; and/or one or more surfaces capable of binding one or more biomarkers; and/or one or more relay molecules capable of binding one or more biomarkers.

7. The method of claim 6, wherein at least one of the surfaces is the surface of a solid particle.

8. The method of claim 7, wherein the solid particle is a bead.

9. The method as recited in claim 6, wherein at least one of the reporter molecules is linked to an enzyme, or wherein at least one of the reporter molecules provides a detectable signal.

10. The method as recited in claim 9, wherein the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry.

11. A method of treating a subject suspected of harboring lung cancer, comprising
   (a) analyzing the subject for risk of harboring lung cancer with a method comprising:
   (b) measuring a level of biomarkers in a biological sample obtained from the subject, wherein the biomarkers comprise diacetylspermine (DAS), CEA, CA125, CYFRA21-1, and Pro-SFTPB, and wherein the biological sample is collected prior to a diagnosis of lung cancer;
   (c) combining the measured levels into a biomarker-based risk score, wherein the biomarker-based risk score is calculated using logistic regression analysis and wherein the biomarker-based risk score classifies the subject as being at risk of harboring lung cancer when the biomarker-based risk score is elevated in the subject relative to a healthy subject;
   (d) classifying the subject as lung cancer positive based on the increased risk of having lung cancer quantified in step (c); and
   (e) administering to the lung cancer positive subject a therapeutically effective amount of a treatment for the cancer.

12. The method of treating of claim 11, wherein the treatment is surgery, chemotherapy, immunotherapy, radiation therapy, targeted therapy, or a combination thereof.

13. The method of claim 11, wherein the lung cancer is adenocarcinoma or squamous cell cancer.

14. The method of claim 11, wherein the lung cancer is diagnosed at or before the borderline resectable stage or at the resectable stage.

15. The method of claim 11, wherein the biological sample is selected from blood, plasma, and serum.

16. The method of claim 11, wherein the measuring of CEA, CA125, CYFRA21-1, pro-SFTPB, and DAS levels is made at substantially the same time or in a stepwise manner.

17. The method of claim 11, wherein measuring the level of biomarkers of CEA, CA125, CYFRA21-1, pro-SFTPB, and DAS comprises the use of one or more reporter molecules; and/or one or more surfaces capable of binding one or more biomarkers; and/or one or more relay molecules capable of binding one or more biomarkers.

18. The method of claim 17, wherein at least one of the surfaces is the surface of a solid particle.

19. The method as recited in claim 18, wherein the solid particle is a bead.

20. The method as recited in claim 17, wherein at least one of the reporter molecules is linked to an enzyme; or wherein at least one of the reporter molecules provides a detectable signal.

21. The method as recited in claim 20, wherein the detectable signal is detectable by a method selected from UV-visible spectroscopy, mass spectrometry, nuclear magnetic resonance (NMR) spectroscopy, proton NMR spectroscopy, nuclear magnetic resonance (NMR) spectrometry, gas chromatography-mass spectrometry (GC-MS), liquid chromatography-mass spectrometry (LC-MS), correlation spectroscopy (COSy), nuclear Overhauser effect spectroscopy (NOESY), rotating frame nuclear Overhauser effect spectroscopy (ROESY), LC-TOF-MS, LC-MS/MS, and capillary electrophoresis-mass spectrometry.

* * * * *